US008640717B2

(12) United States Patent
McCarthy

(10) Patent No.: US 8,640,717 B2
(45) Date of Patent: Feb. 4, 2014

(54) MULTIPURPOSE SEQUENTIAL DROPLET APPLICATOR

(76) Inventor: Thomas Robert McCarthy, San Gabriel, CA (US)

( * ) Notice: Subject to any disclaimer, the term of this patent is extended or adjusted under 35 U.S.C. 154(b) by 812 days.

(21) Appl. No.: 12/758,771

(22) Filed: Apr. 12, 2010

(65) Prior Publication Data

US 2011/0250103 A1 Oct. 13, 2011

(51) Int. Cl.
*B01D 11/04* (2006.01)

(52) U.S. Cl.
USPC .............................. 134/94.1; 134/26; 422/256

(58) Field of Classification Search
USPC .................................... 134/94.1, 26; 422/256
See application file for complete search history.

(56) References Cited

U.S. PATENT DOCUMENTS 4,047,058 A 9/1977 Green
4,083,955 A 4/1978 Grabenstetter et al.
4,341,098 A 7/1982 Otting
4,341,310 A 7/1982 Sangiovanni et al.
4,754,163 A 6/1988 Aue et al.
4,979,942 A 12/1990 Wolf et al.
5,630,432 A 5/1997 Gaudlitz et al.
6,012,447 A 1/2000 Waxler et al.
6,218,869 B1 4/2001 Hongbin Hao et al.
6,223,936 B1 5/2001 Jeanbourquin
6,454,405 B1 9/2002 Stowe
6,558,633 B1 5/2003 Ecker et al.
6,613,656 B2 9/2003 Li
6,698,439 B2 * 3/2004 Kamikawa et al. ........... 134/138
6,713,021 B1 * 3/2004 Shvets et al. .................. 422/502
6,723,077 B2 4/2004 Pickup et al.
6,808,683 B2 10/2004 Gilbert
6,863,660 B2 3/2005 Marx
6,879,162 B2 4/2005 Aguero et al.
7,037,289 B2 5/2006 Dodge et al.
7,037,854 B2 5/2006 Bachrach et al.
7,314,270 B2 1/2008 Enomoto et al.
7,326,439 B2 2/2008 Hoisington et al.
2002/0053367 A1 * 5/2002 Kamikawa et al. ............. 141/98
2002/0168297 A1 * 11/2002 Shvets et al. .................. 422/100
2004/0101445 A1 * 5/2004 Shvets et al. .................. 422/100
2004/0107961 A1 6/2004 Trueba
2005/0036920 A1 2/2005 Gilbert
2007/0215725 A1 9/2007 Bunker et al.
2007/0261718 A1 11/2007 Randhawa
2008/0204517 A1 8/2008 Rosenzweig et al.
2008/0206482 A1 8/2008 Kondo

FOREIGN PATENT DOCUMENTS

WO WO/2008/149097 B1 12/2008
WO PCT/US2011/055005 2/2012

* cited by examiner

*Primary Examiner* — Michael Barr
*Assistant Examiner* — Benjamin L Osterhout

(57) ABSTRACT

Embodiments of this device or method repeatedly apply droplets of two or more liquids by means of nozzles of fixed relative direction in an alternate or sequential manner to a target location on a surface for removing material from the surface, adding material to the surface, or using the surface to biphasically catalyze a reaction of components of the liquids. The droplets have essentially no contact with one another before reaching the surface (FIG. 12A thru 13H). The effect of the droplets on the target surface can be modified by a continuous or interrupted flow of air or other gas to the target surface (FIG. 27A thru 29H), or by application of radiations such as sonic or ultrasonic radiation, or various frequencies of electromagnetic radiation, to the target surface, or some combination of these. Means may be included for adjusting the temperature of the liquids and gasses.

19 Claims, 57 Drawing Sheets

FIG. 24B
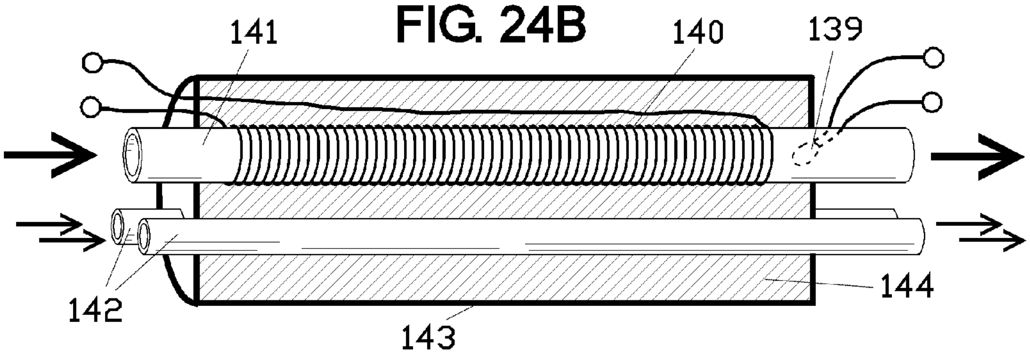
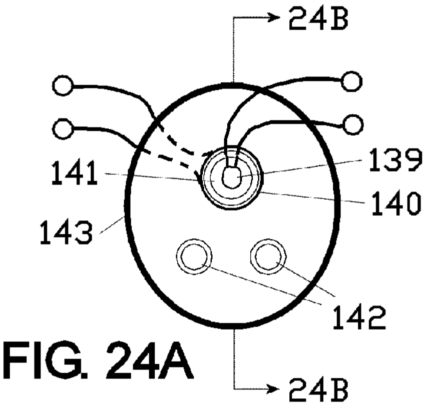
FIG. 24A
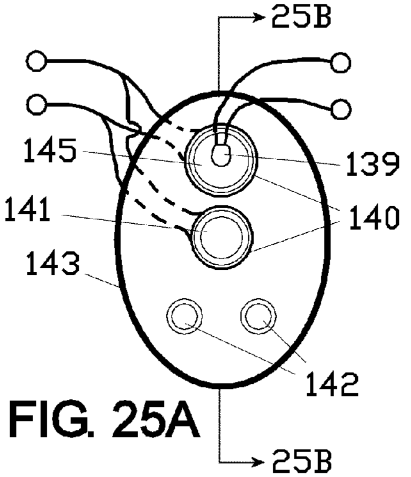
FIG. 25A
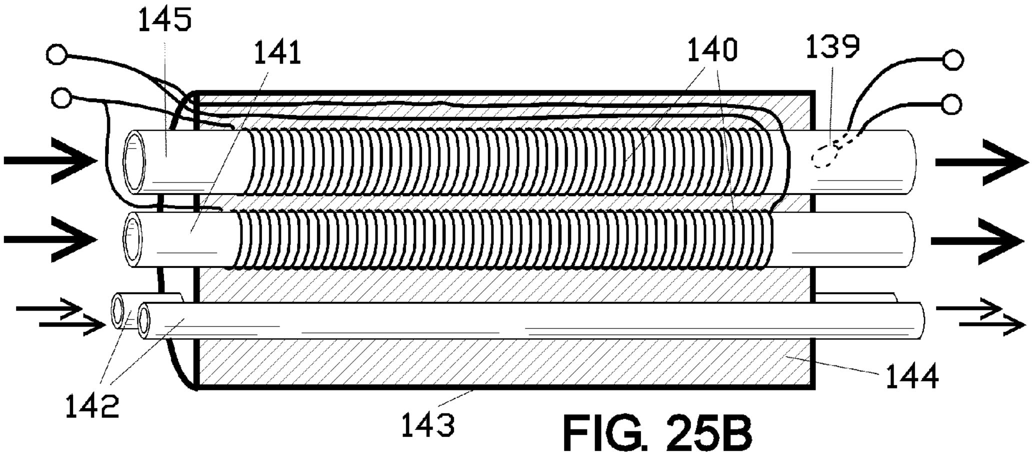
FIG. 25B

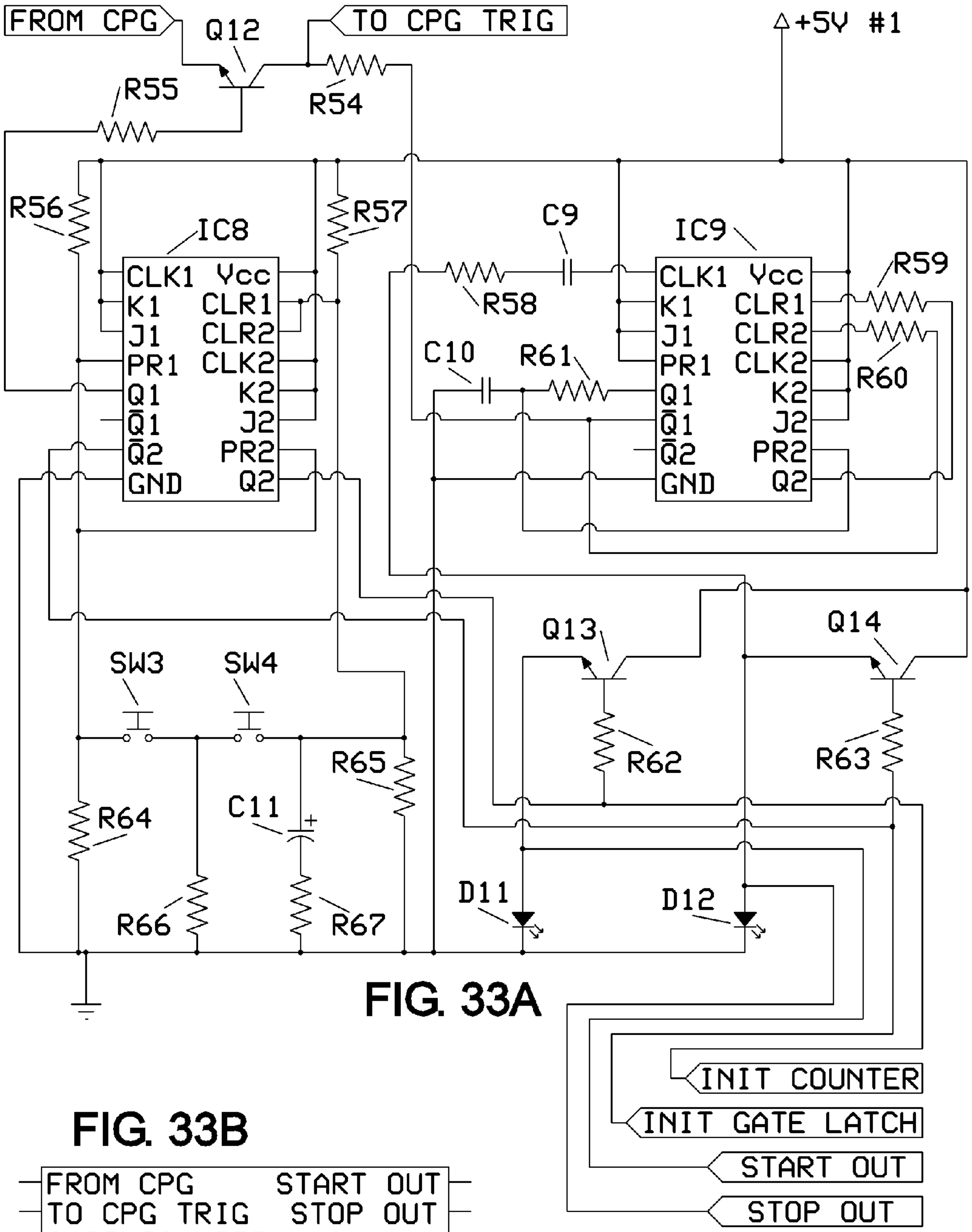
FIG. 33A
FIG. 33B
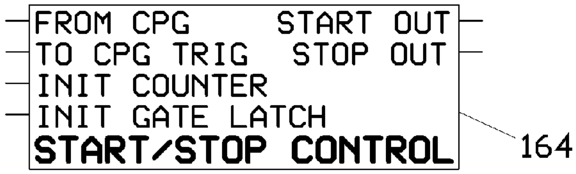

FIG. 34A
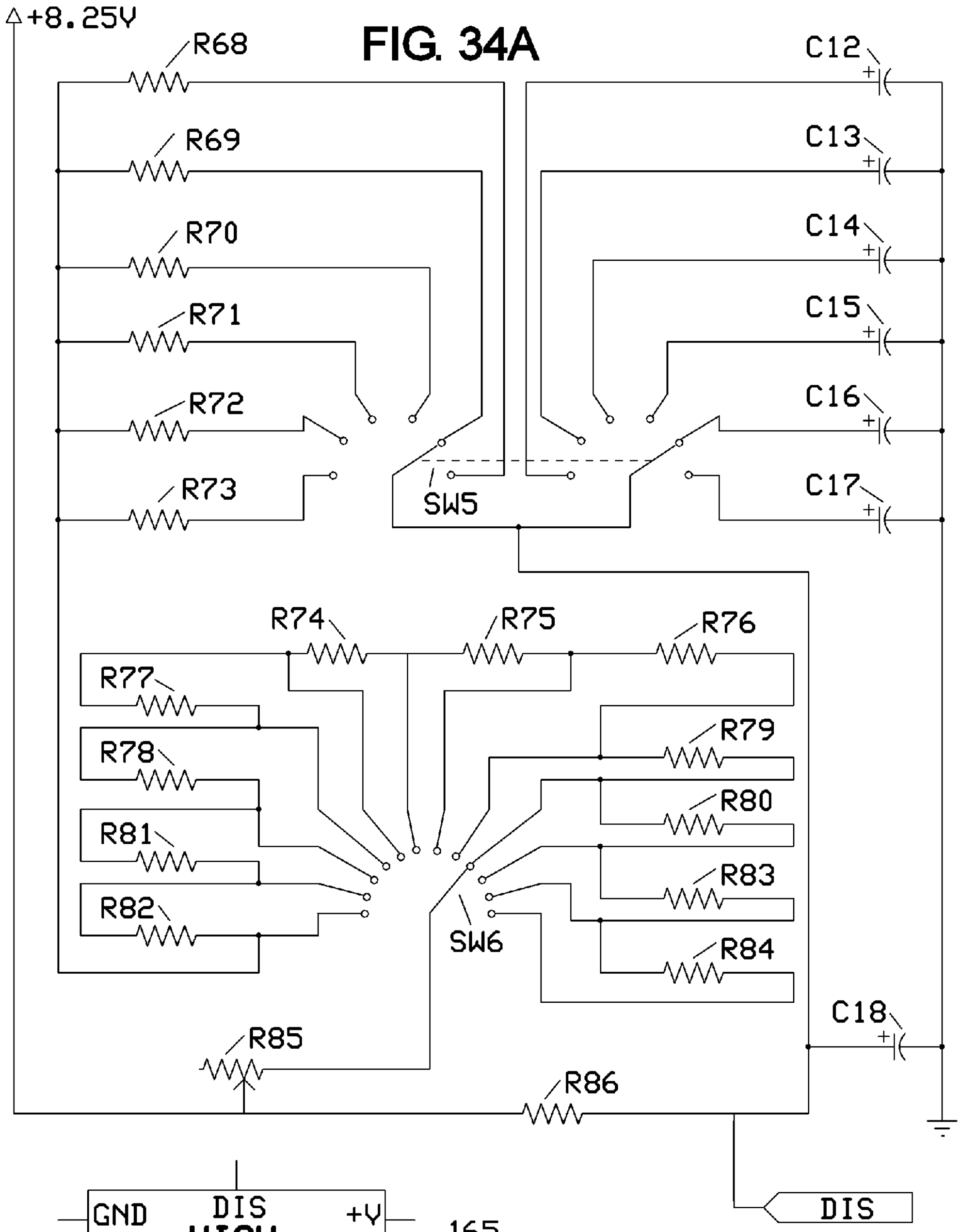
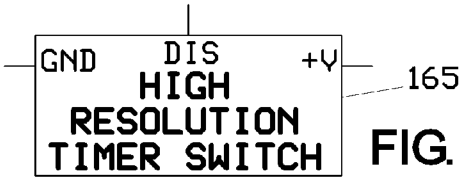
FIG. 34B

FIG. 35A
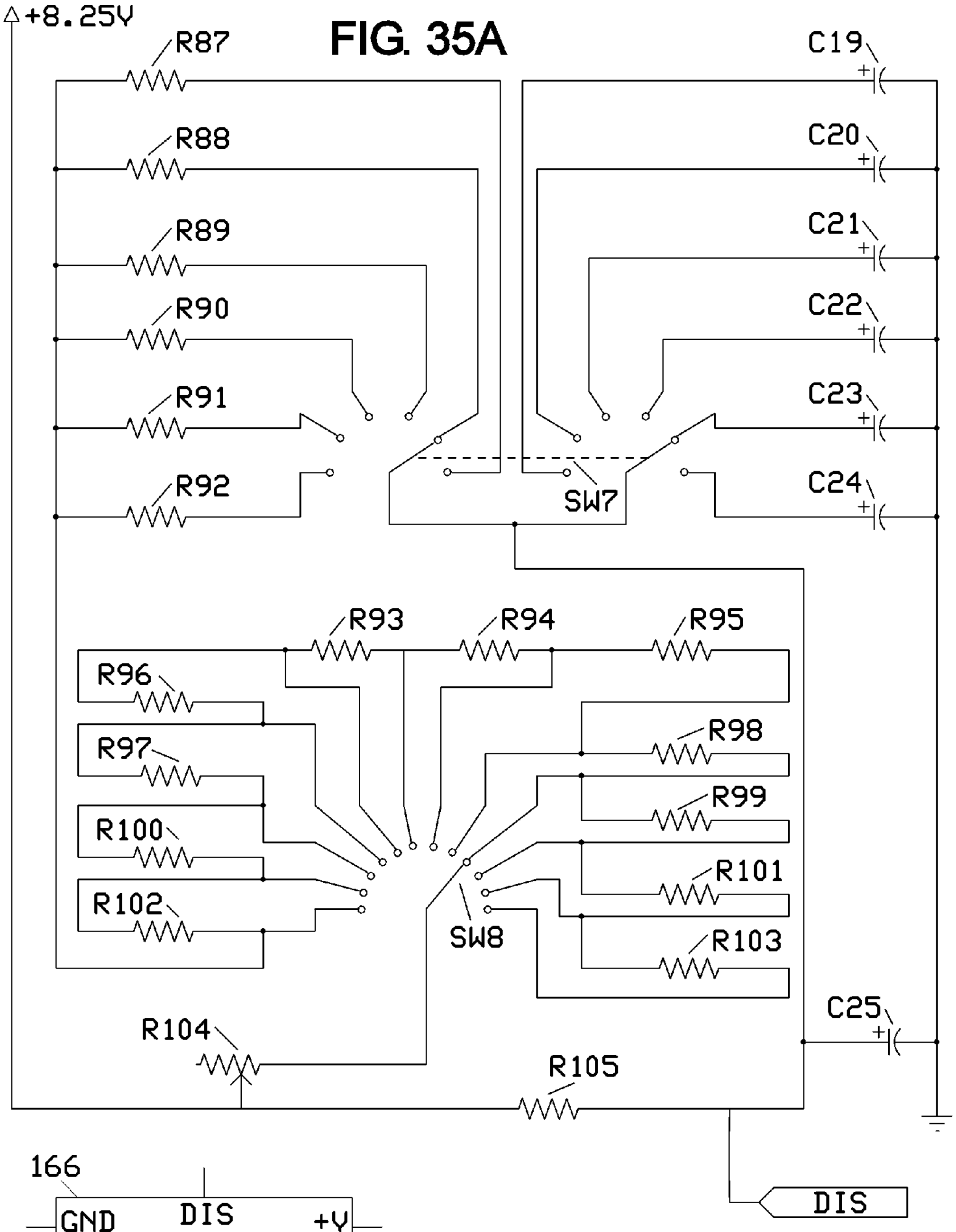
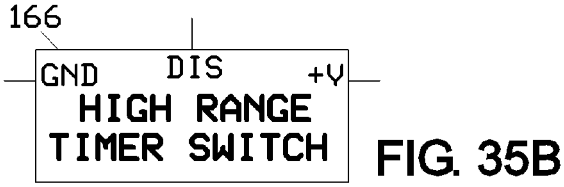
FIG. 35B

FIG. 39A
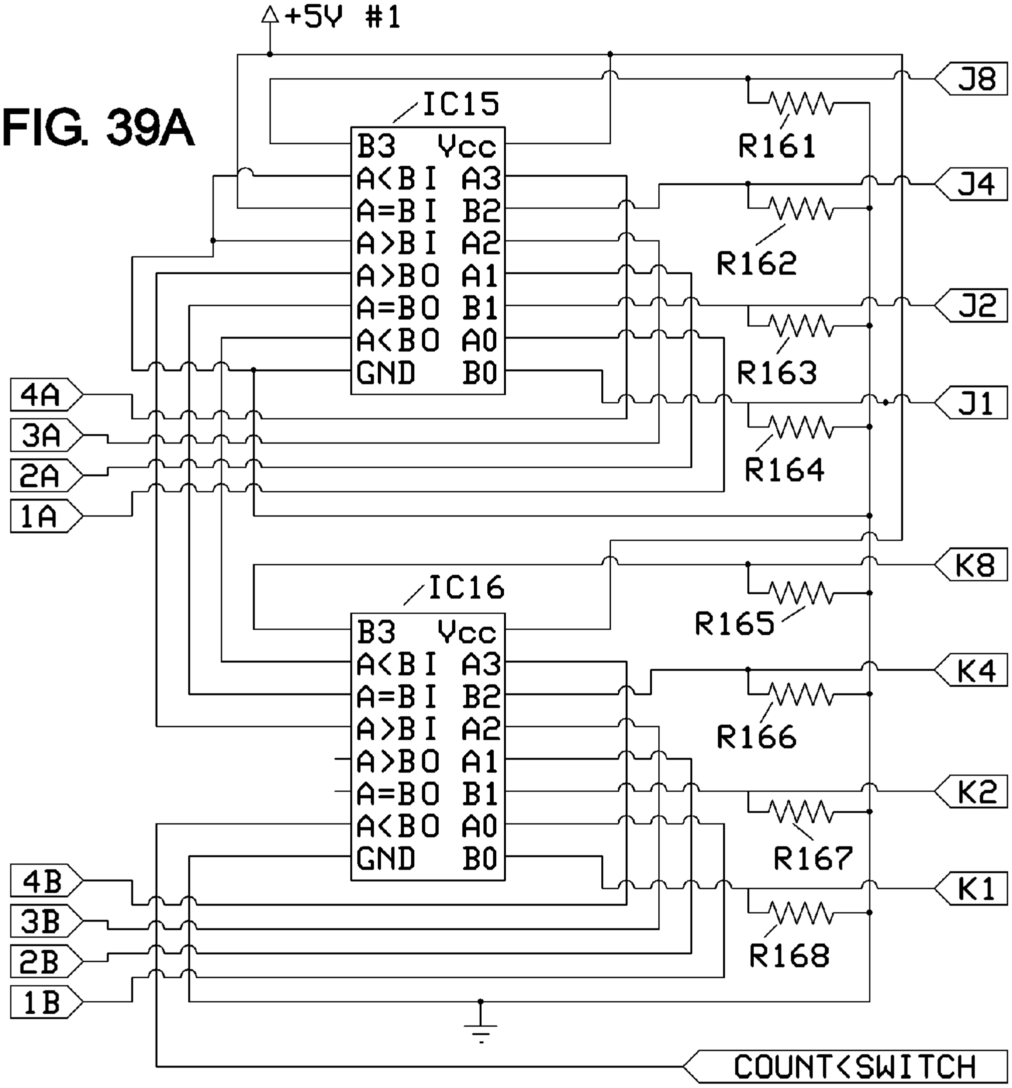
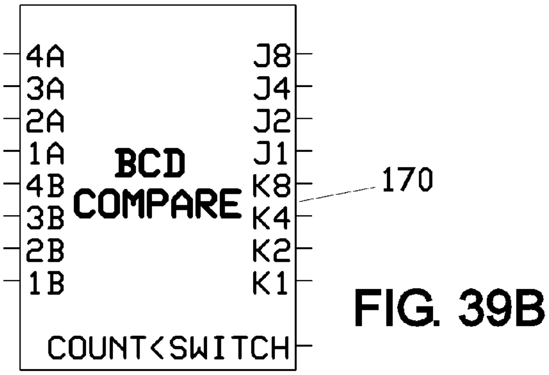
FIG. 39B

FIG. 40A
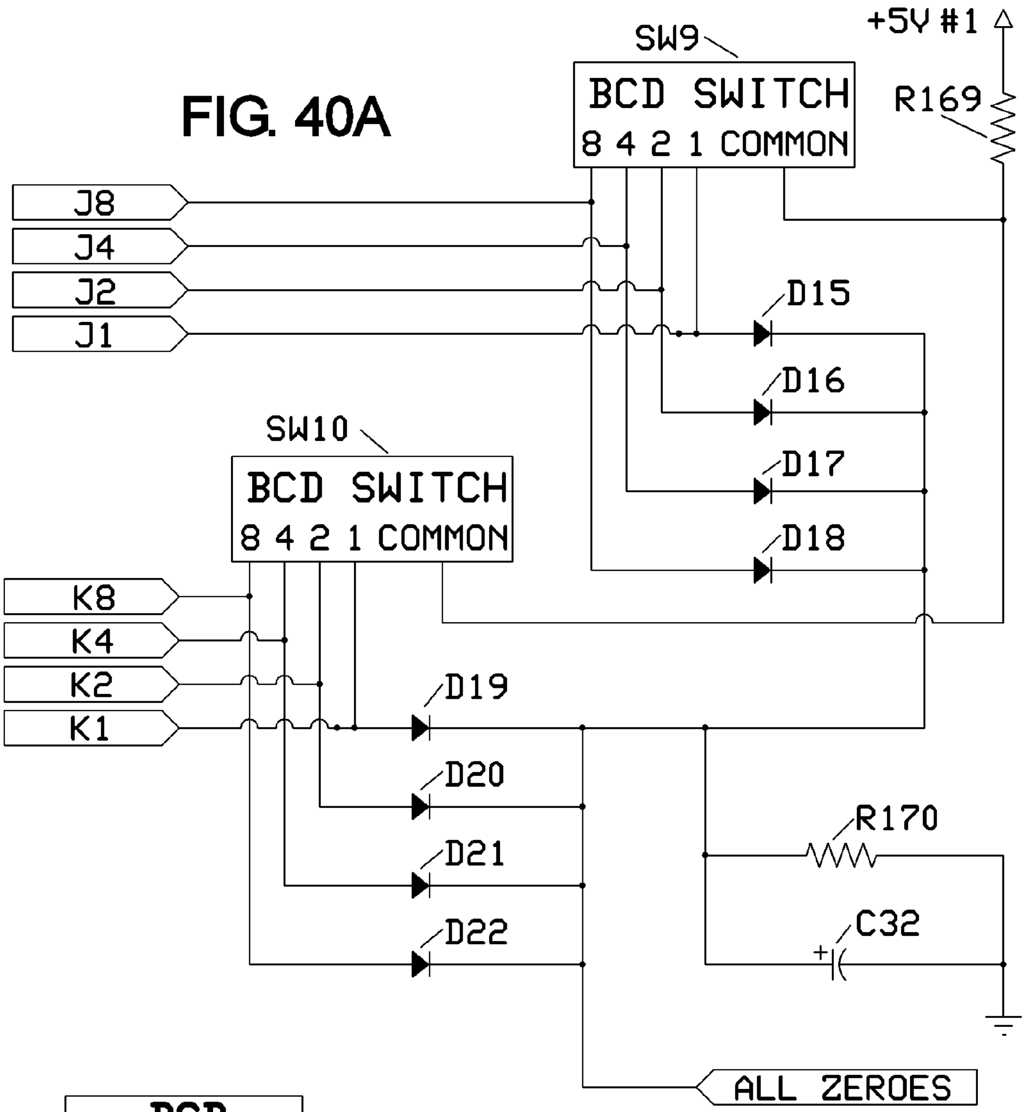
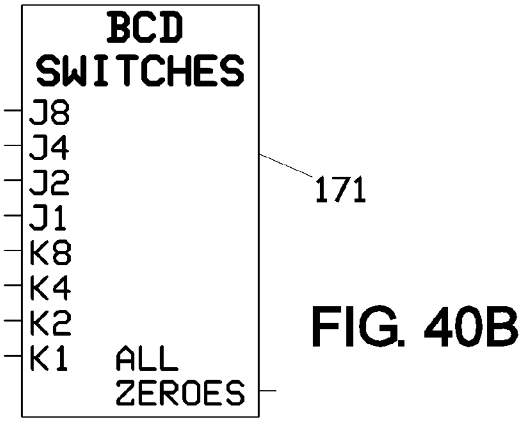
FIG. 40B

FIG. 45A
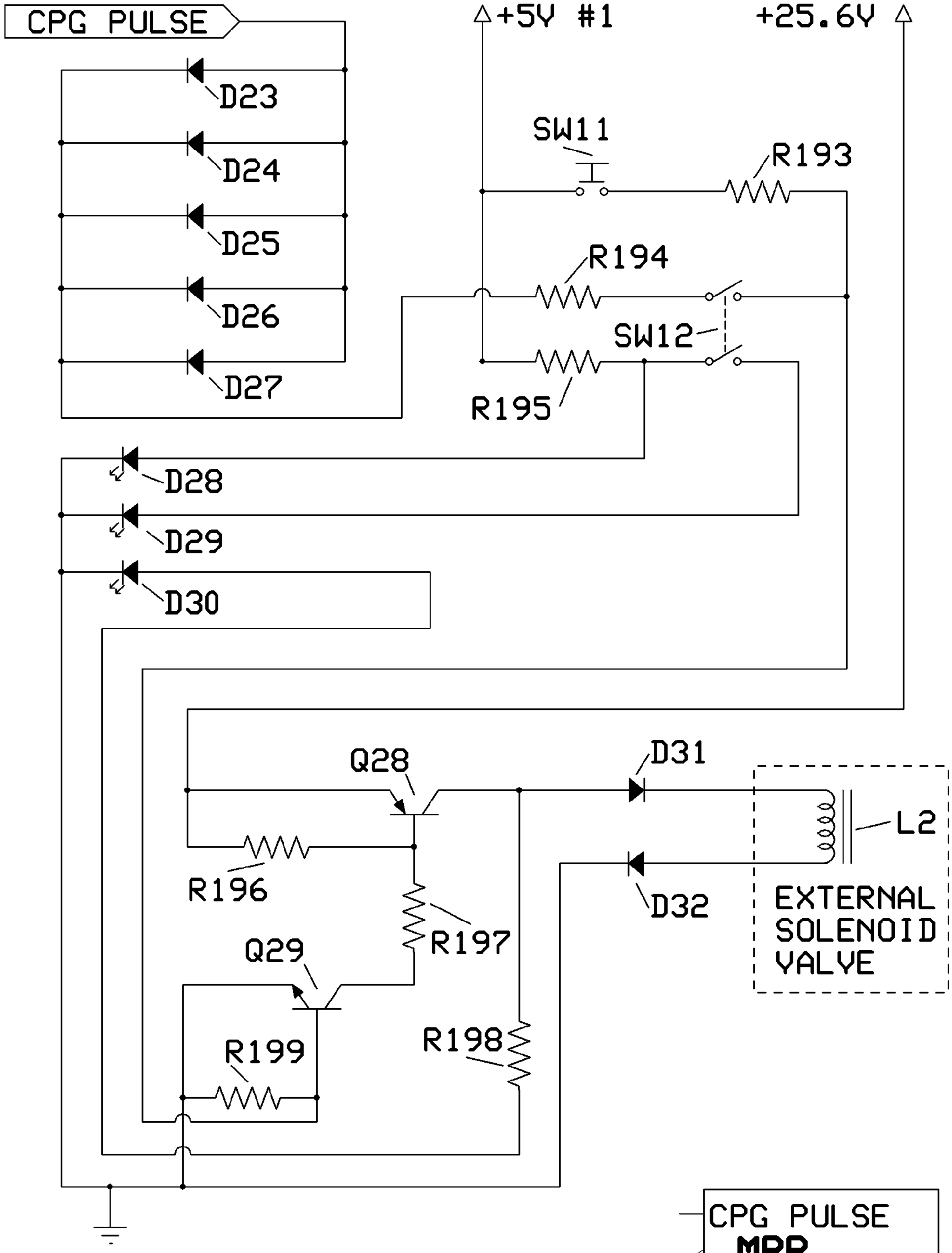
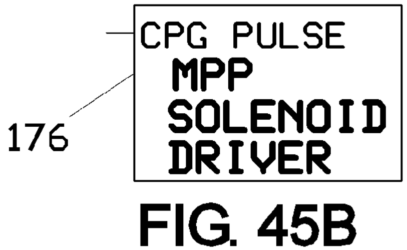
FIG. 45B

FIG. 46A
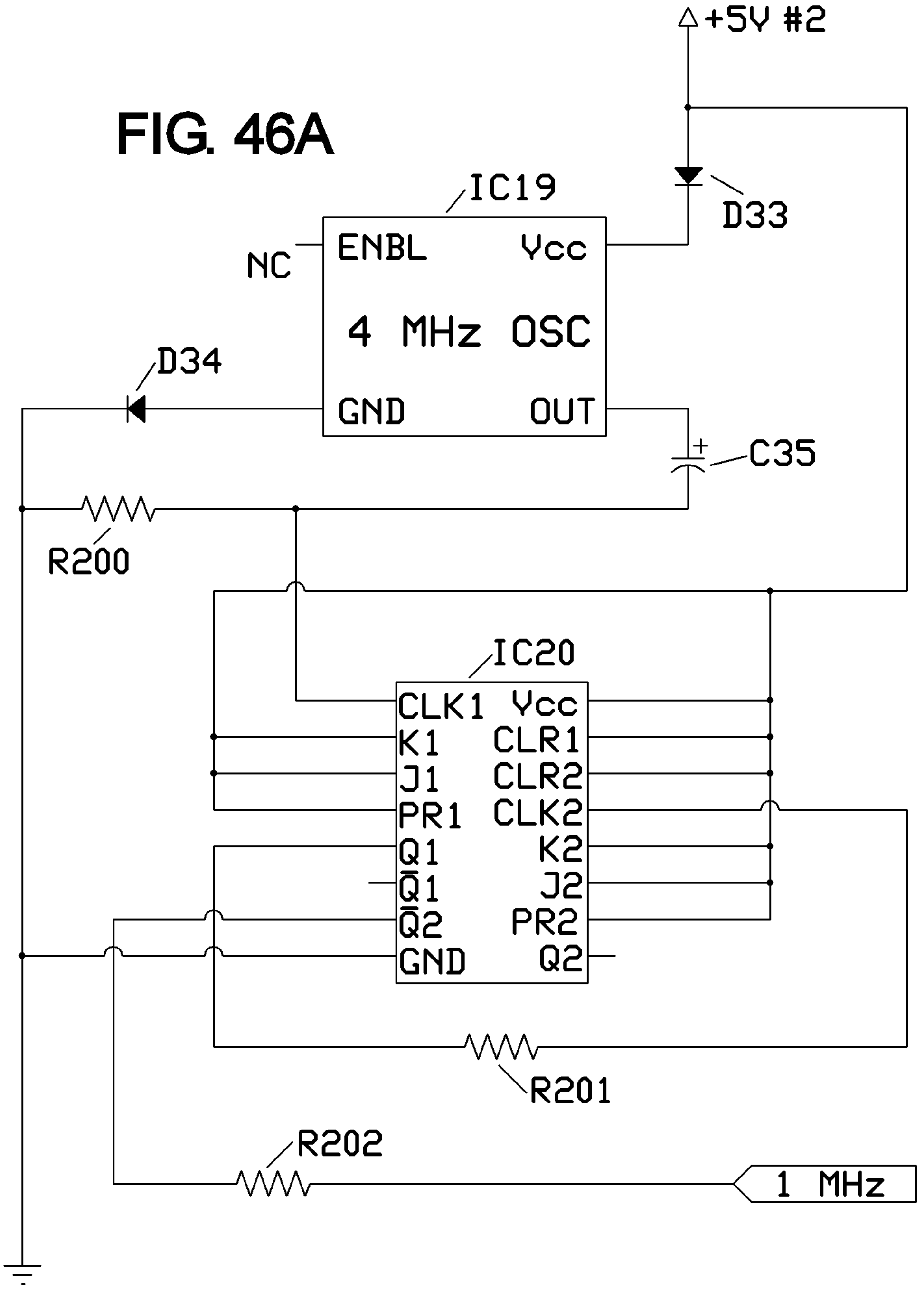
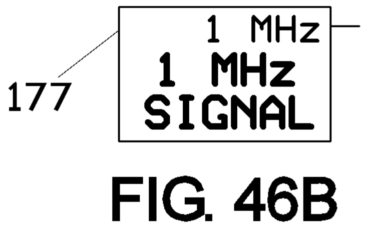
FIG. 46B

MULTIPURPOSE SEQUENTIAL DROPLET APPLICATOR

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This application relates to the sequential placement of droplets of two or more liquids to a target location on a surface for the purpose of: removing material from the surface, as for the cleaning of delicate surfaces such as fossils, art objects, or semiconductor devices; adding material, such as precipitates, polymers, and agglomerates, to the surface; or using the surface to catalyze a reaction involving substances contained in the liquids, while minimizing the formation of side products.

2. Prior Art

Numerous methods exist for the application of a single liquid to a surface: manual or automated application with cloth, tissue, sponges, rollers, brushes or other applicators; droppers; streaming and aerosol sprayers; pressurized nozzles; and droplet jets. These methods do not readily facilitate rapid repeated alternate or sequential application of more than one liquid to the same place, location, or target. Devices which apply a single liquid to a surface depend upon a property of the liquid itself, such as drying and curing or dissolving and rinsing, to produce a desired effect of coating or cleaning on the surface. Inkjet technology can apply more than one color ink to a target location, but does not do so repeatedly to any great extent, and is designed for use with specially formulated inks rather than a variety of liquid solvents and reactive liquid chemical solutions. The ink droplets, even if applied to the same target location, do not produce their desired result by means of chemical reaction with one another while mixing on the surface to which they have been applied.

Different substances on the same surface may require different liquid solvents for dissolving and removing them. The power of solvation of some liquid solvents is reduced by mixing with another liquid solvent, so that a mixture of two or more liquid solvents is less effective than a separate application of each liquid solvent. Similar to liquid solvents, or more so in this respect, would be liquids containing acids and bases, which would neutralize each other if mixed before application to the surface. Material on a surface may in some cases contain components which yield to two different liquid solvents or other active liquid chemicals, which two liquid solvents or chemicals interfere with each other if applied simultaneously. In other cases a strongly solvent or reactive liquid may be required to cause any significant removal reaction, but must not be left in contact with the surface for too long, but must be applied and rinsed away or neutralized in a rapid and metered manner.

Semiconductor cleaning baths typically use one or more liquids in sequence, each liquid removing specific surface components. Components not yet removed by a subsequent suitable cleaning agent liquid may interfere with a current cleaning agent liquid.

Polymerizing and agglomerating mixtures that cure too rapidly are difficult or impossible to use, or at least require disposable one use mixing nozzles. Some glues cure so rapidly upon mixing of the two components that the compounds are mixed by simultaneous injection into a special tube or nozzle from which the mixed product is dispensed; such dispensers do not allow much hesitation, as for examination of how the material is being applied, before the mixing nozzle becomes clogged, and otherwise require attention to dexterous operation. This method excludes epoxies which cure yet more rapidly.

Liquid solutions which when combined produce a precipitate will in general do so with such rapidity that only traces if any of the precipitate would deposit onto a surface to which the previously mixed liquid solutions were subsequently applied. Otherwise, the alternate application of the liquid solutions by current means is tedious and results in scant precipitated deposits on the surface.

Plasma techniques can be used for cleaning and depositing, but the ionized gasses may be unsuitable for some surfaces, and chemically alter some deposit materials.

Both for methods of removal, as by solvents, and basic, acidic, oxidizing, reducing, enzymatic or other chemically active liquid solutions, and for methods of deposit, as of epoxies, polymers in general, organic adhesive aggregates, or precipitates, the alternate or sequential application of liquids without mechanical automation is tedious and of uncertain uniformity. Moreover, the action to be accomplished on the surface, whether of removal or of deposit, may require so many alternate applications as to not be expeditiously accomplished even by automated mechanical movement of the target surface or of the solution application baths or nozzles.

Some chemical reactions are catalyzed heterolytically by bringing the reactants into contact with a surface made up of a catalyzing material. In some cases it is desirable to bring the reactants into contact with a catalyzing surface as rapidly as possible so as to preclude the formation of undesirable side products caused by ordinary mixing of the liquid solutions containing the two reactants. A streaming application of two reactant solutions to a catalytic surface may involve some pre-mixing of the liquid solutions prior to intimate contact with the catalytic surface, with formation of undesirable side products.

This device and method allows rapid efficient alternate or sequential application of liquid cleaning agents to a surface, so as to maximize the total cleaning or removal effect despite surface deposits resistant to and thus interfering with any particular liquid cleaning agent. This device and method can be easily combined with current spinning substrate methods of semiconductor cleaning. This device and method allows for the precise adjustment of cleaning liquids to be applied to delicate surfaces such as artwork and fossils. The force with which droplets of removal liquids are applied to a surface can be varied for the application. In some embodiments, the alternate or sequential application of droplets is combined with a pulsed or continuous flow of a gas or gasses, which may include ionized gas or plasma. The force with which a gas or gas stream is applied can be varied for the application. This device or method allows flexibility, efficiency, and fine control in the cleaning or other surface removal of moderately small surfaces having a wide variety of physical and chemical characteristics.

Because the liquid components are not mixed prior to contact with the surface, this device or method facilitates the application of rapid curing polymeric or other aggregative substances without clogging of an applicator nozzle. Without using high temperature or ionized gasses, chemically sensitive precipitates can be deposited as an accumulated layer on surfaces which may themselves be sensitive to high temperatures or ionized charges. Radiations which facilitate the formation of a desired deposit product can be applied during the depositing process, rather than afterwards, allowing better penetration of the applied substances. The common target of the liquid orifices allows rapid application of more than one liquid without movement of the nozzle head or the object containing the target surface.

This device or method allows an individual liquid droplet applied to a catalytic surface to be flattened into a thin film on that catalytic surface before the application of a droplet of a reacting liquid, thereby minimizing the production of side products. Moreover, the catalytic surface can be periodically cleaned or restored while remaining in place.

SUMMARY

In a basic embodiment, droplets of two liquids are repeatedly applied to a surface, or target area, in such a way that the droplets essentially do not contact each other prior to landing on the surface. Small nozzles directed at the target area apply the droplets, which nozzles are connected with suitable tubing to valves or pumps operated by an electrical or electronic control unit. The pumps or valves are fed through tubing from containers, which may be elevated or pressurized, holding the two liquids. The resulting action depends upon the liquids and the surface, and falls into one of three categories: removal of substance from the surface, as by solvation or other chemical action; deposit of material upon the surface, as by precipitation or polymerization; catalytic reaction of components of the liquids caused by properties of the surface. In further embodiments additional elements are added to facilitate a desired action: continuous, pulsed, or interrupting flows of air or another gas to the target area of the surface; sonic, ultrasonic, or any of various electromagnetic radiations directed at the target surface; temperature control of the liquids, and of the gasses if any, by means of heating, cooling, or insulation elements applied to the containers or along the tubing paths. Suction may be applied for removing the liquids from the area of application. Multiple nozzles, with attendant containers, tubing, valves or pumps, and control circuitry, are used for application of droplets of more than two liquids.

DRAWINGS

FIG. 1A is a 3D view of a basic two liquid droplet applicator nozzle assembly for a first embodiment.

FIGS. 1B, 1C, and 1D are respectively front, top, and side views of a basic two liquid droplet applicator nozzle head for the first embodiment.

FIG. 2 is a block diagram of the overall components of the first embodiment.

FIG. 3 thru FIG. 10 show circuitry for a two channel pulse provider used in the first embodiment.

Figure 11A:
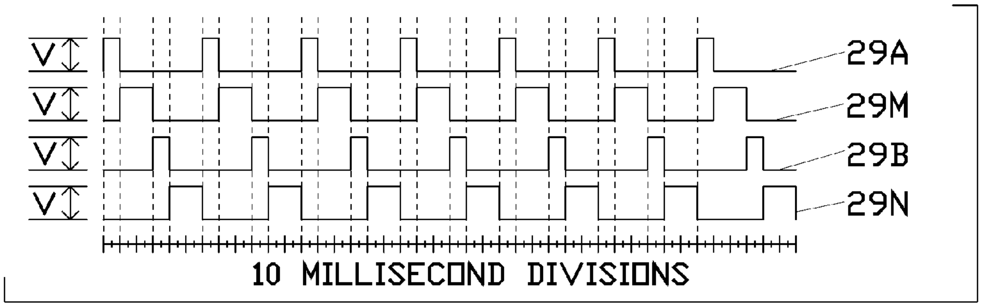

FIG. 11A, traces 29A and 29B, show the idealized pulse output needed to control the emission of droplets for the first embodiment, as provided by the two channel pulse provider; traces 29A, 29B, 29M, and 29N show the pulse output needed for a four channel pulse provider, as described in a third embodiment, or as possible from a multichannel pulse provider, as described in a fourth embodiment; with traces 29M and 29N showing the pulses to control pulsed air or gas flow.

Figure 11B:
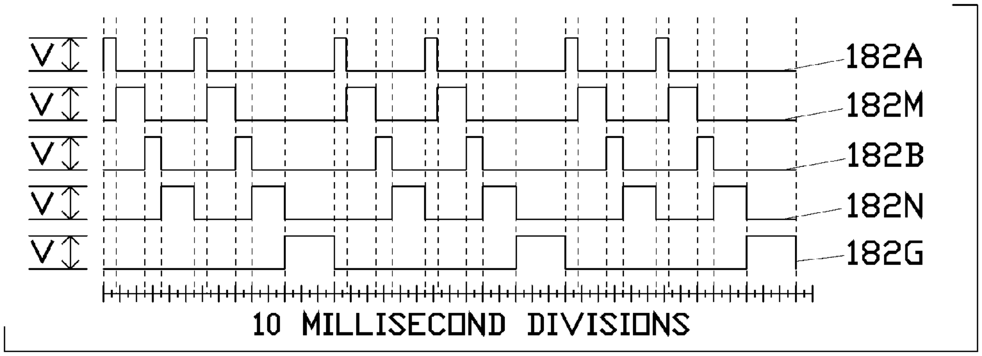

FIG. 11B represents the idealized pulses used in a fourth embodiment, as produced by a multichannel pulse provider.

Figure 11C:
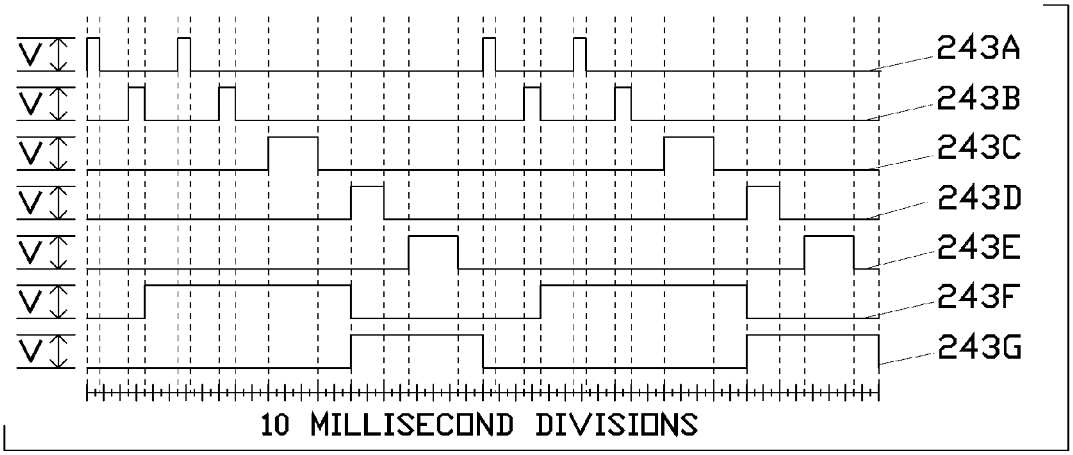

FIG. 11C represents the idealized pulses used in a fifth embodiment, as produced by a computerized pulse provider.

FIG. 12A to 12H illustrate the alternate placement of droplets with a relatively long period between the emission of each droplet.

FIG. 13A to 13H illustrate the alternate placement of droplets with a relatively short period between the emission of each droplet.

Figure 14A:
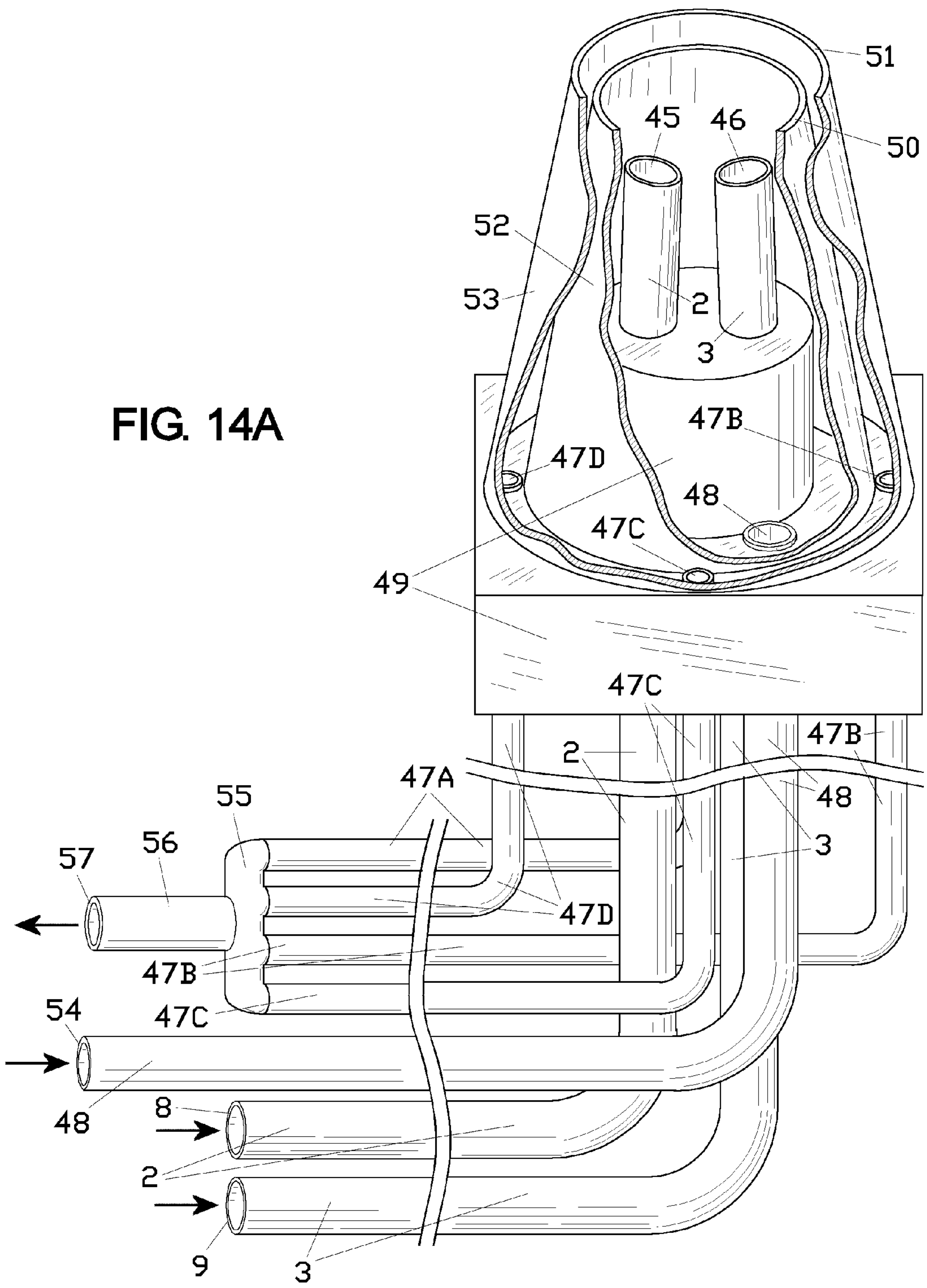
Figure 14C:
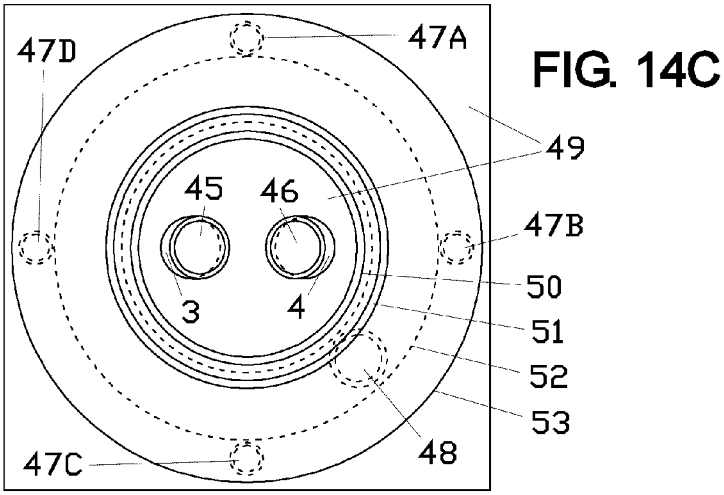
Figure 14B:
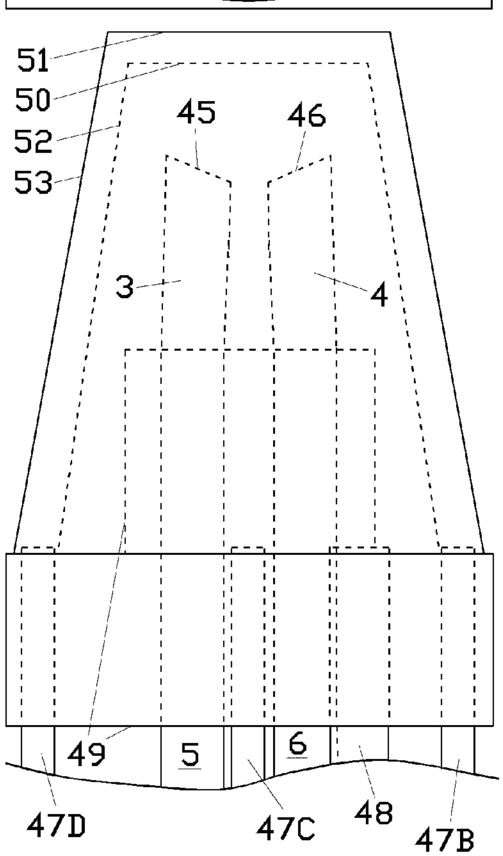
Figure 14D:
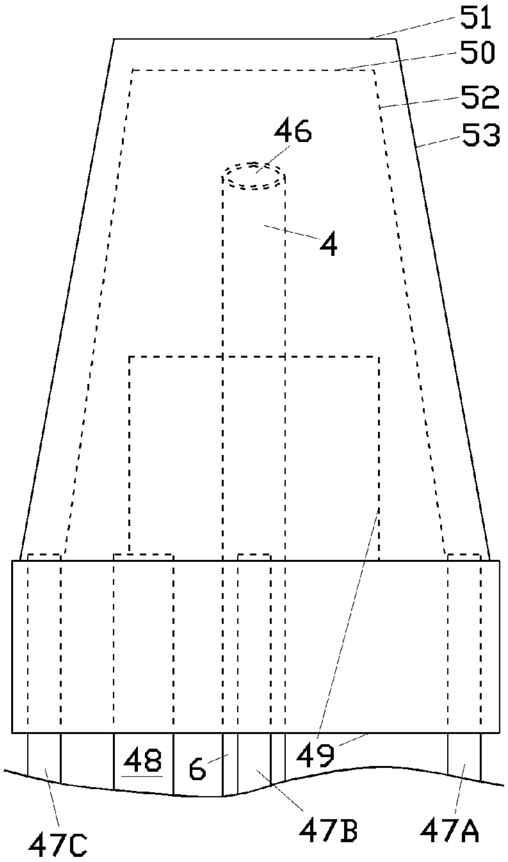
Figure 15:
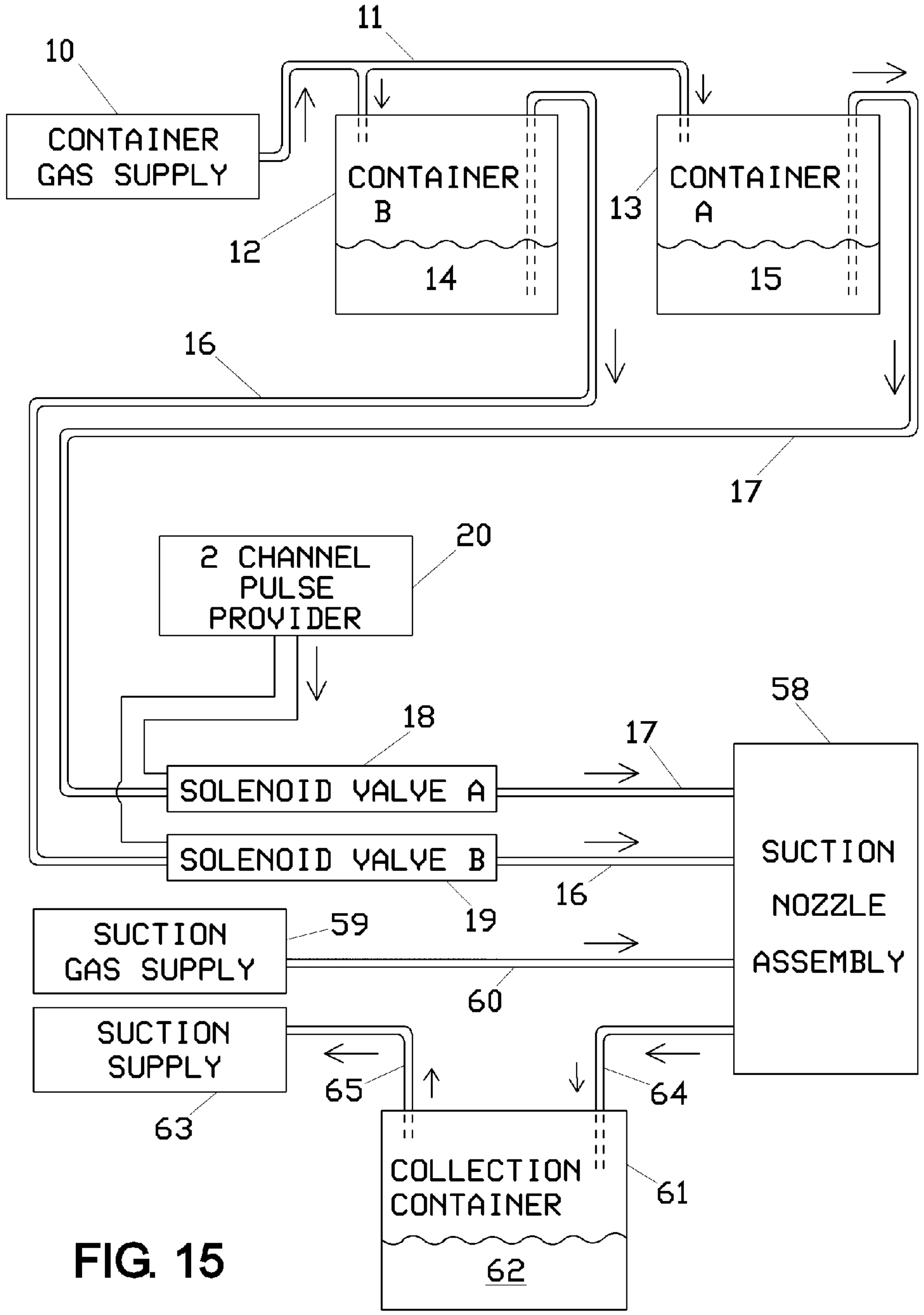

FIG. 14A is a 3D view of a basic two liquid droplet applicator nozzle assembly with a suction hood attached, for a second embodiment FIGS. 14B, 14C, and 14D are respectively front, top, and side views of a basic two liquid droplet applicator nozzle head with a suction hood attached, for the second embodiment FIG. 15 is a block diagram of the overall components of the second embodiment.

Figure 16:
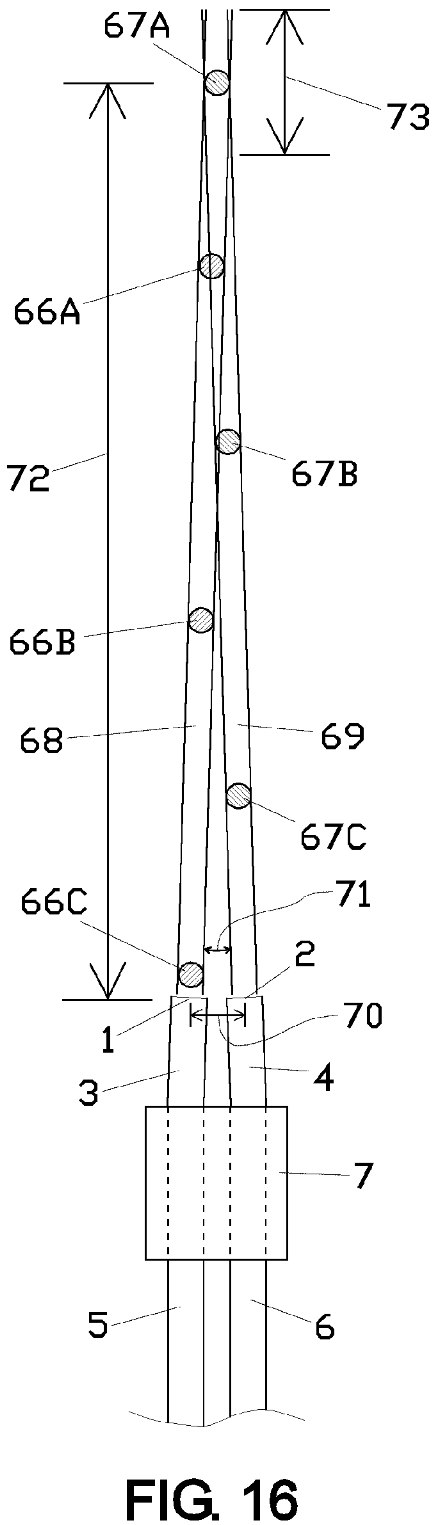

FIG. 16 illustrates the important elements of nozzle placement and orientation with regard to a relatively long distance from the droplet target.

Figure 17:
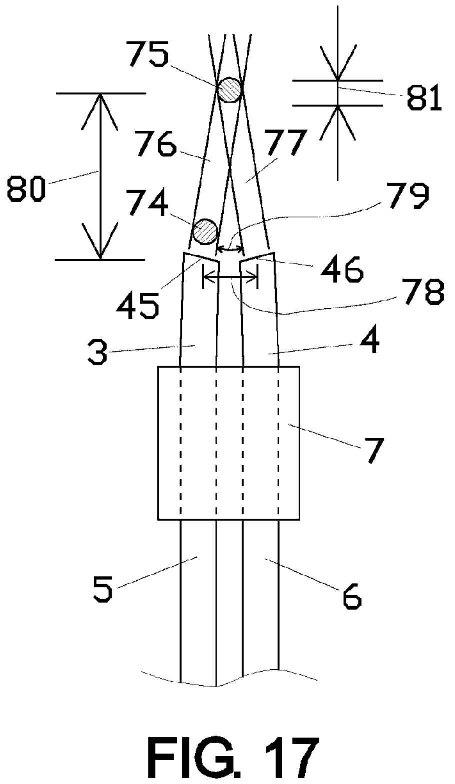

FIG. 17 illustrates the important elements of nozzle placement and orientation with regard to a relatively short distance from the droplet target.

Figure 18A:
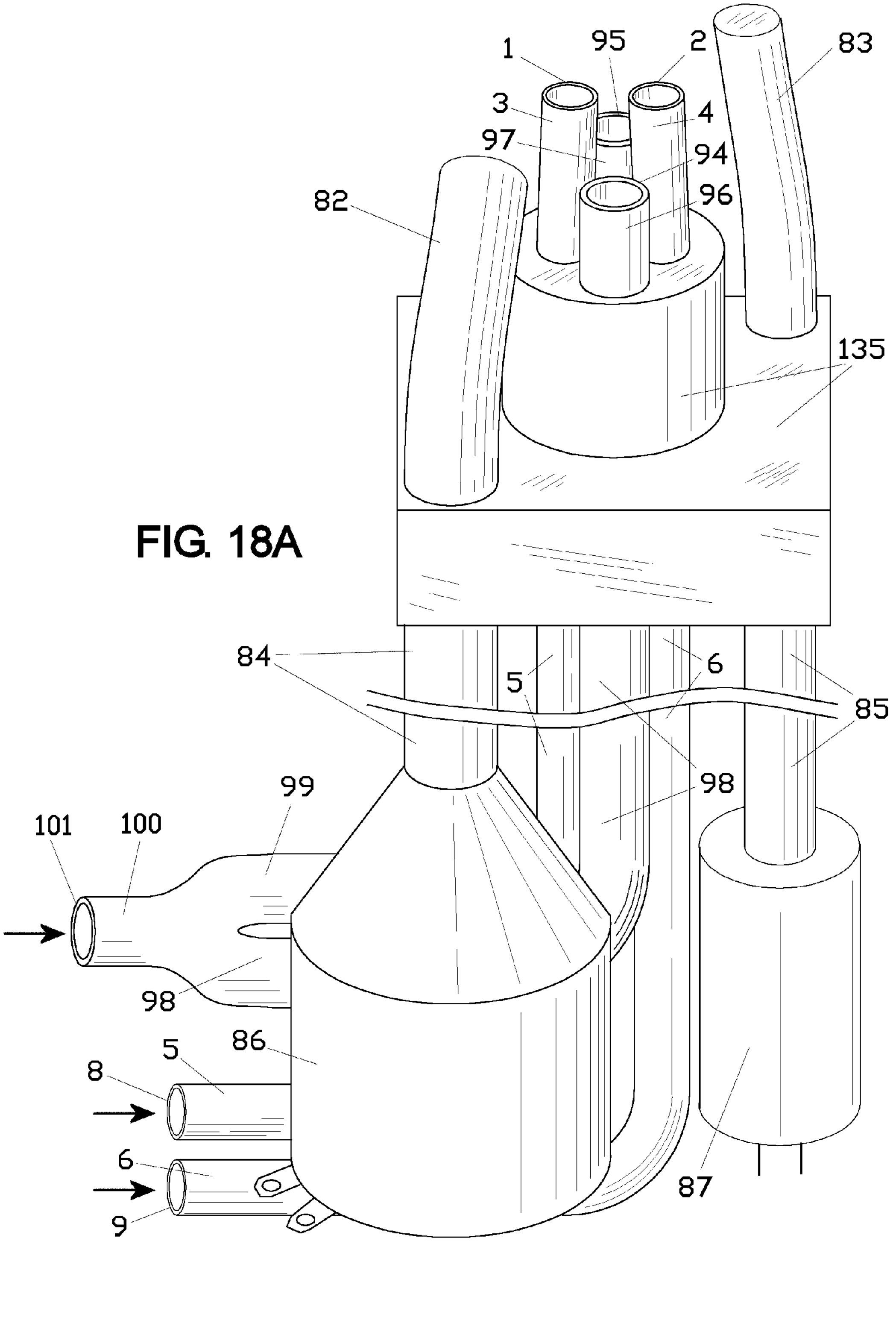

FIG. 18A is a 3D view of a two liquid droplet applicator nozzle assembly with gas orifices and directed ultrasonic and LED radiation, for the third embodiment.

Figure 18C:
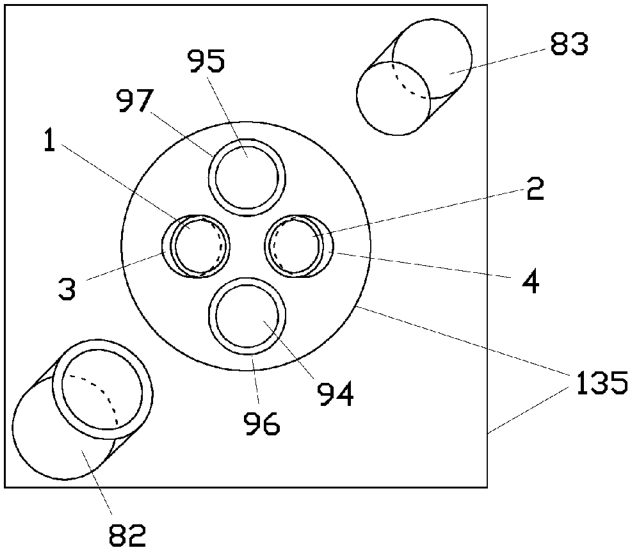
Figure 18B:
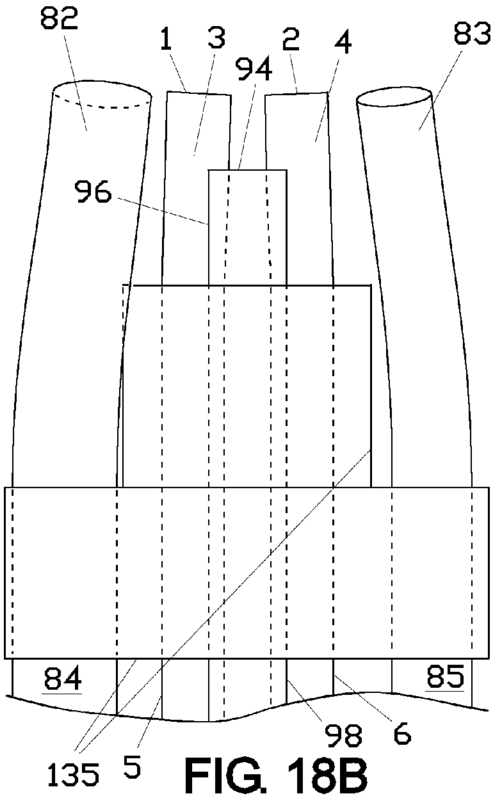
Figure 18D:
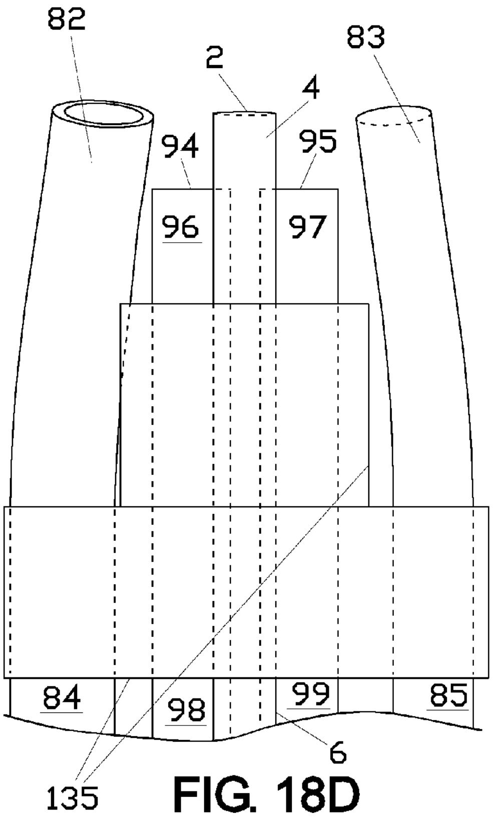

FIGS. 18B, 18C, and 18D are respectively front, top, and side views of a two liquid droplet applicator nozzle head with gas orifices and directed ultrasonic and LED radiation, for the third embodiment.

Figure 19:
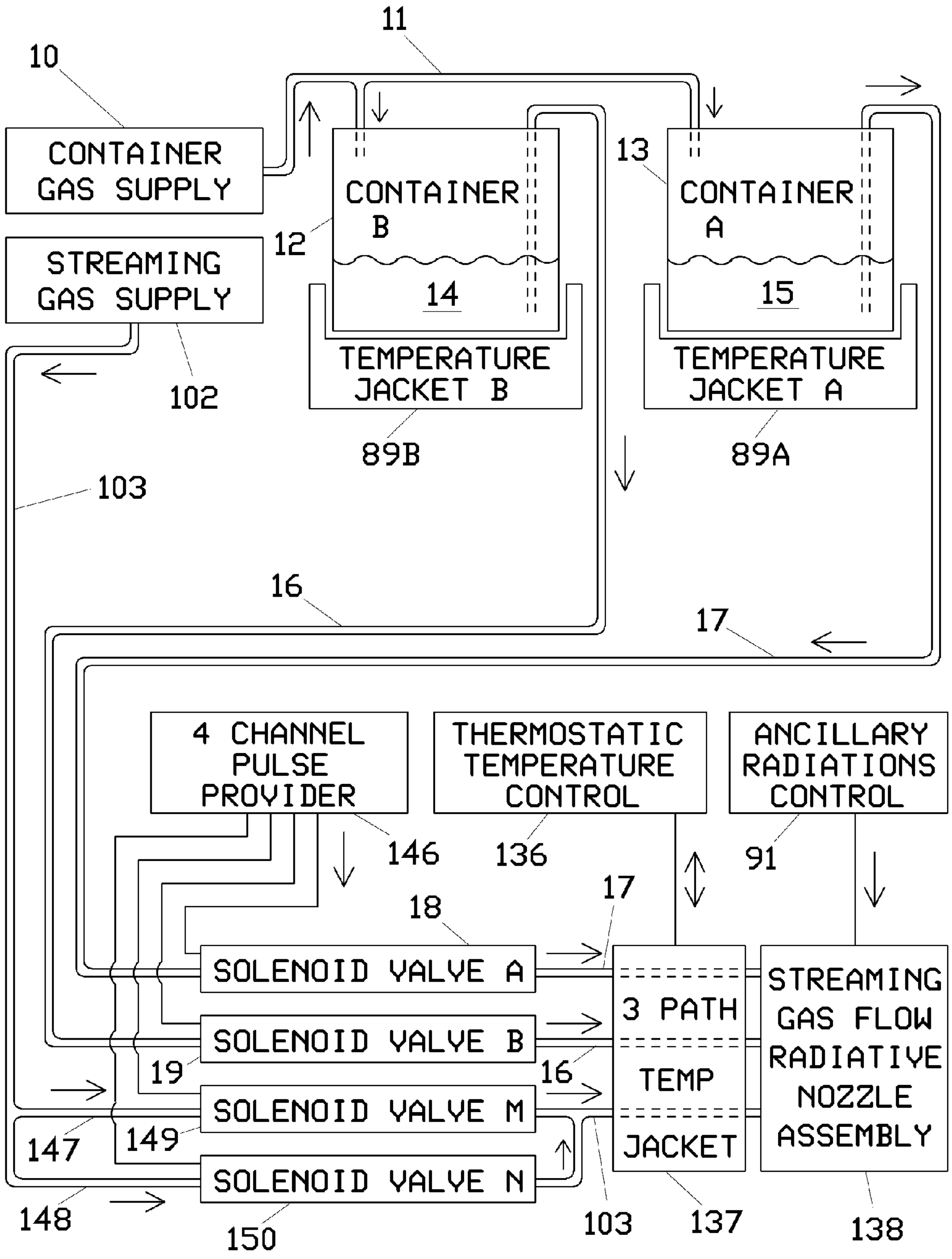

FIG. 19 is a block diagram of the overall components of the third embodiment.

Figure 20:
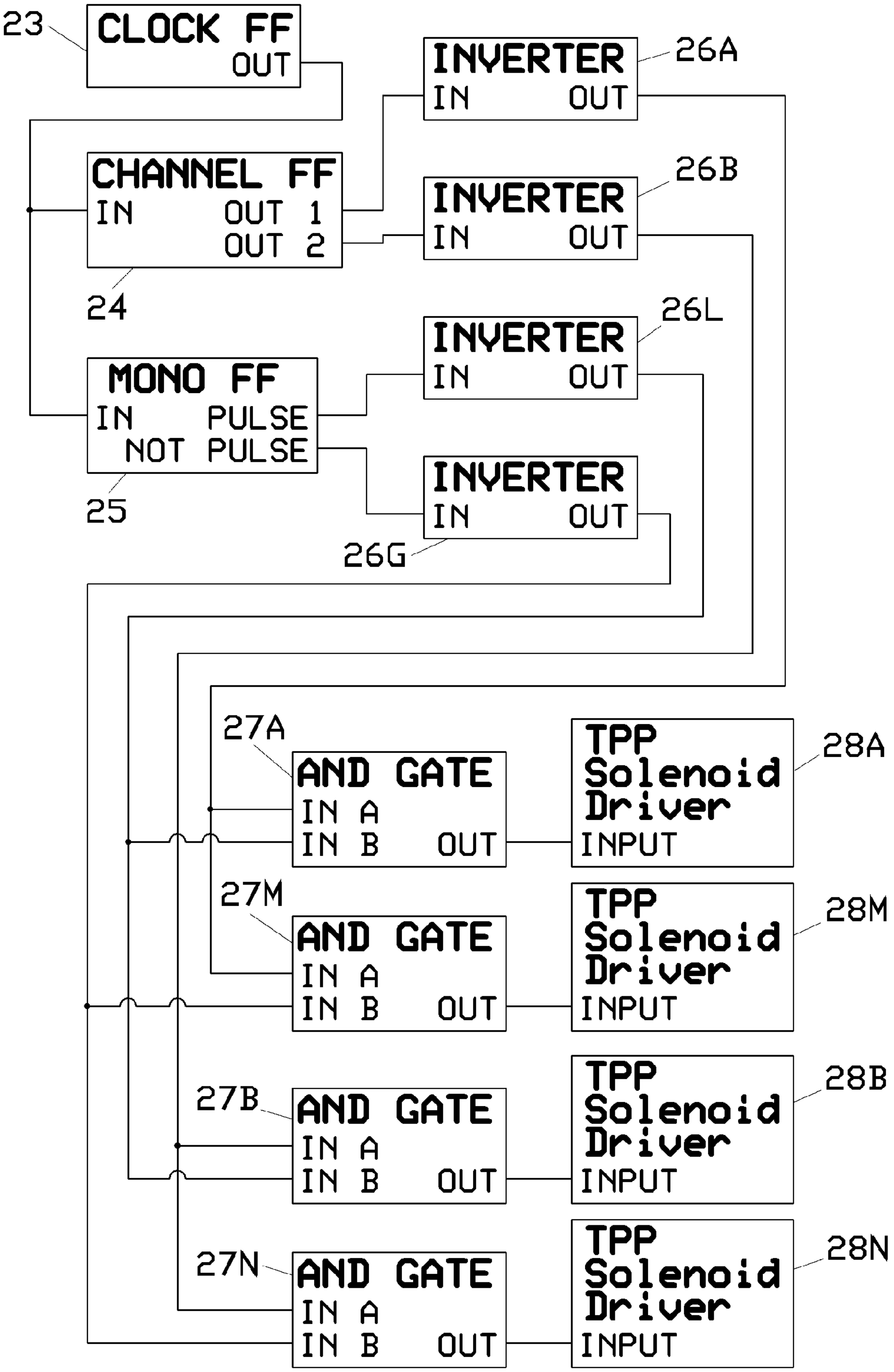

FIG. 20 is the circuit diagram for a four channel pulse provider, as used in the third embodiment; it is mostly derived from the two channel pulse provider described in the first embodiment.

Figure 21:
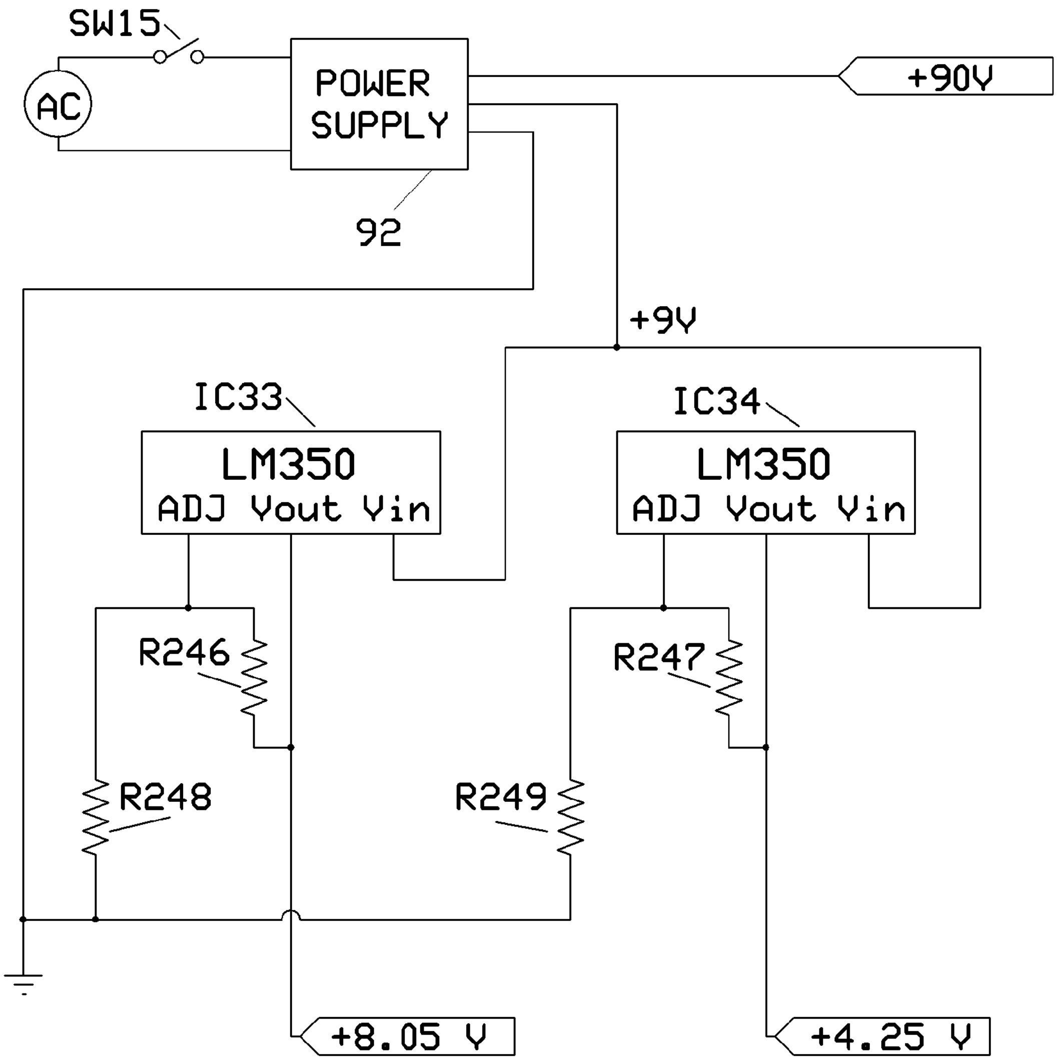
Figure 22:
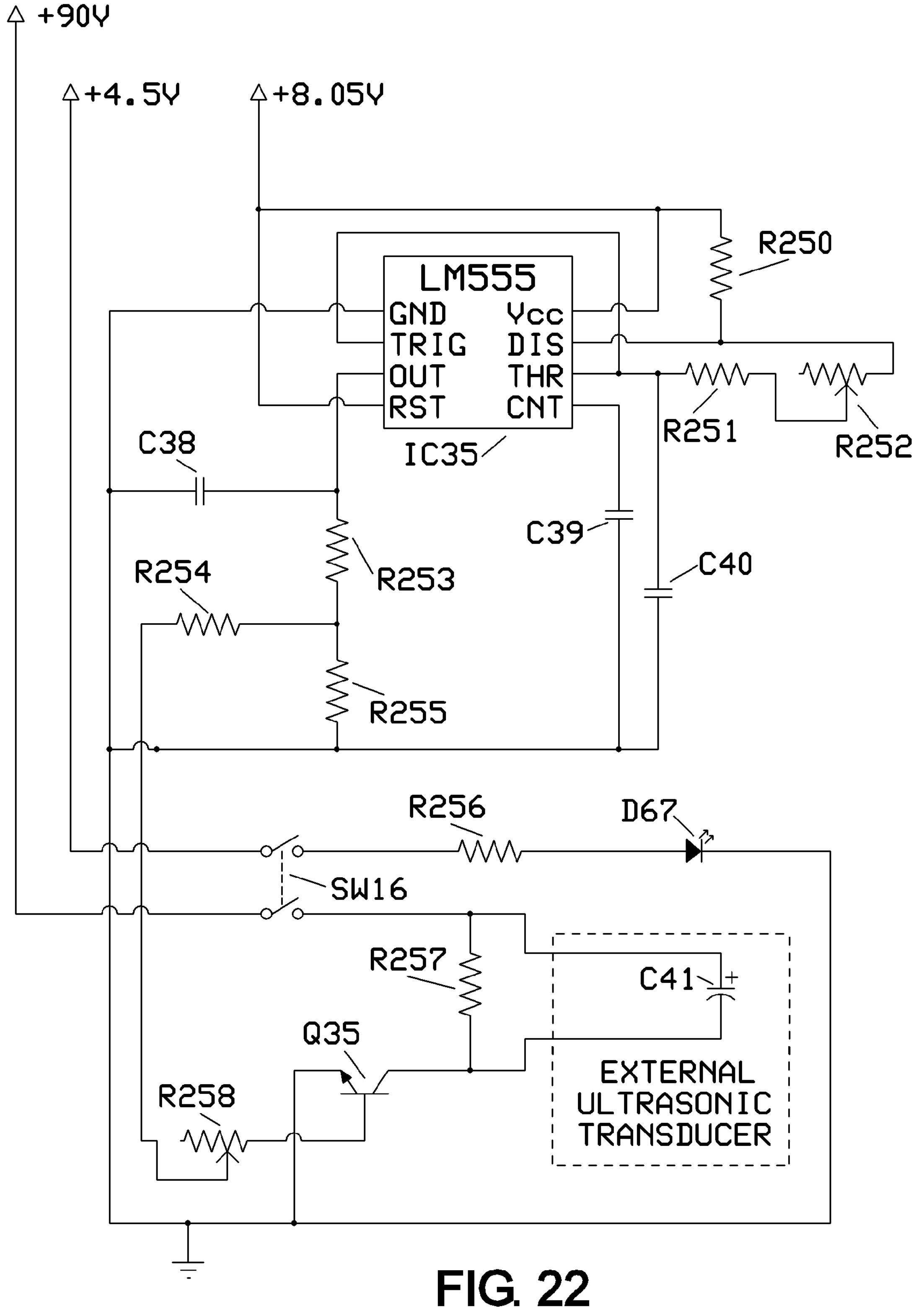
Figure 23:
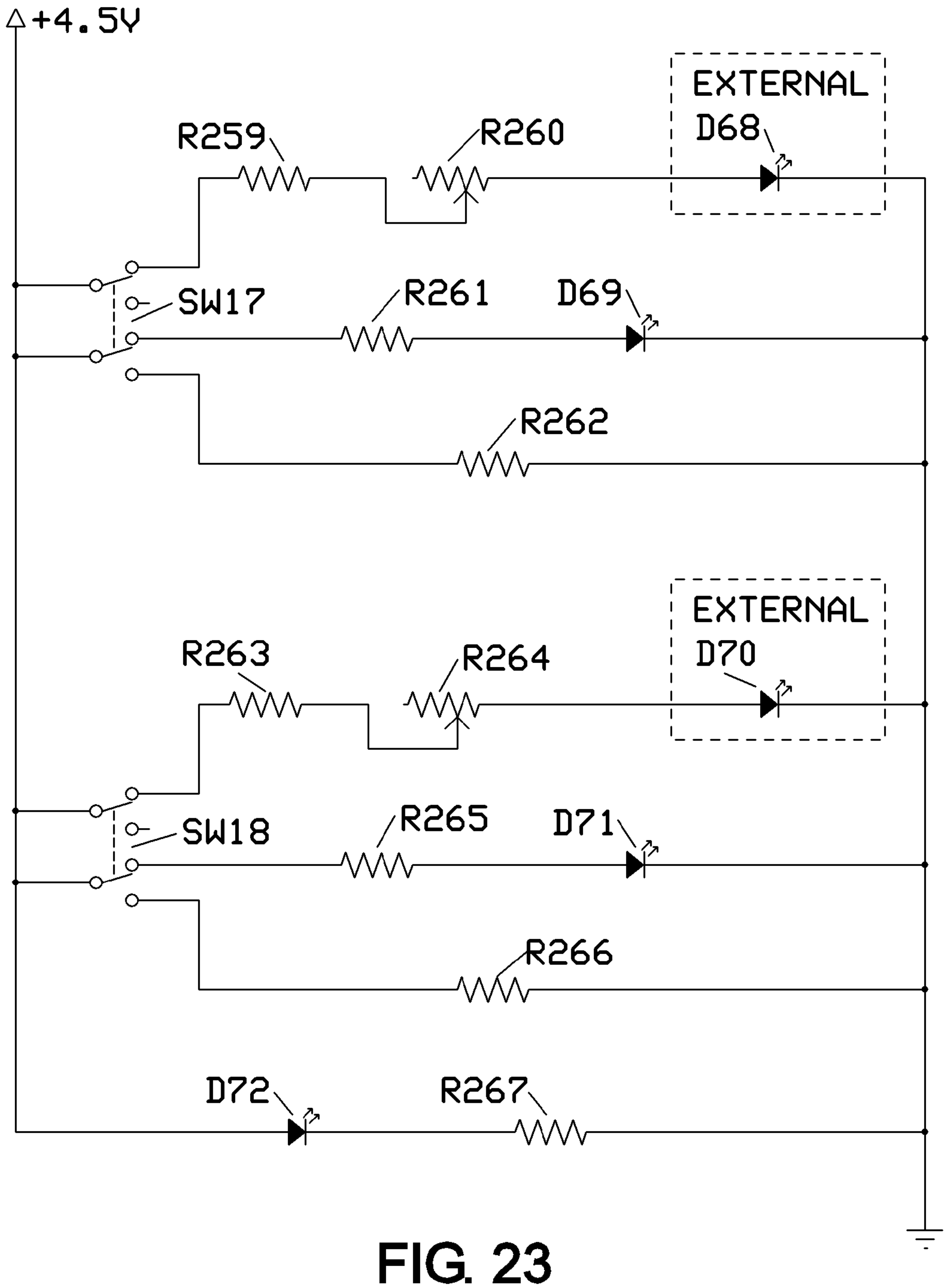

FIG. 21 thru FIG. 23 shows circuitry for ultrasonic radiation and ultraviolet and infrared LED radiation.

FIG. 24A and FIG. 24B show an end view and a cutaway view, respectively, of a three path heating jacket described in the third embodiment.

FIG. 27A to 27H illustrate the alternate placement of droplets with a relatively long period between the emission of each droplet, while a paired gas stream blows on the target area.

FIG. 28A to 28H illustrate the alternate placement of droplets with a relatively short period between the emission of each droplet, while a paired gas stream blows on the target area.

FIG. 29A to 29H illustrate the alternate placement of droplets with a relatively short period between the emission of each droplet, while a somewhat stronger paired gas stream than in FIG. 28A to 28H blows on the target area.

Figure 30A:
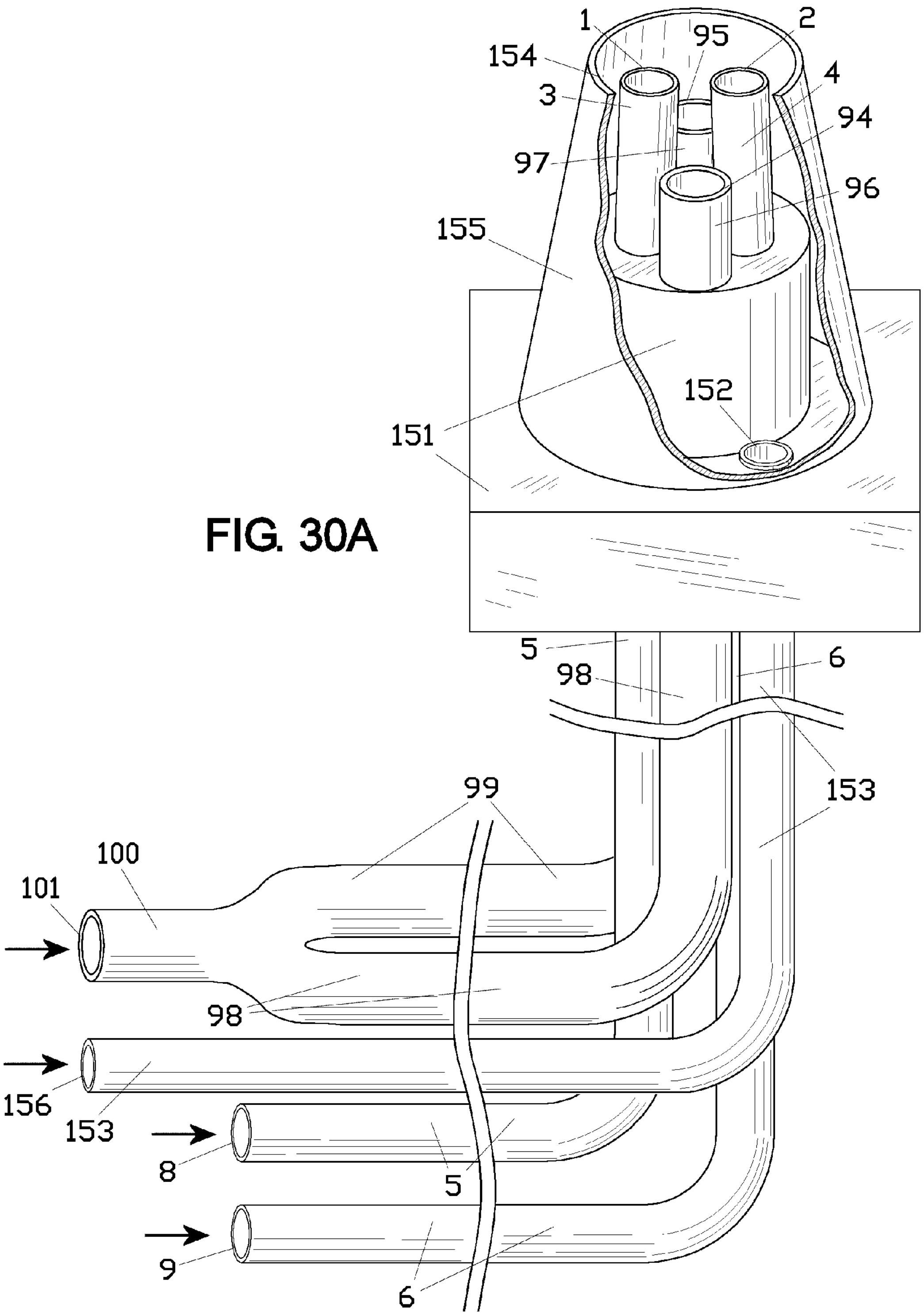

FIG. 30A is a 3D view of a two liquid droplet applicator nozzle assembly with gas orifices and a hood for application of an intermittent gas flow to the target, for a fourth embodiment.

Figure 30C:
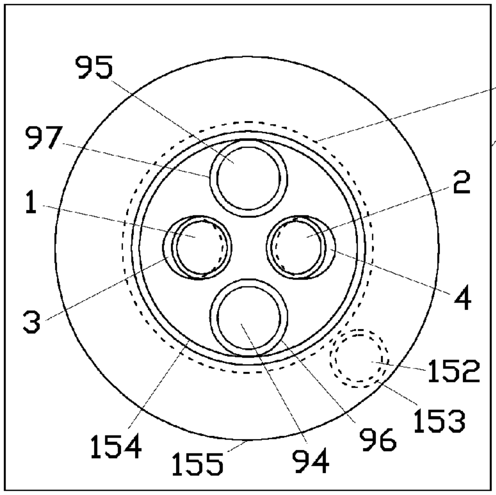
Figure 30B:
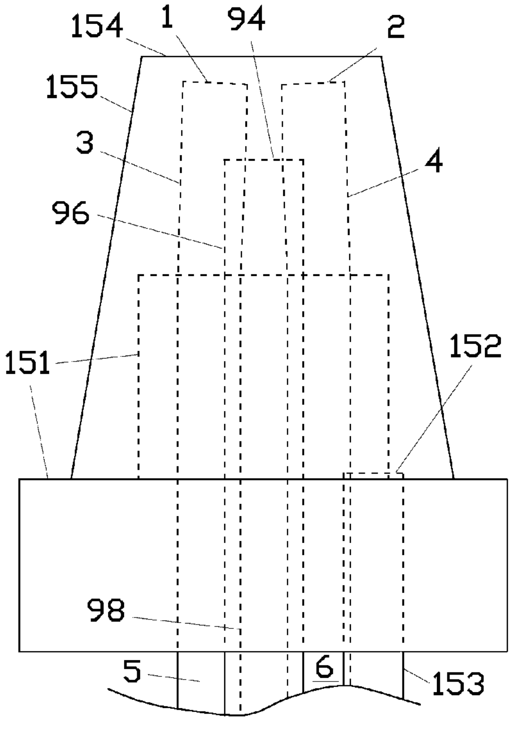
Figure 30D:
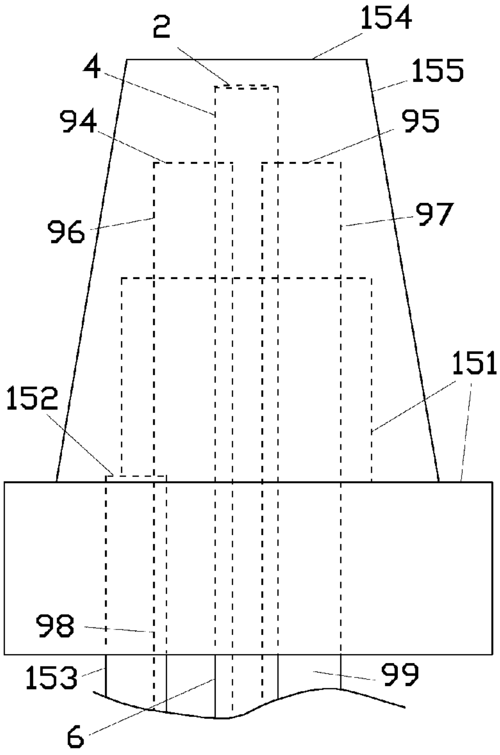

FIGS. 30B, 30C, and 30D are respectively front, top, and side views of a two liquid droplet applicator nozzle head with gas orifices and a hood for application of an intermittent gas flow to the target, for the fourth embodiment.

Figure 31:
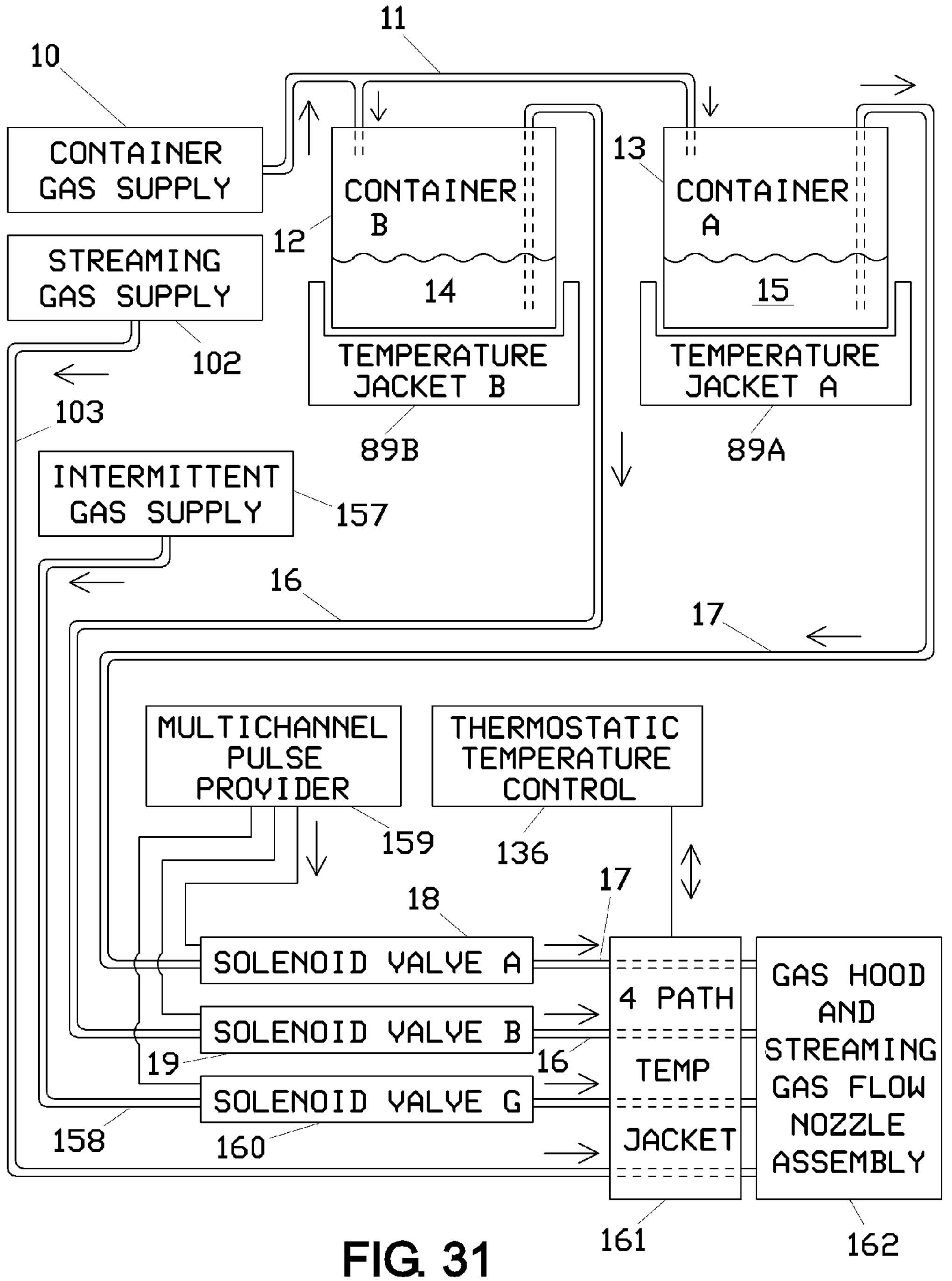

FIG. 31 is a block diagram of the overall components of the fourth embodiment.

FIG. 32 thru FIG. 51 show the circuitry for the multichannel pulse provider used in the fourth embodiment; BCD is used throughout for binary coded decimal.

Figure 32:
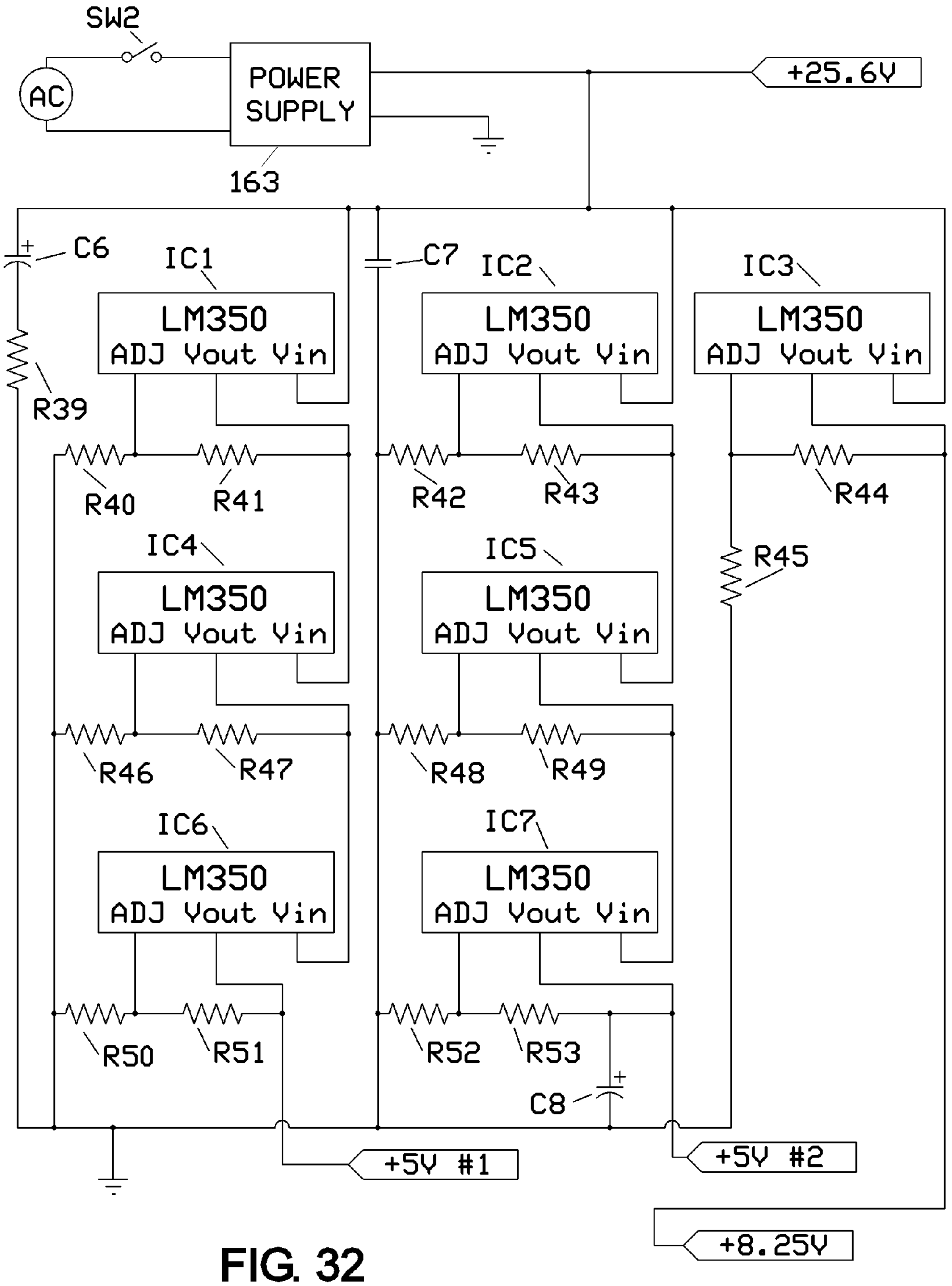

FIG. 32 shows the power supply and voltage sources.

FIGS. 33A and 33B show the start and stop control, and symbol thereof.

FIGS. 34A and 34B show the high resolution timer switch, and symbol thereof.

FIGS. 35A and 35B show the high range timer switch, and symbol thereof.

Figure 36A:
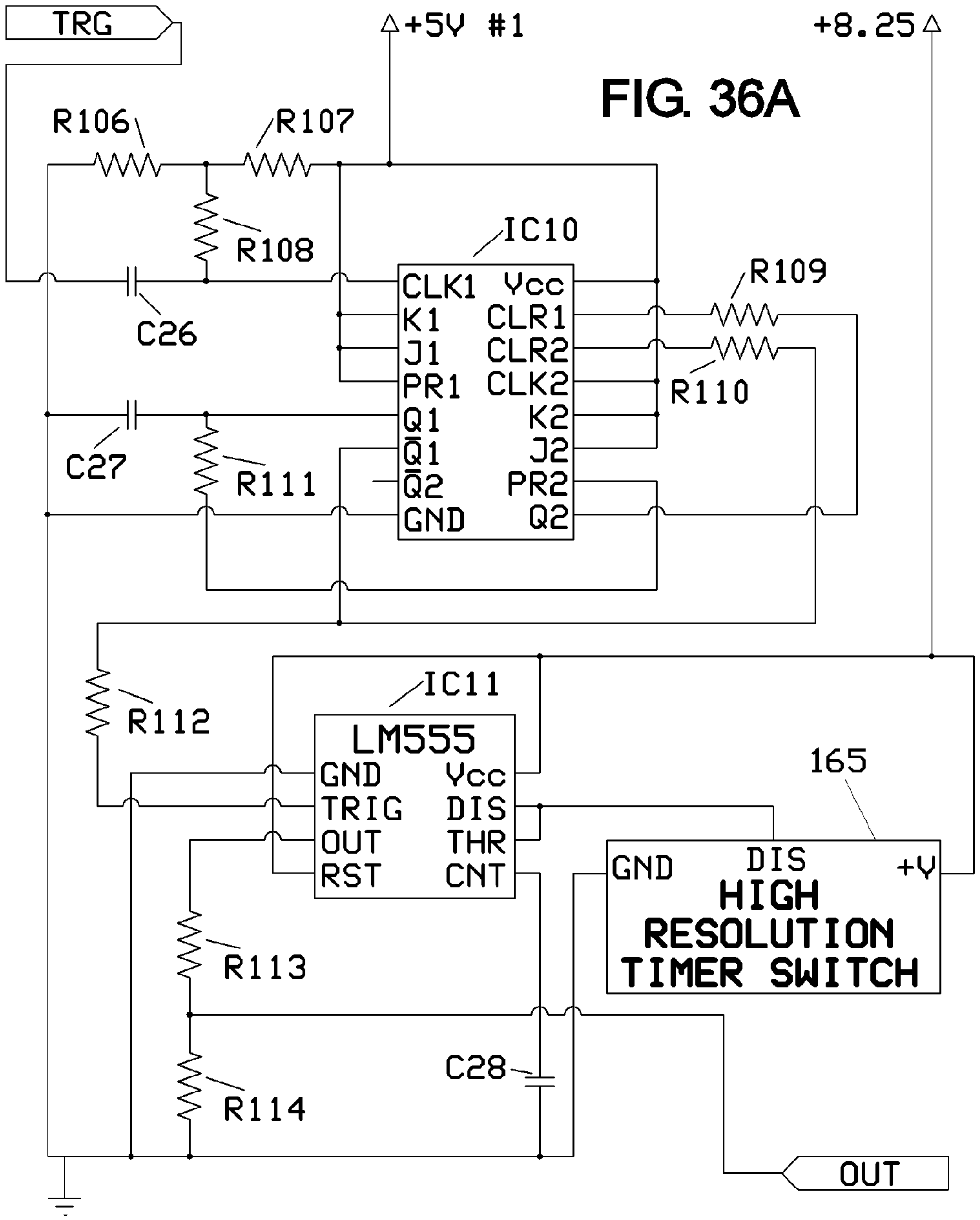
Figure 36B:

FIGS. 36A and 36B show the chainable pulse generator, CPG, high resolution, and symbol thereof.

Figure 37A:
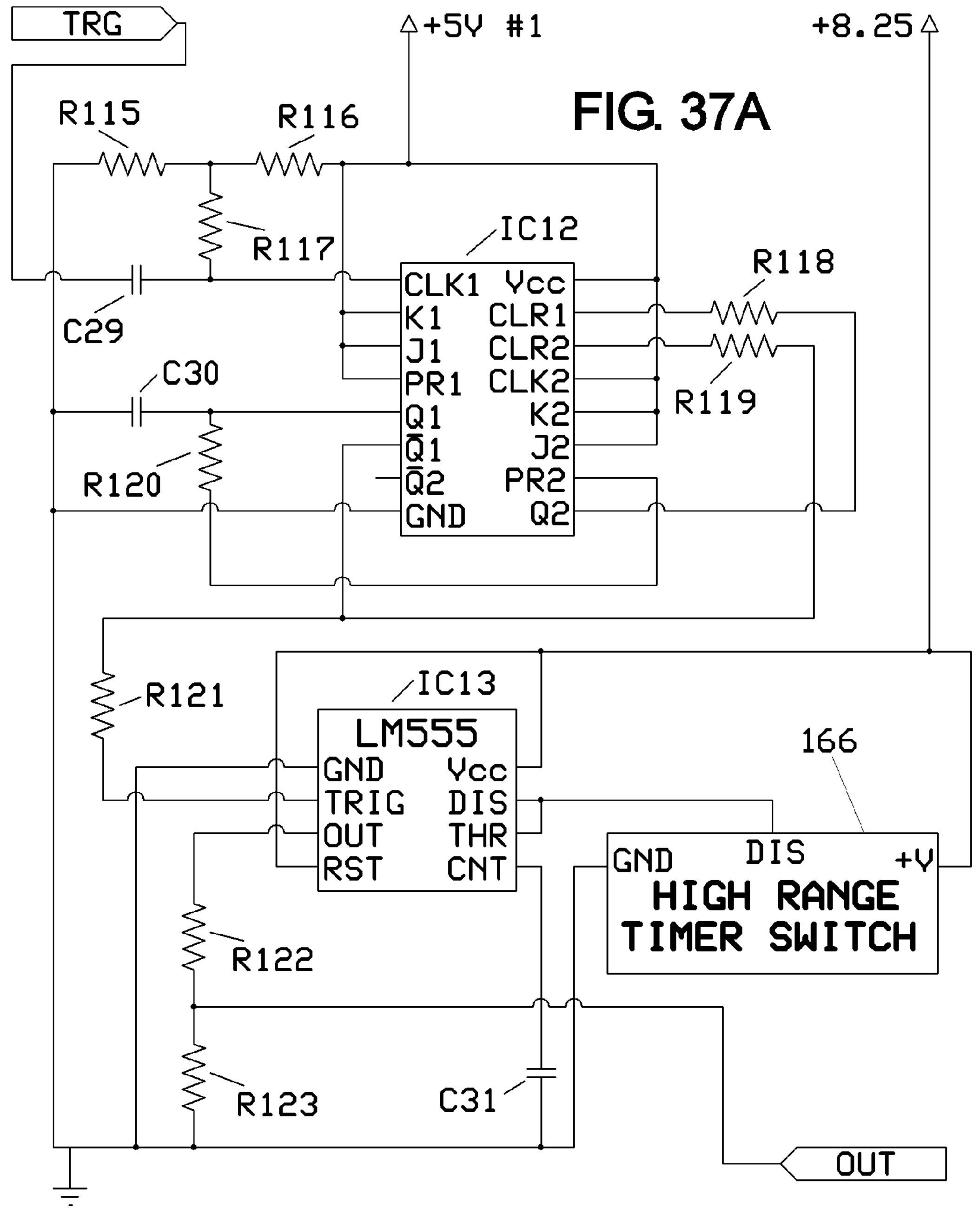
Figure 37B:
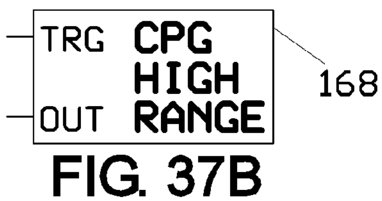

FIGS. 37A and 37B show the chainable pulse generator, CPG, high range, and symbol thereof.

Figure 38A:
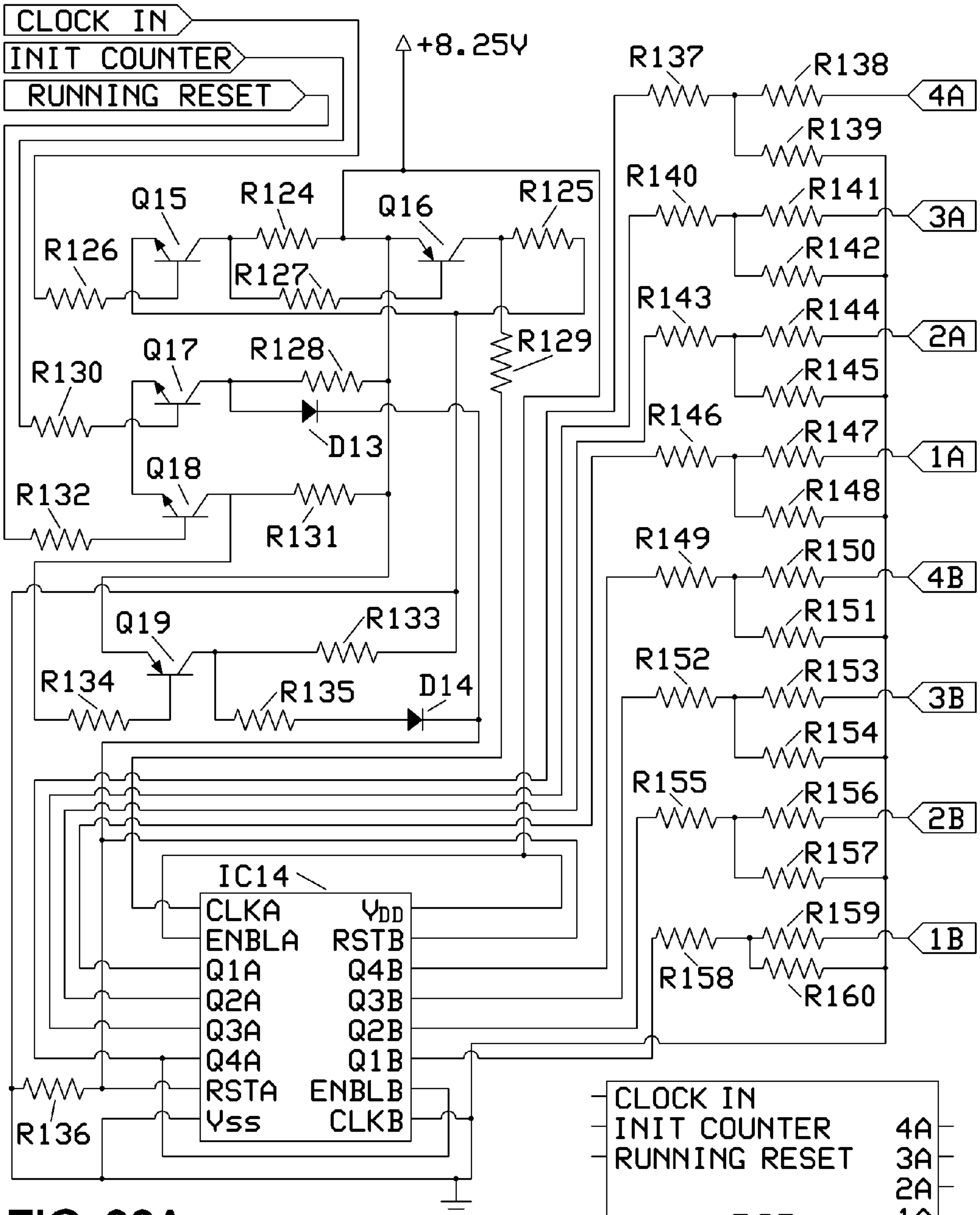
Figure 38B:
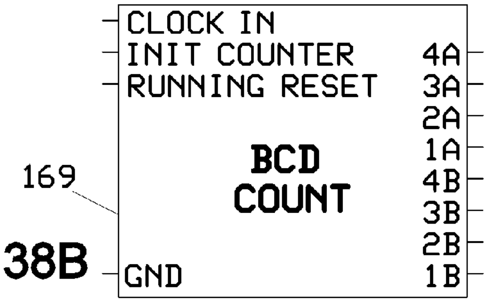

FIGS. 38A and 38B show the BCD counter, and symbol thereof.

FIGS. 39A and 39B show the BCD comparator, and symbol thereof.

FIGS. 40A and 40B show the binary coded decimal switches, and symbol thereof.

Figure 41A:
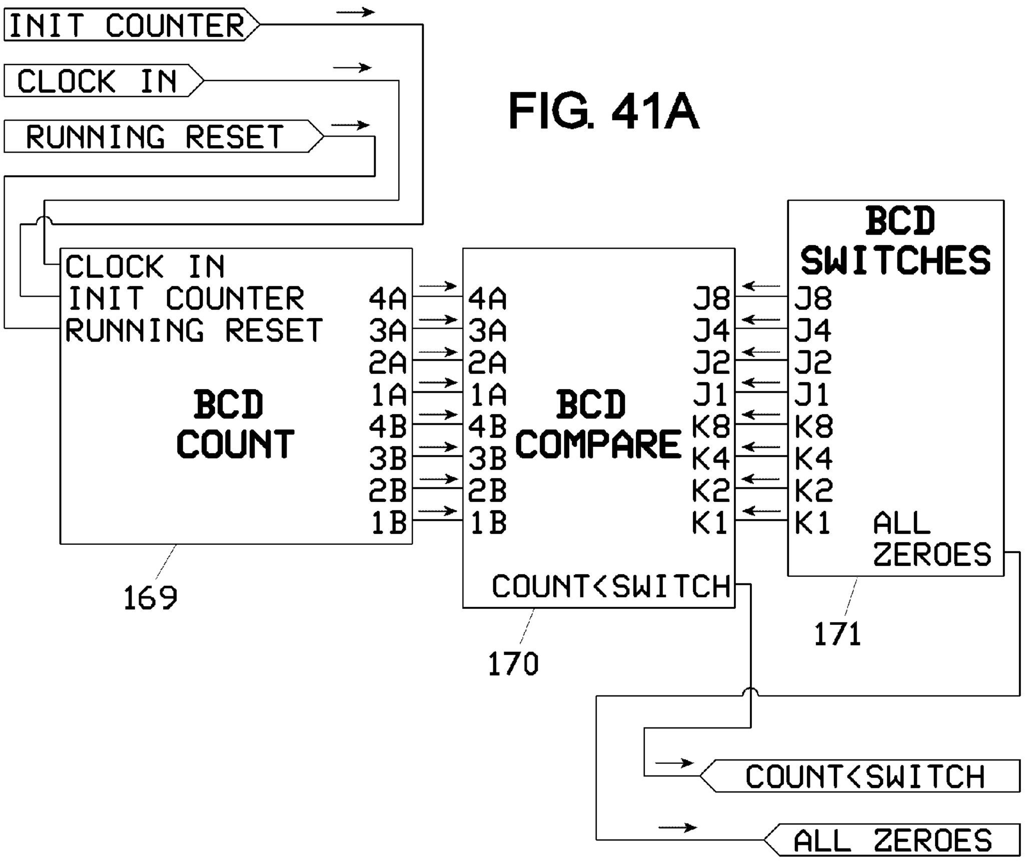
Figure 41B:
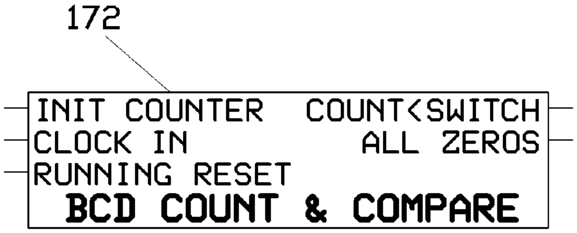

FIGS. 41A and 41B show the BCD count & compare, and symbol thereof.

Figure 42A:
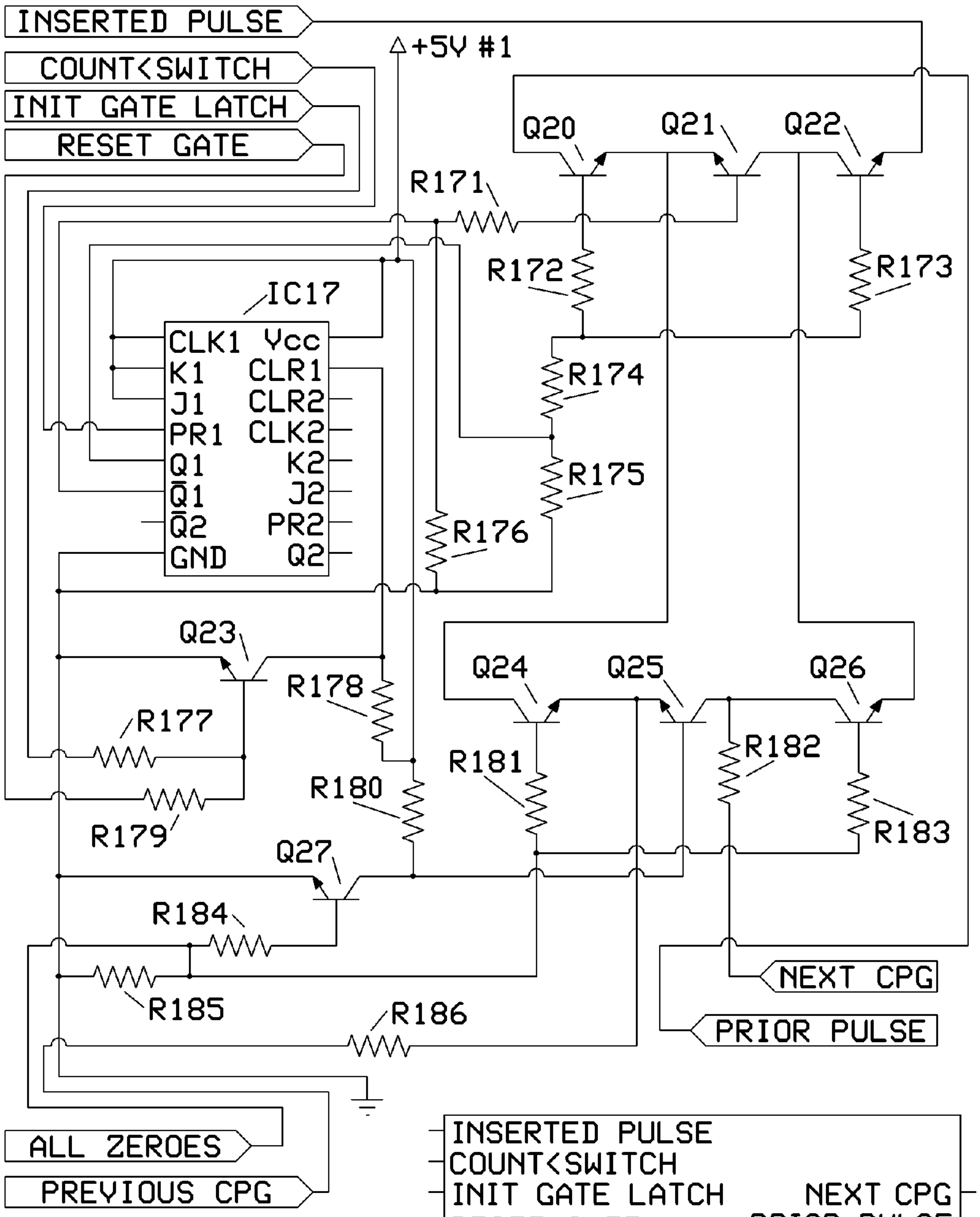
Figure 42B:
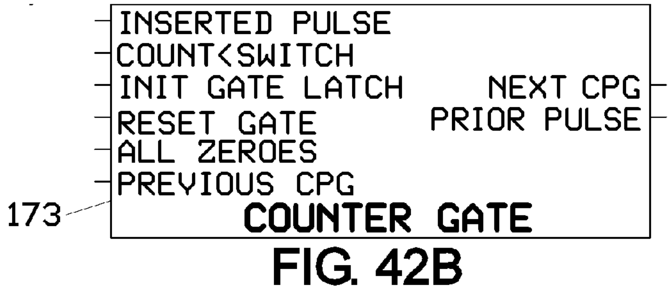

FIGS. 42A and 42B show the counter gate, and symbol thereof.

Figures 43A, 43B:
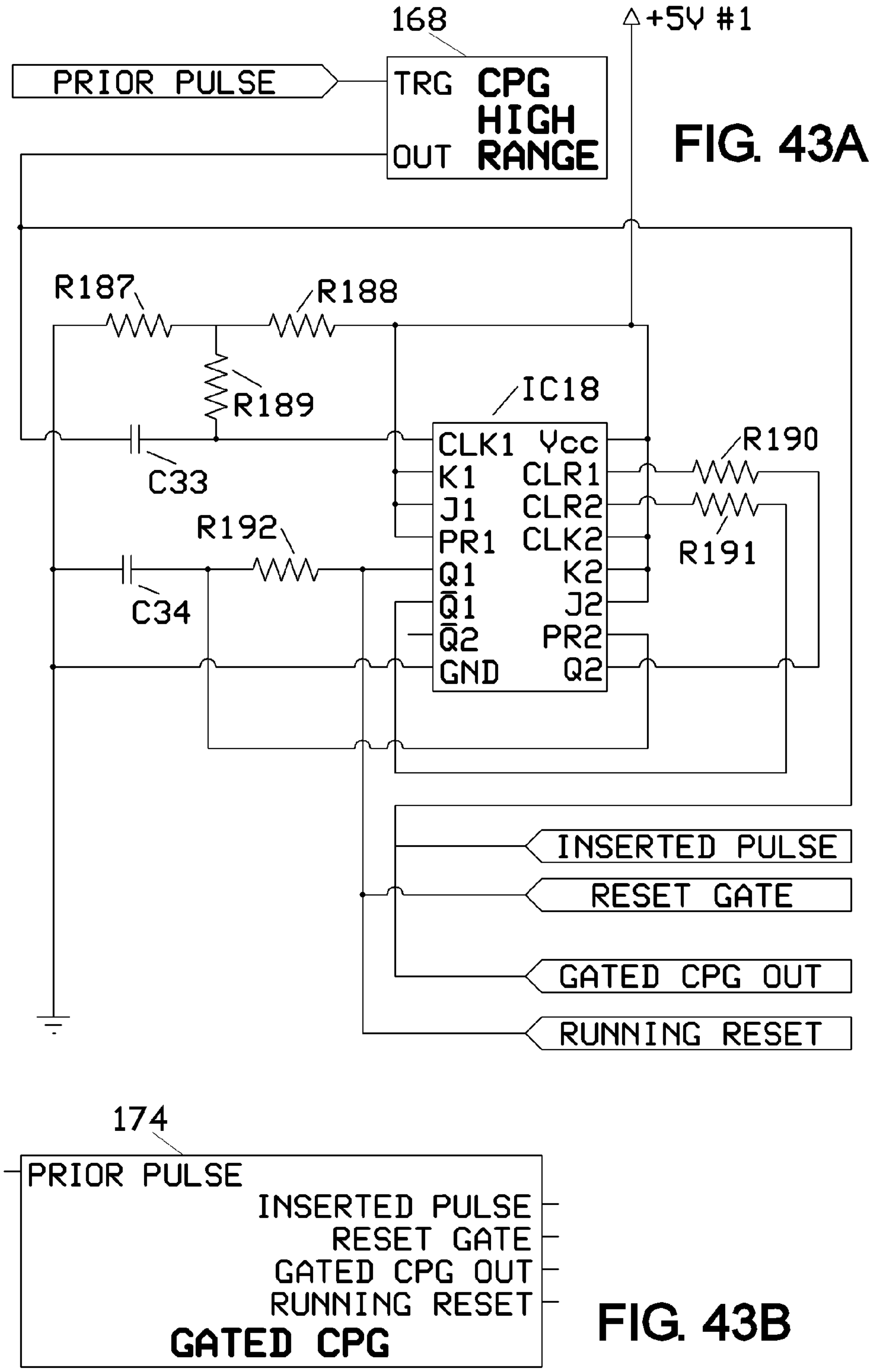

FIGS. 43A and 43B show the gated CPG, and symbol thereof.

Figure 44A:
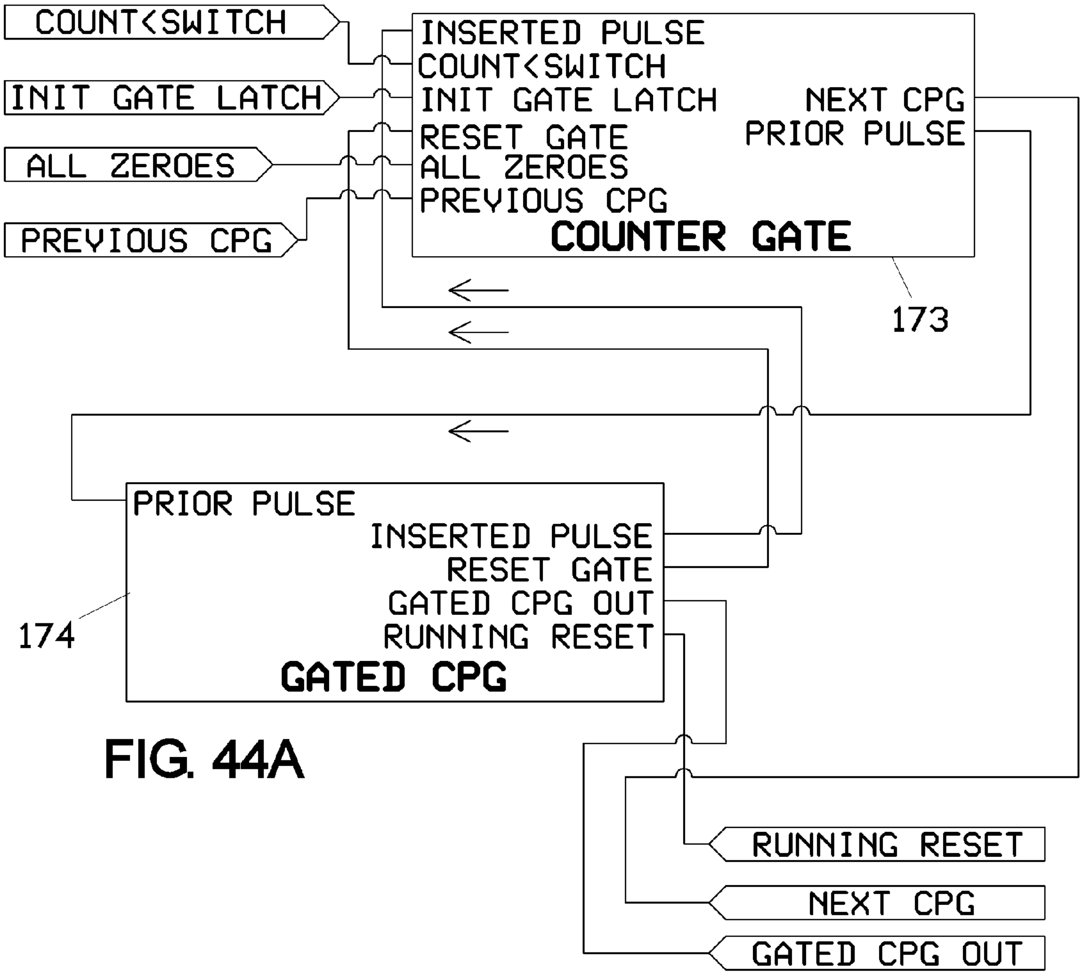
Figure 44B:
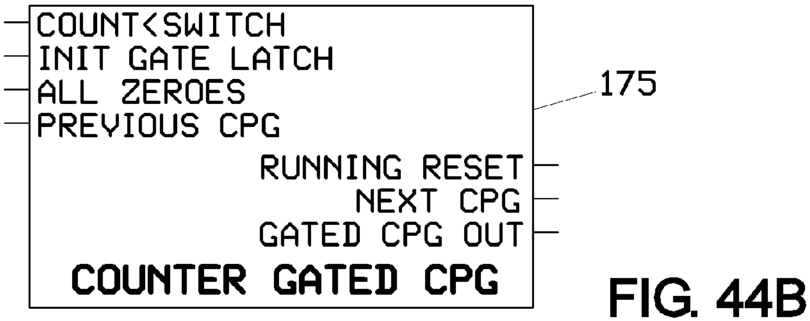

FIGS. 44A and 44B show the counter gated CPG, and symbol thereof.

FIGS. 45A and 45B show the multichannel pulse provider solenoid driver, and symbol thereof.

FIGS. 46A and 46B show the 1 megahertz signal source, and symbol thereof.

Figures 47A, 47B:
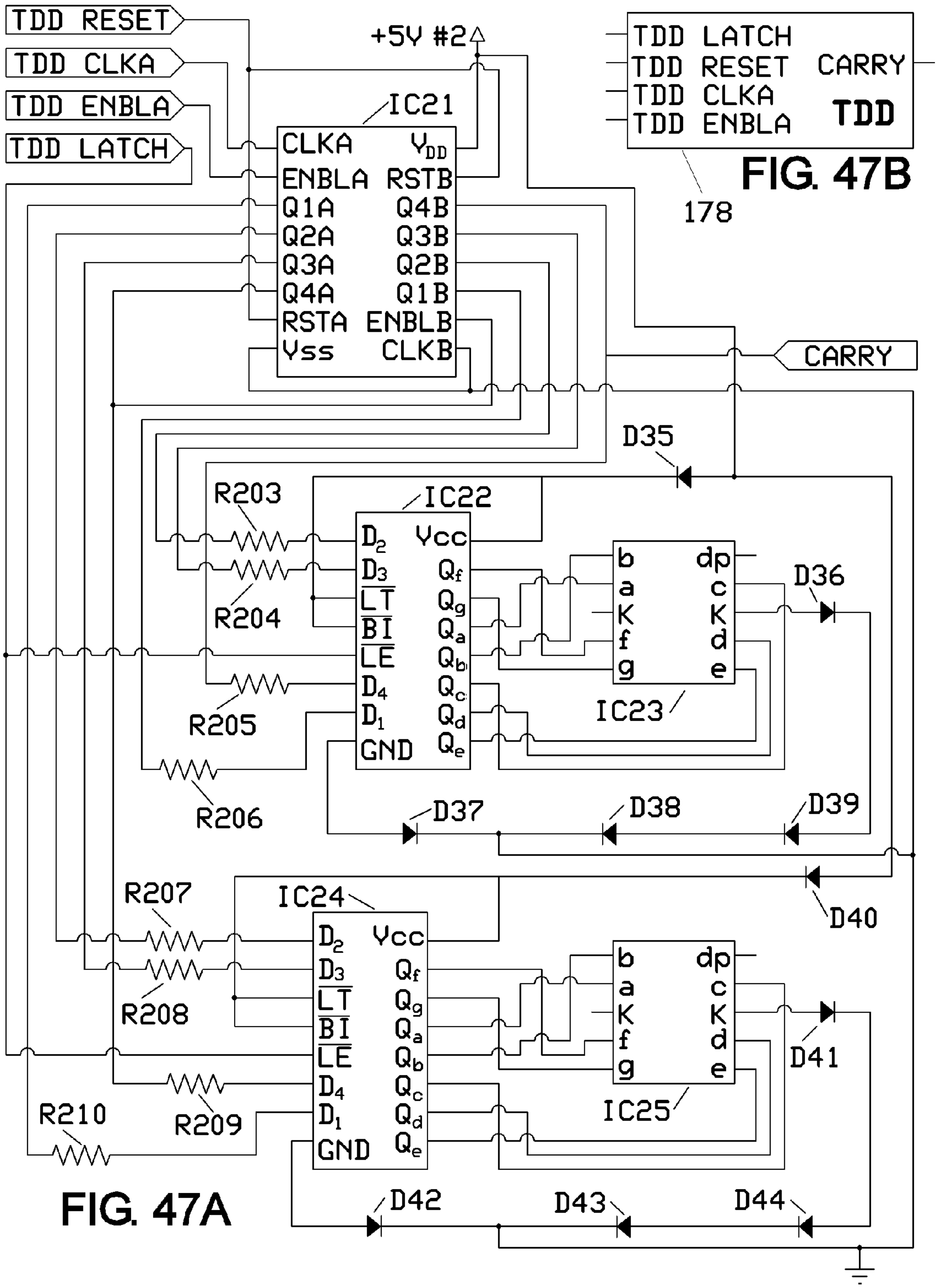

FIGS. 47A and 47B show the two digit display, and symbol thereof.

Figures 48A, 48B:
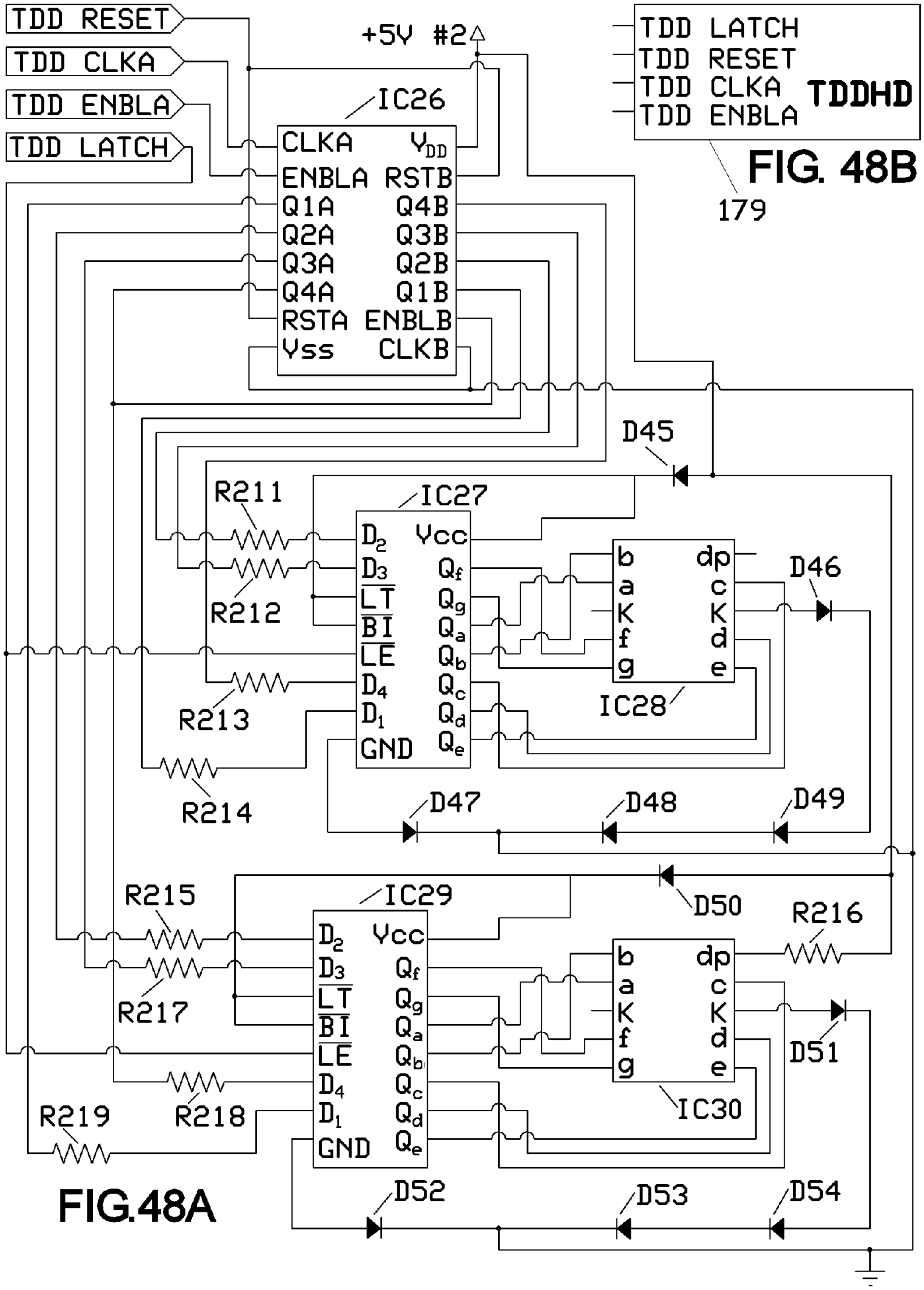

FIGS. 48A and 48B show the two digit display for high digits, and symbol thereof.

Figure 49A:
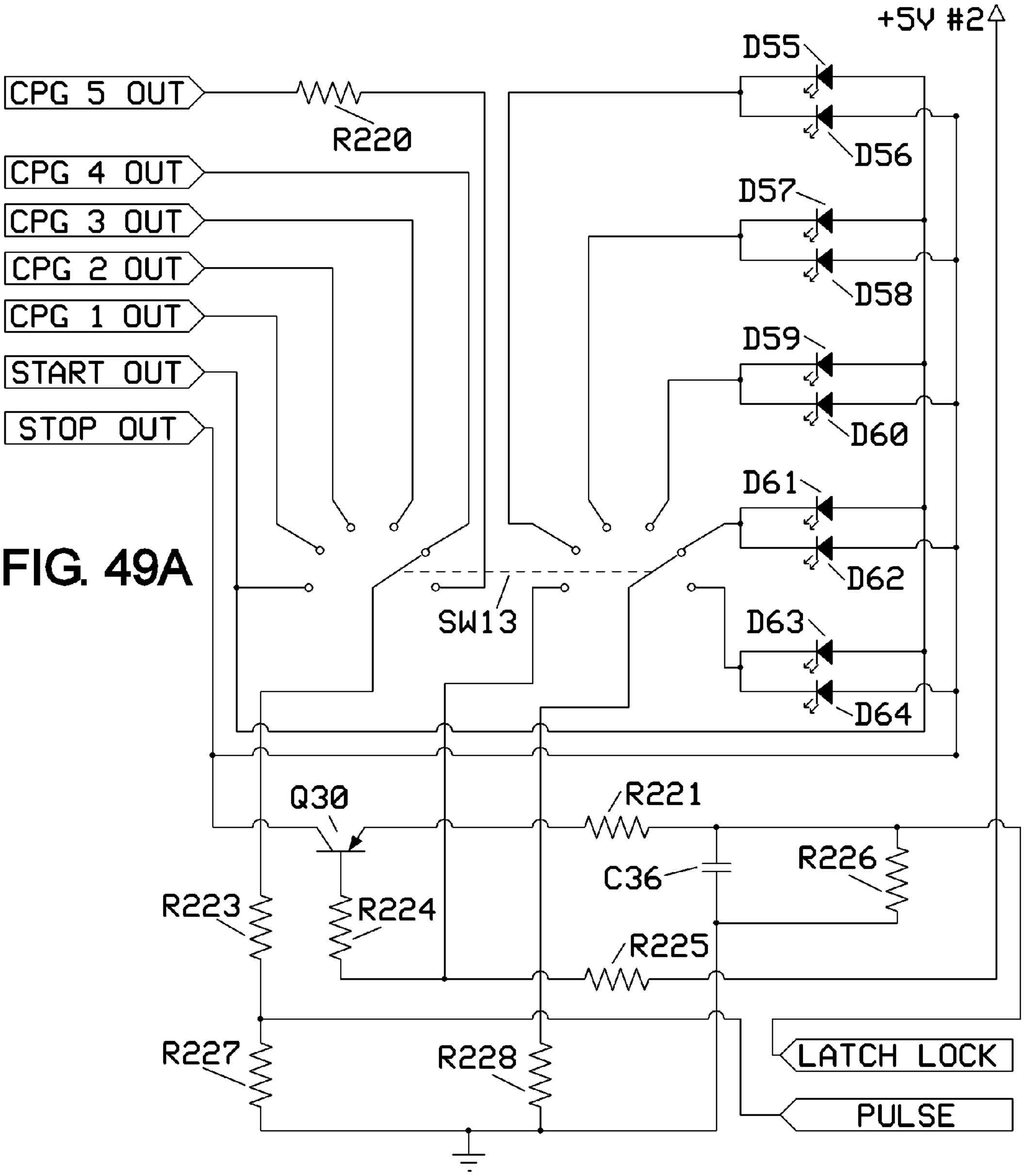
Figure 49B:
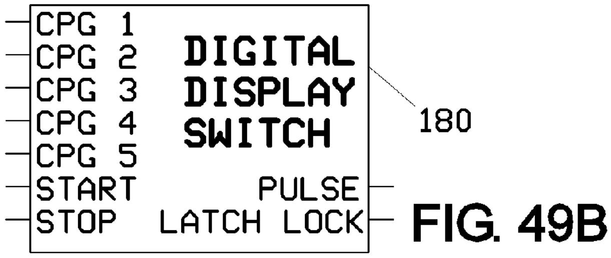

FIGS. 49A and 49B show the digital display switch, and symbol thereof.

Figures 50A, 50B:
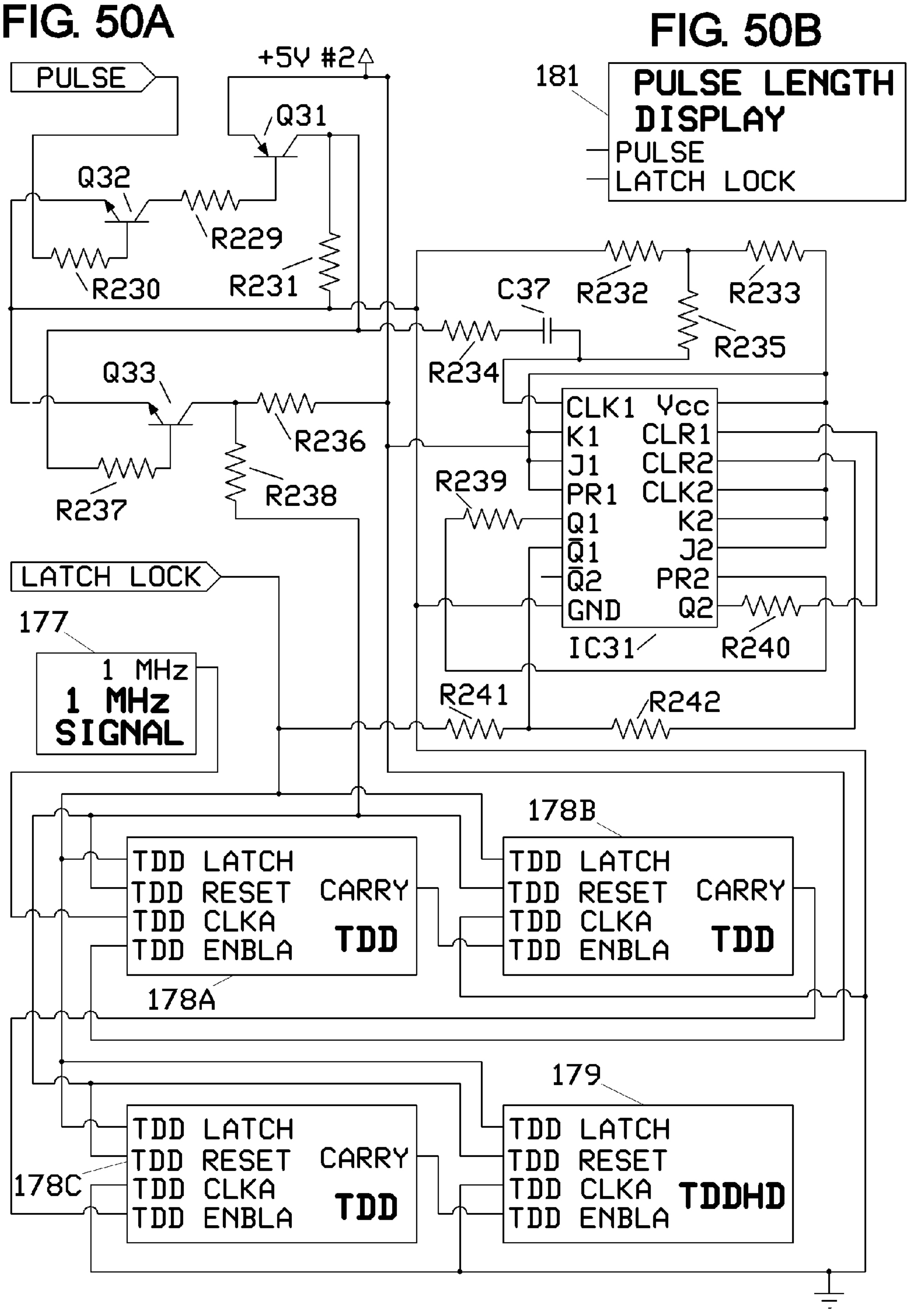

FIGS. 50A and 50B show the pulse length display, and symbol thereof.

Figure 51:
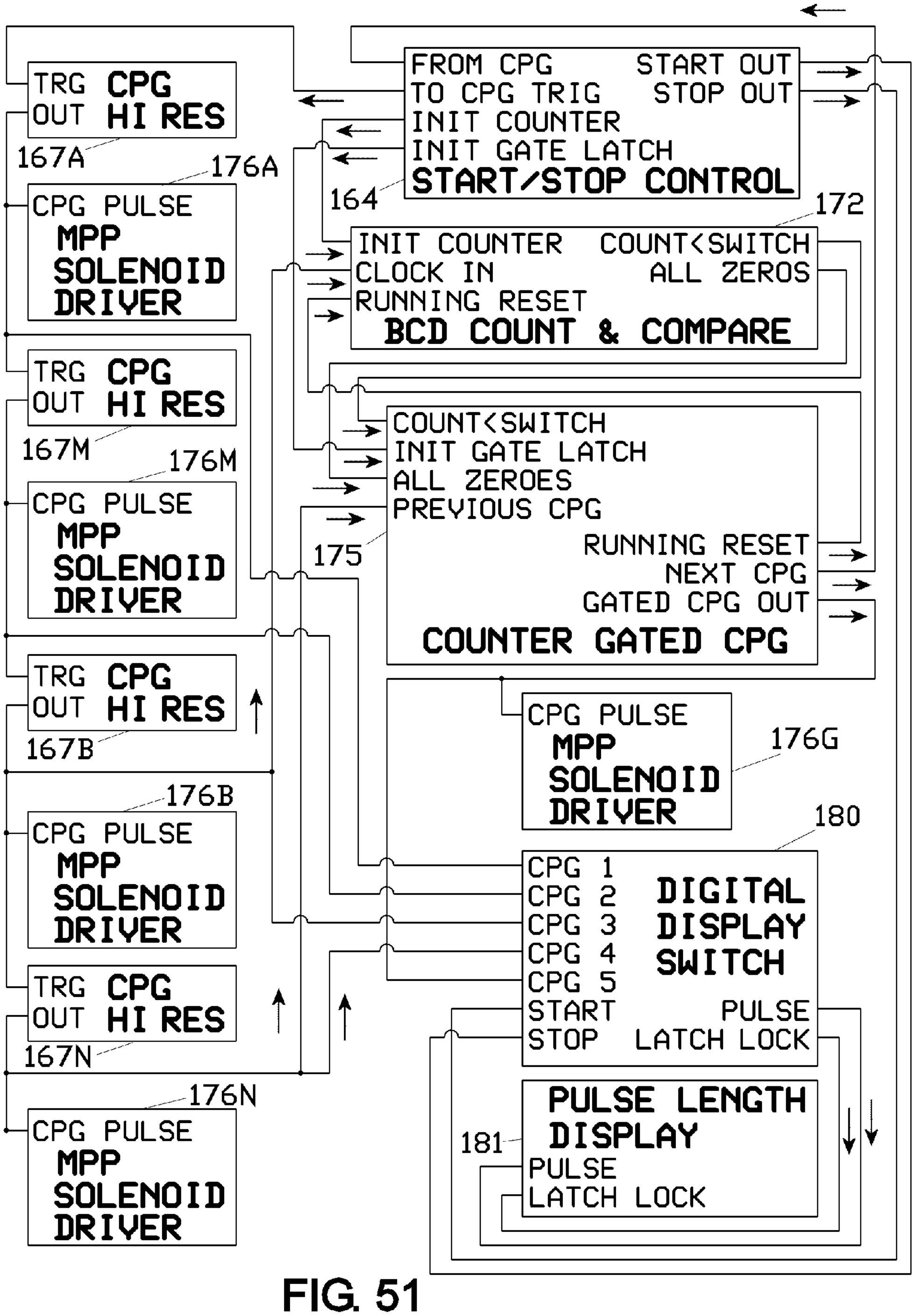

FIG. 51 shows the general schematic for the multichannel pulse provider.

FIG. 25A and FIG. 25B show the end view and cutaway view, respectively, of a four path heating jacket, as described in the fourth embodiment.

Figure 26:
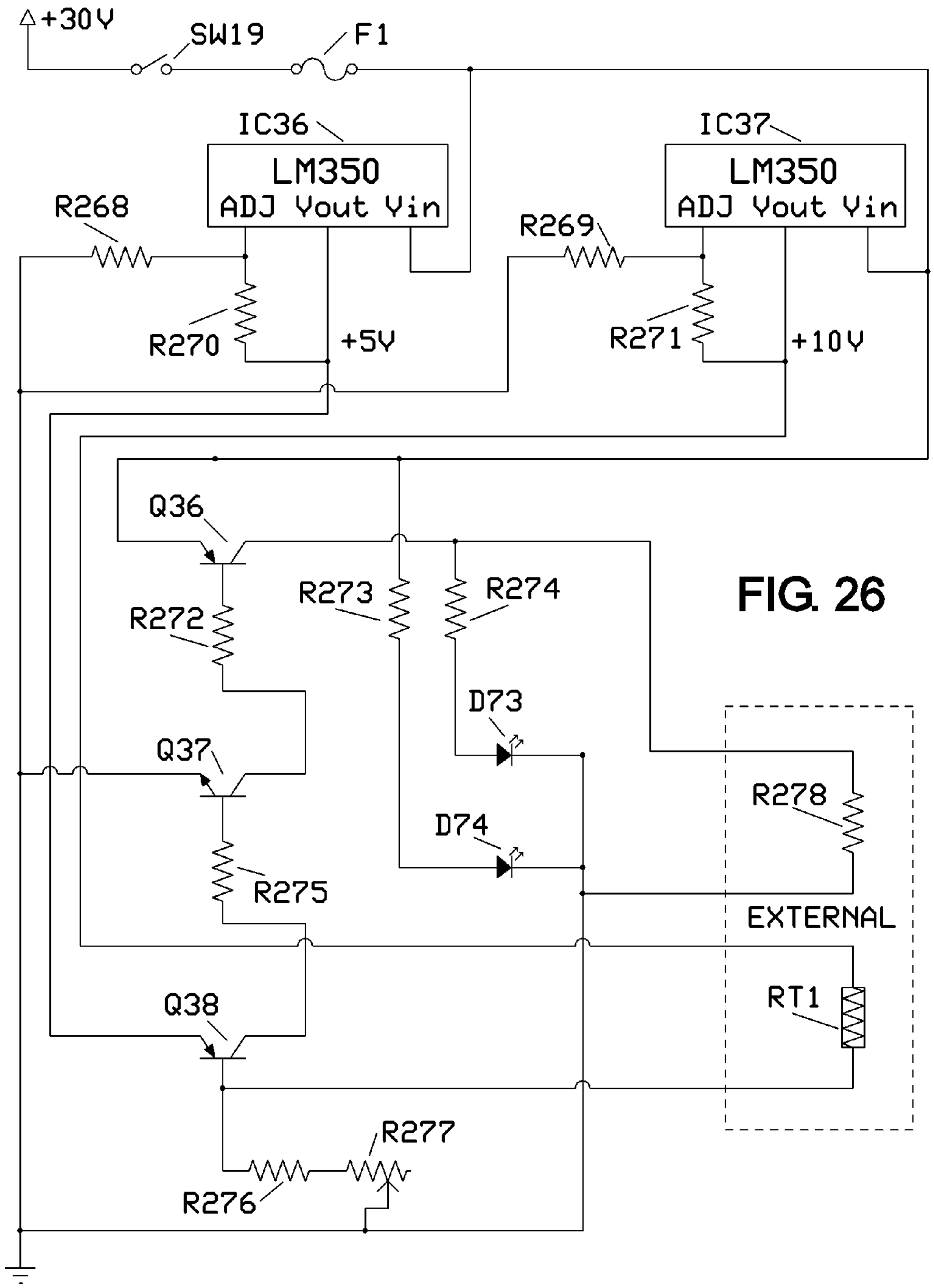

FIG. 26 shows the circuitry for a thermostatic control to operate either the three path or the four path heating jackets.

Figure 52A:
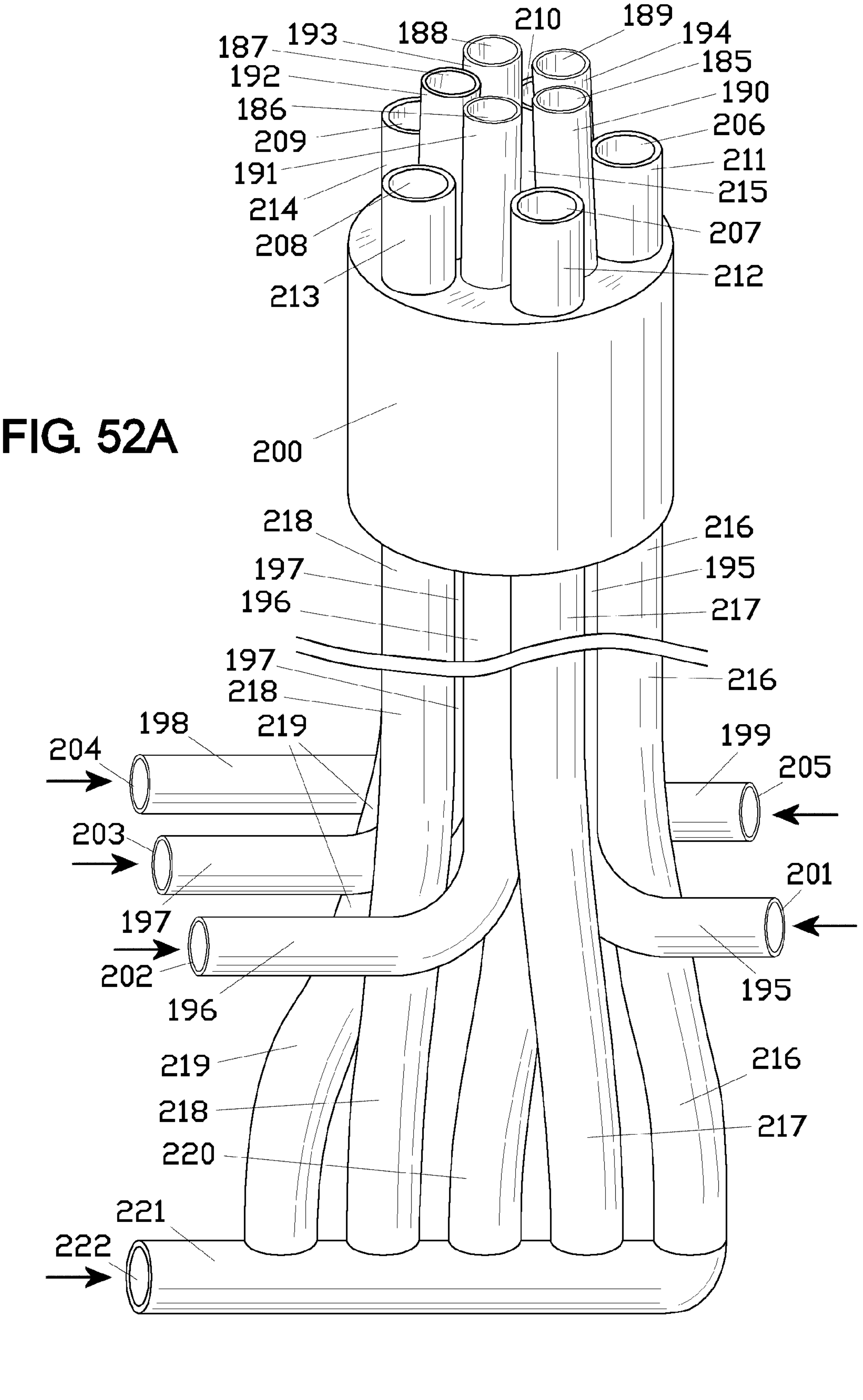

FIG. 52A is a 3D view of a five liquid droplet applicator nozzle assembly with five streaming gas orifices, for a fifth embodiment.

Figure 52C:
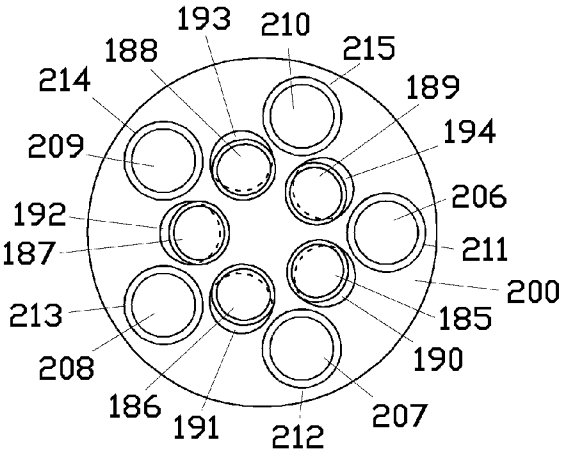
Figure 52B:
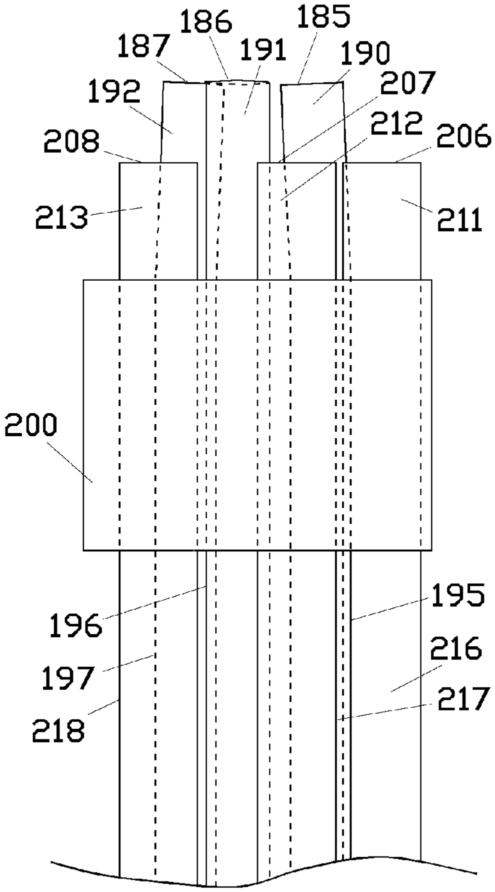
Figure 52D:
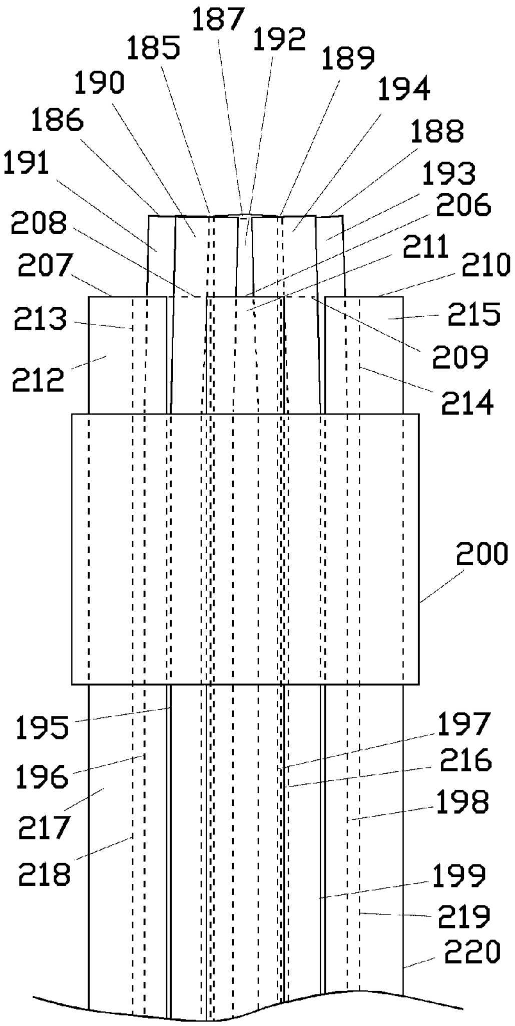

FIGS. 52B, 52C, and 52D are respectively front, top, and side views of a five liquid droplet applicator nozzle assembly with five streaming gas orifices, for the fifth embodiment.

Figure 53:
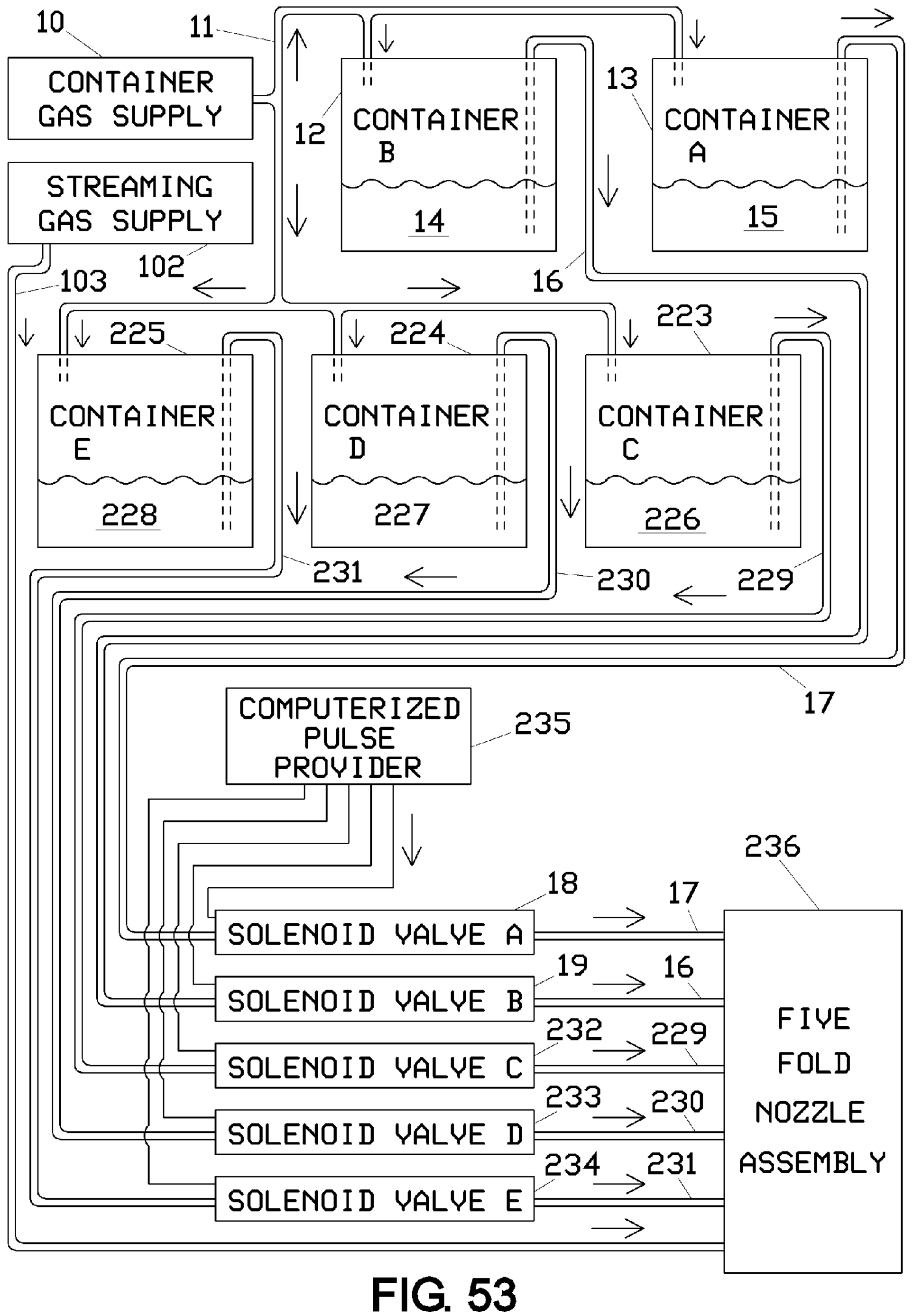

FIG. 53 is a block diagram of the overall components of the fifth embodiment.

FIG. 54 thru FIG. 57 show the circuitry for a computerized pulse provider used in the fifth embodiment.

Figure 54:
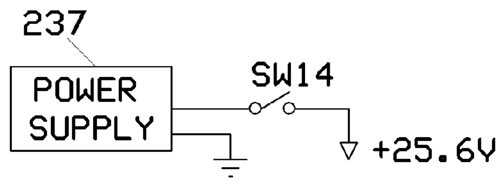

FIG. 54 shows a power supply and switch.

Figure 55A:
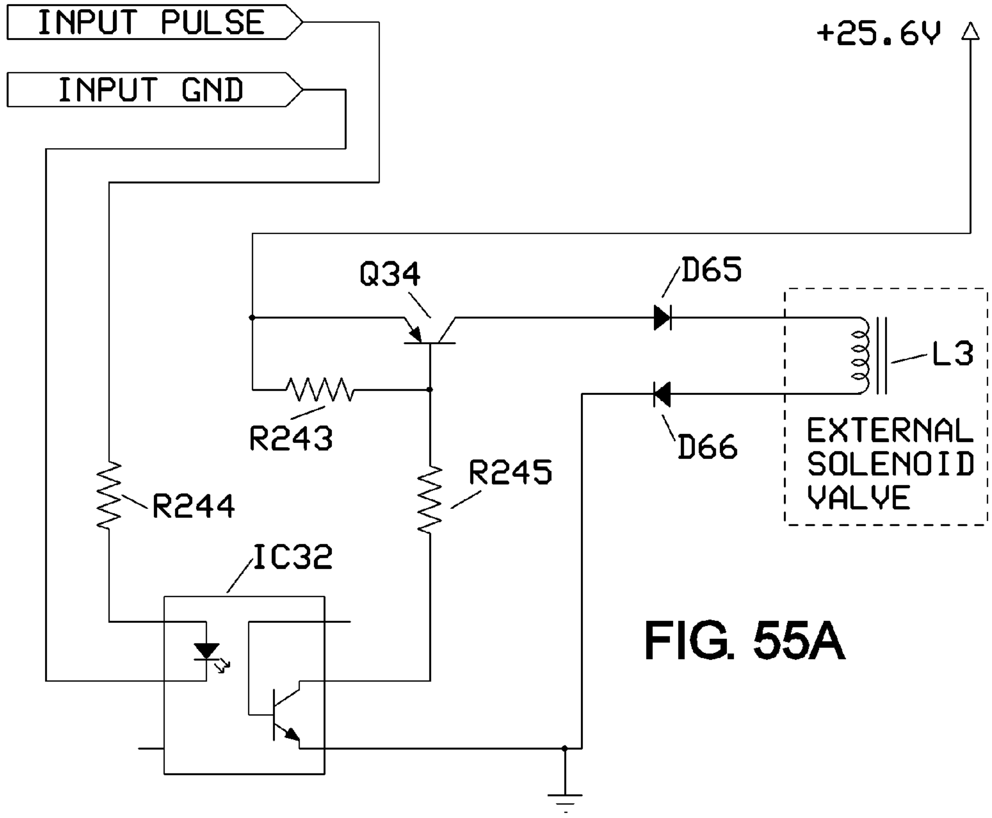
Figure 55B:
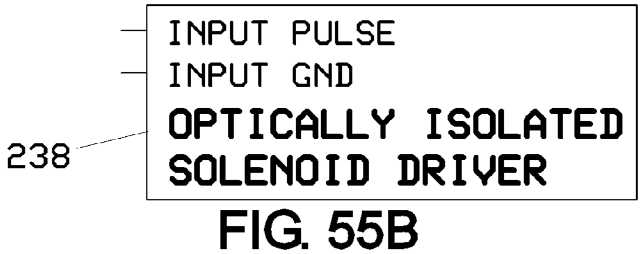

FIGS. 55A and 55B show an optically isolated solenoid driver, and symbol thereof.

Figure 56:
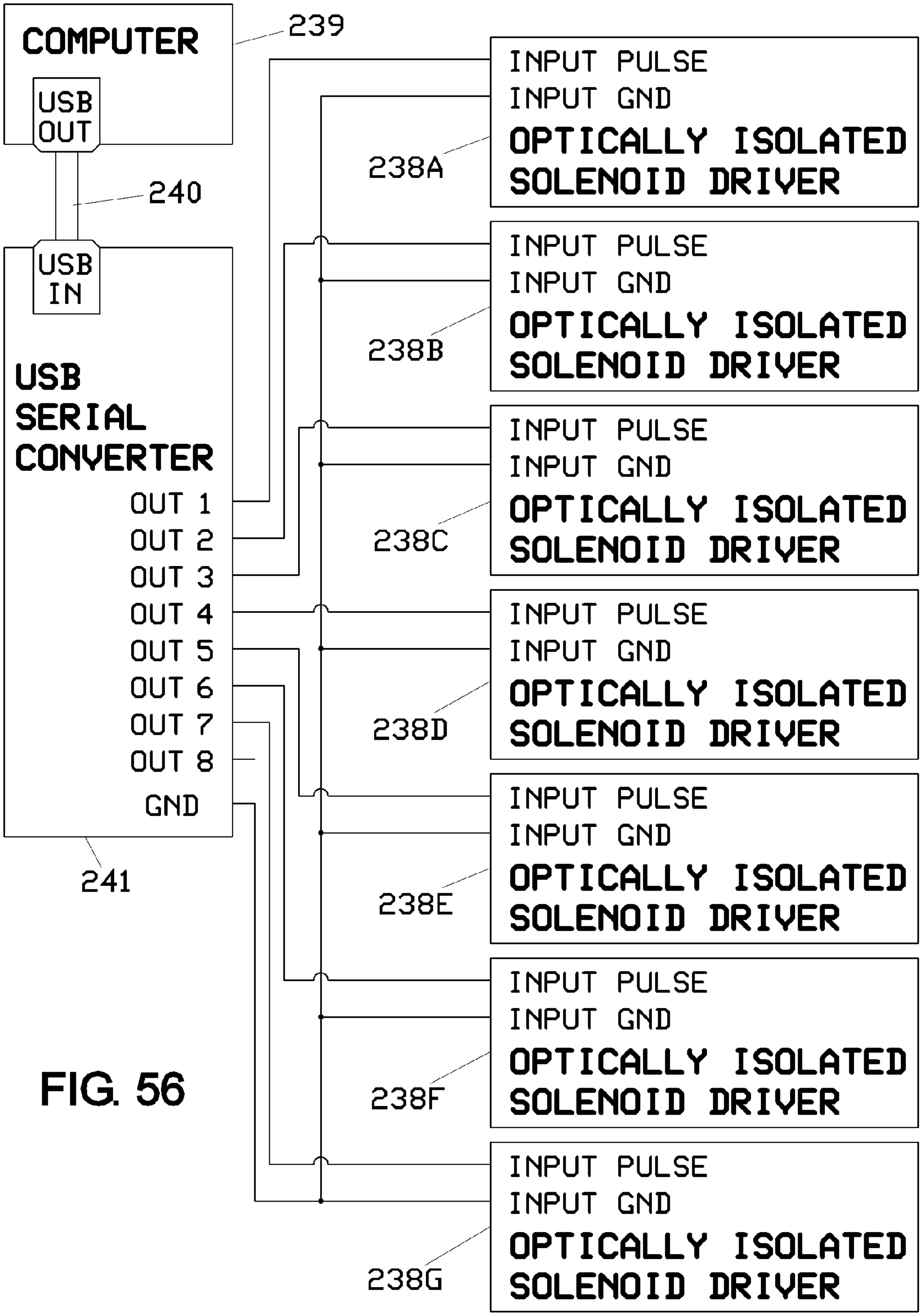

FIG. 56 shows a computerized pulse provider with a USB to serial port interface.

Figure 57:
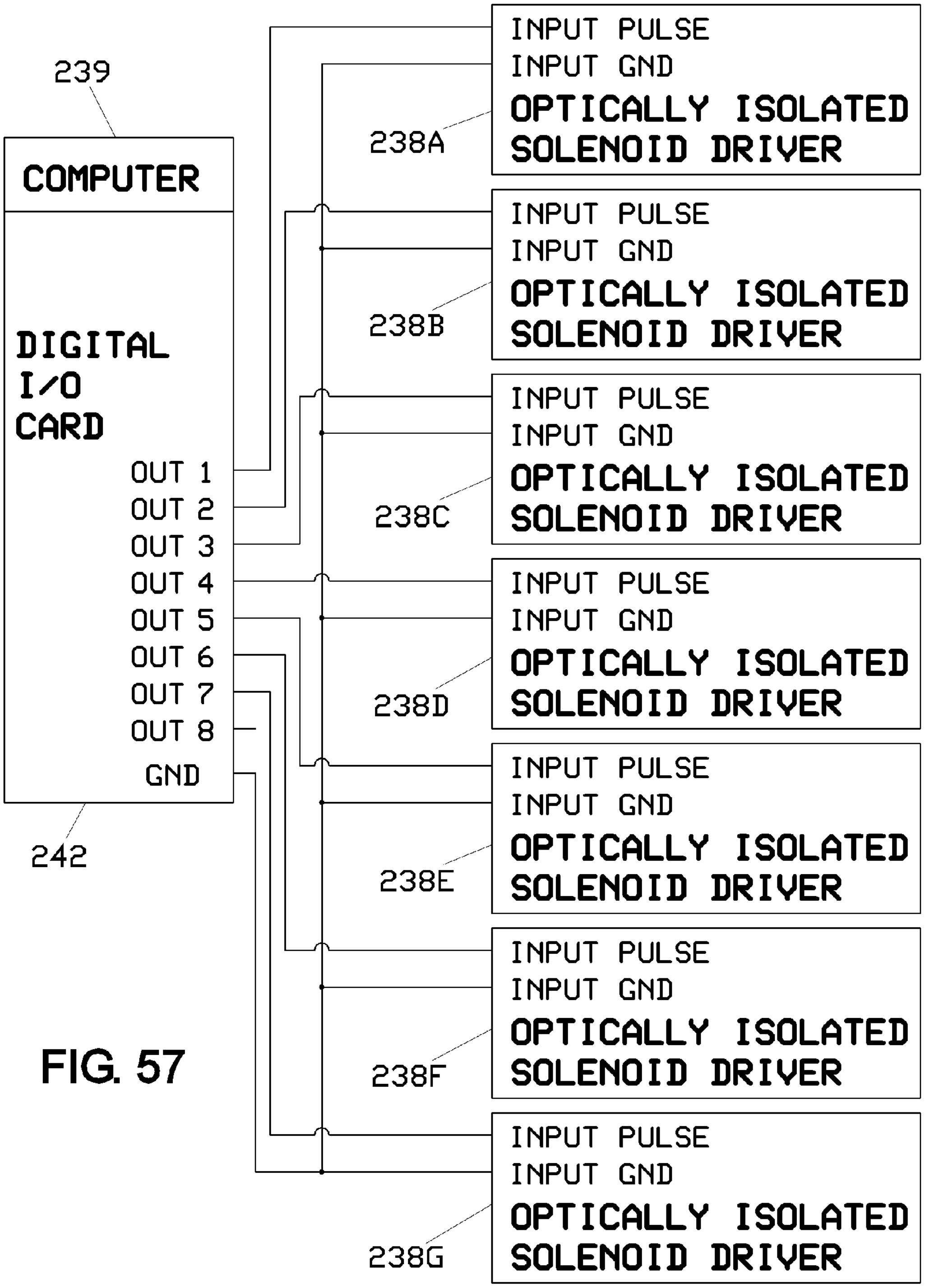

FIG. 57 shows a computerized pulse provider with a digital I/O card.

DETAILED DESCRIPTION OF THE INVENTION

The following description details those embodiments currently conceived as best instances, and although they do contain indications of useful variety and extension, this should be considered illustrative and not limiting, with the full scope of the invention delineated in the appended claims.

First Embodiment

Figure 1A:
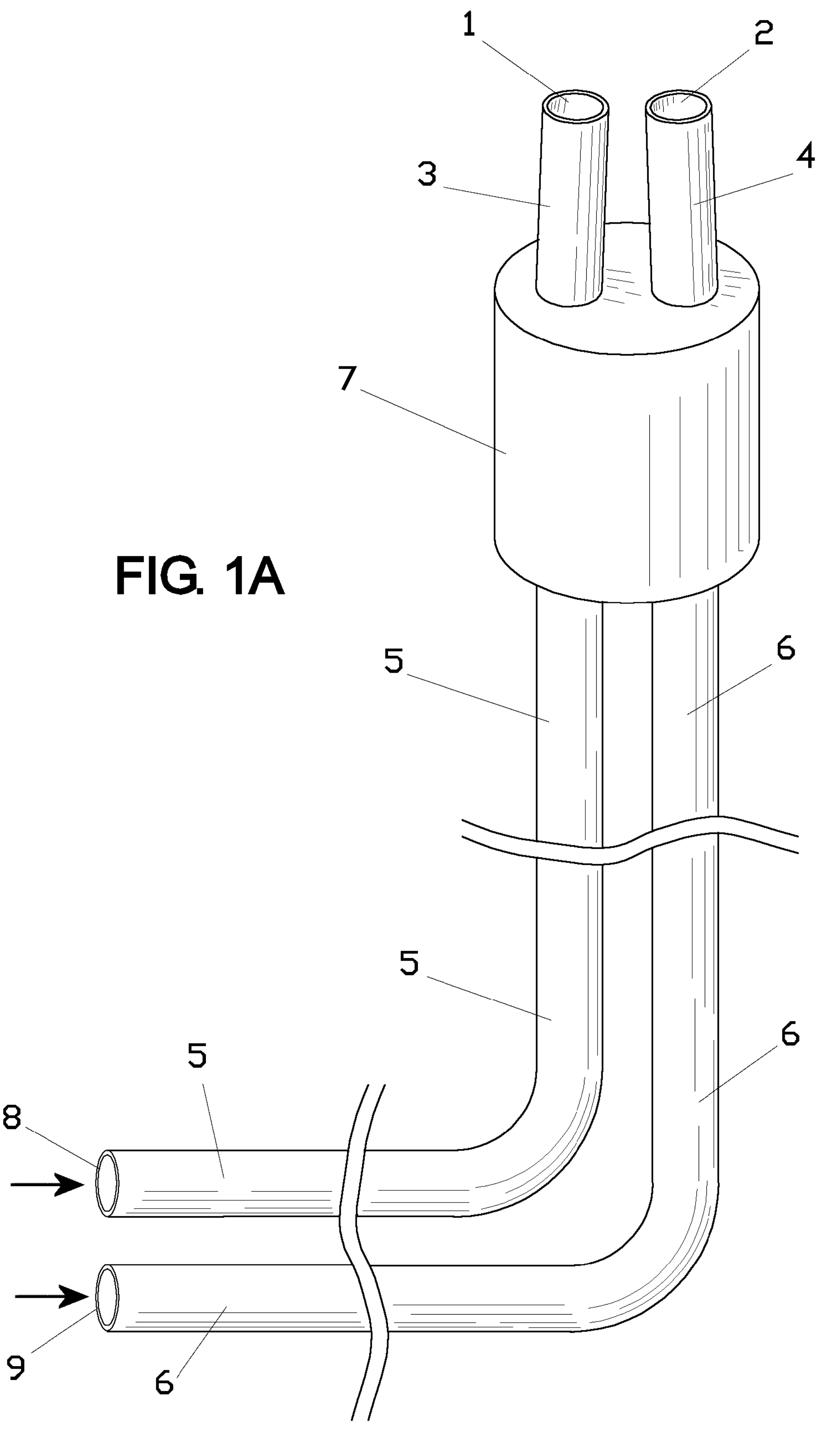
Figure 1C:
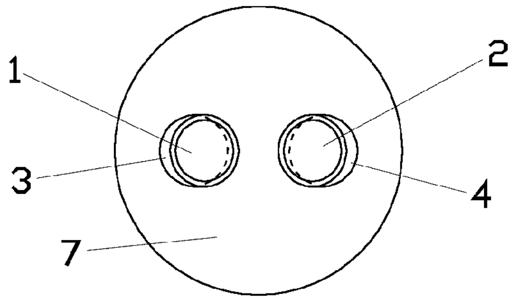
Figure 1B:
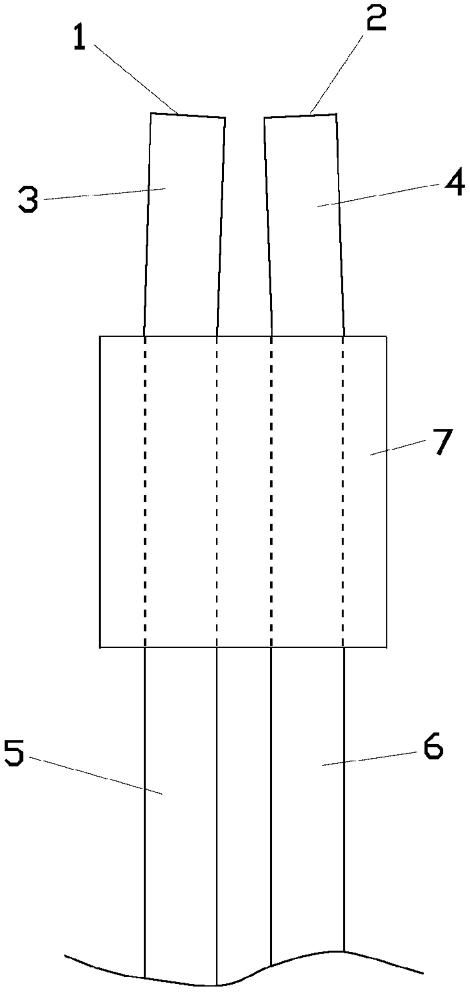
Figure 1D:
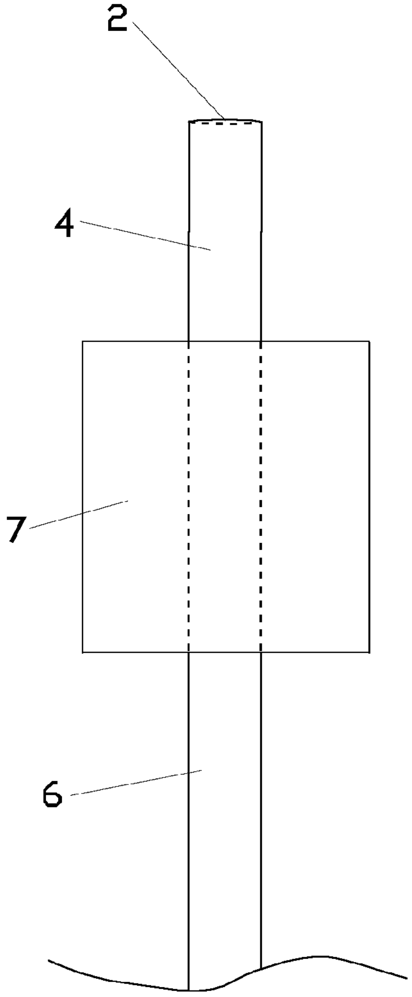
Figure 2:
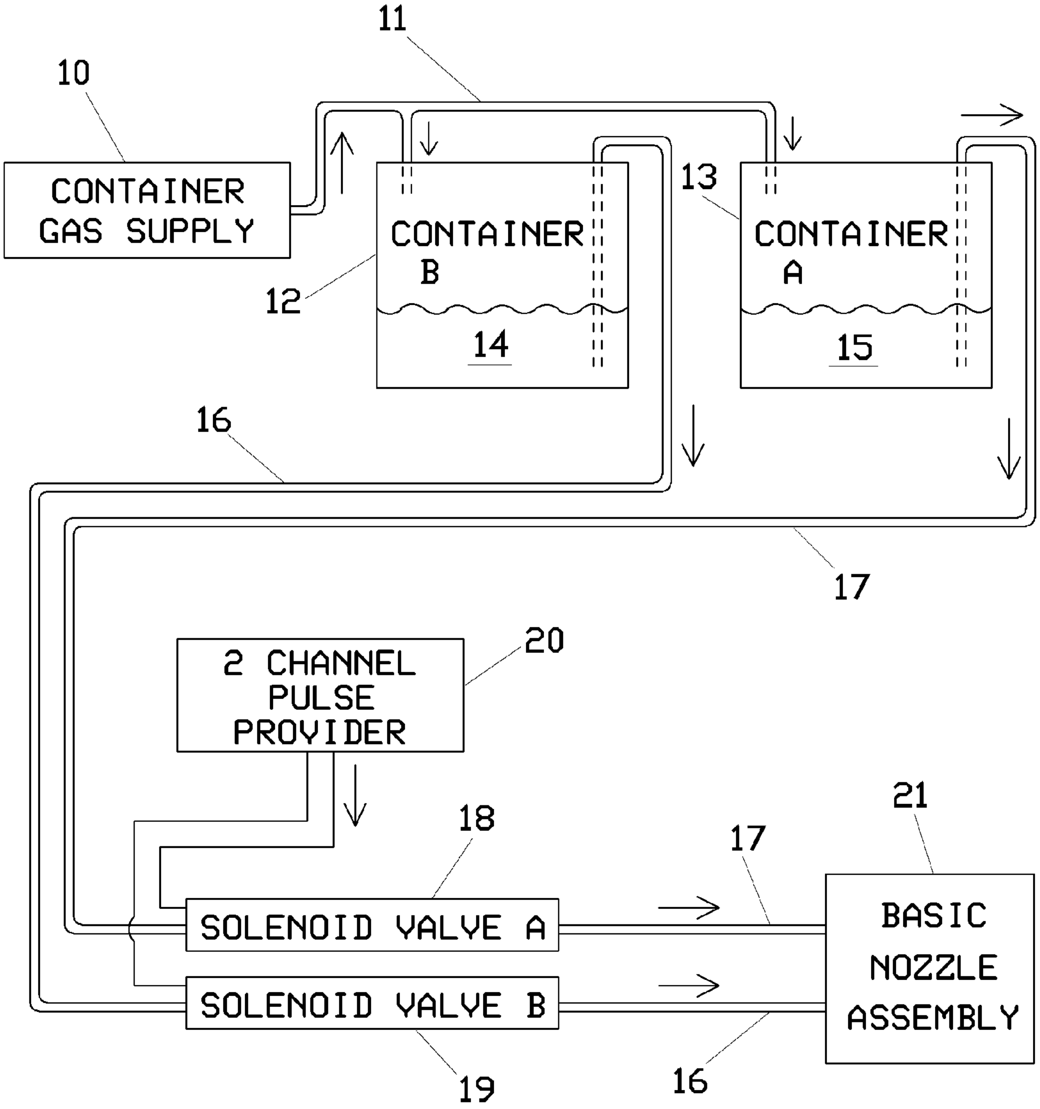

A first embodiment of the device comprises a nozzle assembly, FIG. 1A, itself comprising connective tubing, and a nozzle head FIG. 1B, FIG. 1C, and FIG. 1D, said nozzle assembly 21 as shown in FIG. 2 connected by tubing 16 and 17 to normally closed solenoid valves 18 and 19 and to containers 12 and 13. The sealable containers 12 and 13 are supplied at the top by a tubing path 11 with pressurized air or other gas from a container gas supply 10. A two channel pulse provider 20 sends pulses sequentially to each of said solenoid valves, causing each in turn to open and close. When solenoid valve A 18 is briefly opened, liquid A 15 from container A 13 moves along liquid path A 17 through a path or channel A connection port 8, FIG. 1A, through a nozzle assembly liquid path 5 and a liquid orifice support 3, causing a droplet to be emitted from a liquid orifice 1. When solenoid valve B 19 is briefly opened, liquid B 14 from container B 12 moves along liquid path B 16 through a path B connection port 9 FIG. 1A through a nozzle assembly liquid path 6 and a liquid orifice support 4, causing a droplet to be emitted from a liquid orifice 2.

The liquid orifices 1 and 2 are preferentially made of PTFE because of the chemical resistance of PTFE, and because the hydrophobic characteristic of PTFE prevents or reduces dribbling at the liquid orifices 1 and 2 in cases where the liquids 14 and 15 are aqueous solutions. The liquid orifices have an internal diameter ranging from 0.025 millimeter to 0.4 millimeter, depending upon the liquid's viscosity and the air or gas pressure supplied to the container. For aqueous solutions 0.2 millimeter (0.008 inch) to 0.254 millimeter (0.01 inch) are satisfactory inner diameters for the liquid orifices. The cross sectional shape of the liquid orifices can be circular, oval or another shape chosen to reduce dribbling and provide for the reliable emission or ejection of a discreet individual droplet when the corresponding liquid valve is briefly opened. The surface around the liquid orifice should be as smooth and even as possible. The liquid orifices are angled toward each other such that liquid emitted from the liquid orifices will land at the same target location at a predetermined distance from the liquid orifices; this is the target surface, or location, as previously mentioned in the introductory paragraph to the specifications section. The liquid orifices are placed nearly side by side, with sufficient separation, typically about 0.5 millimeter to 1.5 millimeter, to avoid cross contamination from any dribbling, and close enough that the angle by which the liquid orifices point towards each other allows some variation in the distance from the liquid orifices to the target surface, or location.

Each liquid orifice, liquid orifice support, and liquid path can be made of lengths of tubing of different inner and outer diameters such as to fit tightly into each other, as by a luer form of connection, so that the connection ports 8 and 9 can be joined to the path of liquid A 17 and the path of liquid B 16, respectively. Tubing made of PTFE can be welded together where connected using a small butane torch. The lengths of tubing for 5 and 17, and for 6 and 16, should be made of a suitable chemically resistant material, and should be inelastic even if somewhat flexible so as to convey a discreet sharp pulse in the liquid from a liquid valve to a corresponding liquid orifice; PTFE tubing is well suited to these criteria and is available in many sizes at reasonable cost. The liquid orifice supports 3 and 4, and the nozzle assembly liquid paths 5 and 6 may be separately made of tubing held in place together with a suitable binding material or housing 7, a basic nozzle head support. Alternatively, the nozzle head is an essentially solid piece of material, preferably made of PTFE, with holes passing through it, which holes at one end form the liquid orifices, and at the other end provide for connection to the corresponding tubing. Ideally the liquid orifices are sufficiently protruding, about 2 millimeters to 10 millimeters, whether as tubes joined together or as openings in a solid piece, to reduce or eliminate dribbling. Orifices with elliptical or oval cross sections are currently found to produce the cleanest emission of droplets.

The container gas supply 10 may use bottled air or other gas, or a pump. Filters and a ballast tank or container may be included. A pressure regulator with valve and gauge may also be included. For some liquids the pressurization can be supplied by bottled compressed gas, if the use of air is chemically deleterious to the liquids, if a specific gas contributes to the chemical activity sought on the target surface, or if bottled gas is more convenient.

The pressure should be such, in consideration of the length and diameter of the type of tubing, the viscosity and surface tension of the liquids, the distance to the target, and the period during which the liquid valves are open, that as nearly as possible discreet individual droplets cleanly and completely leave the liquid orifices and land on the target surface for the most part intact. Separate regulation of the pressure applied to the containers, not shown, would be needed where the liquids have sufficiently different viscosities or flow characteristics. The liquids in the liquid containers are connected to the solenoid valves with a suitable chemically resistant tubing such as PTFE tubing, as part of the liquid paths 16 and 17.

The two channel transistorized pulse provider, or two channel pulse provider 20 in FIG. 2, supplies 24 volt DC pulses for use with 24 volt DC solenoid valves.

Figure 3:
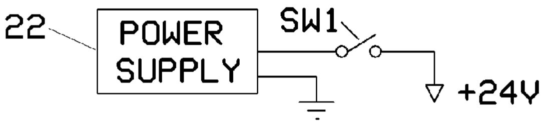
FIG. 3 shows the 24 volt power source, and symbol thereof.
Figure 4A:
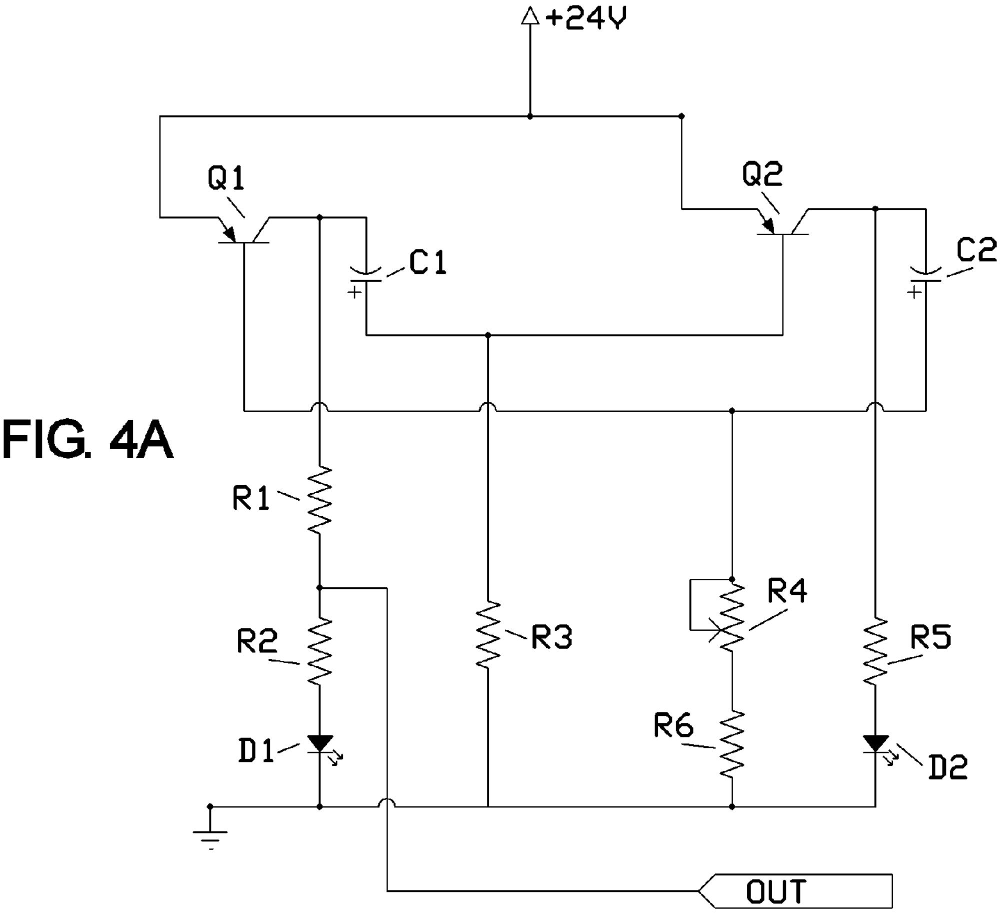
FIGS. 4A and 4B show a clock flip flop, and symbol thereof.
Figure 4B:
Figure 5A:
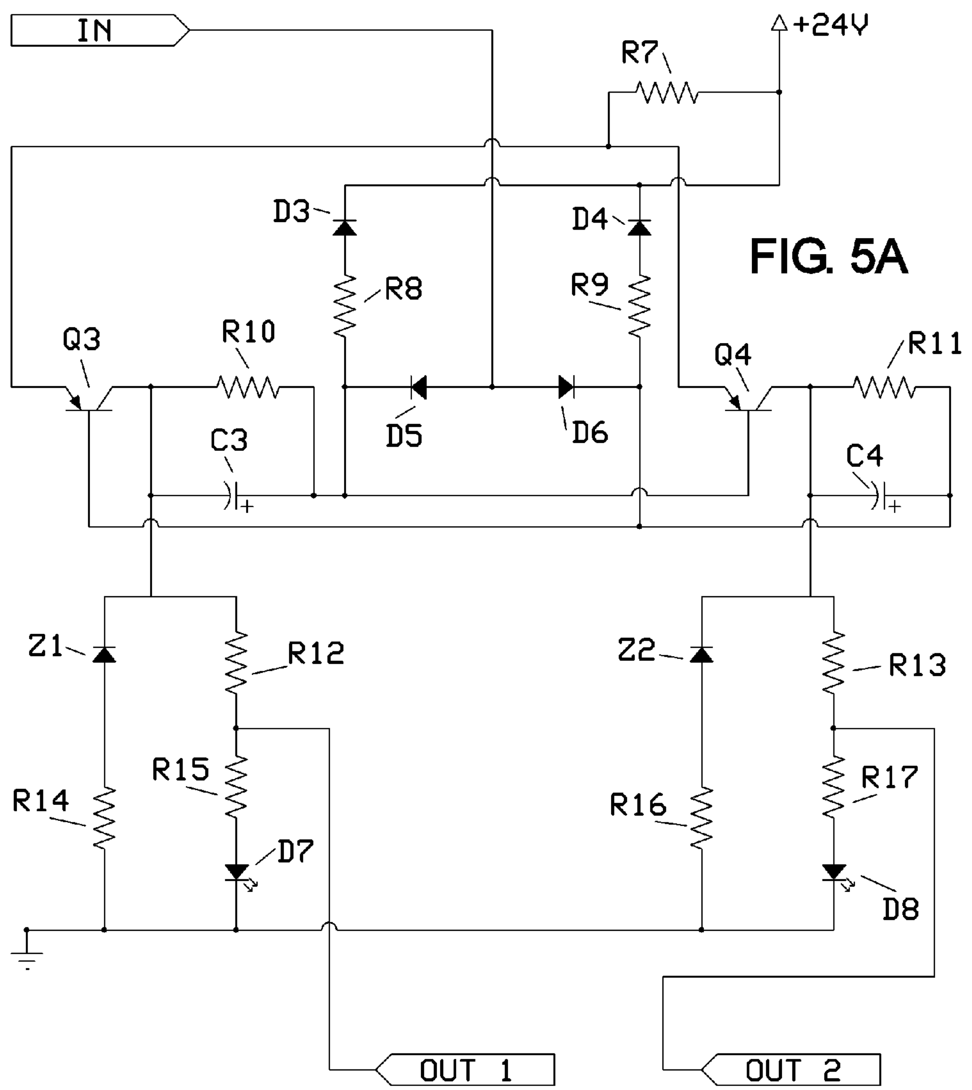
FIGS. 5A and 5B show a channel flip flop, and symbol thereof.
Figure 5B:
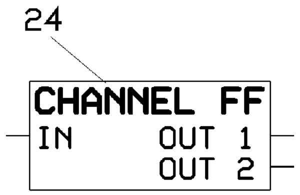
Figure 6A:
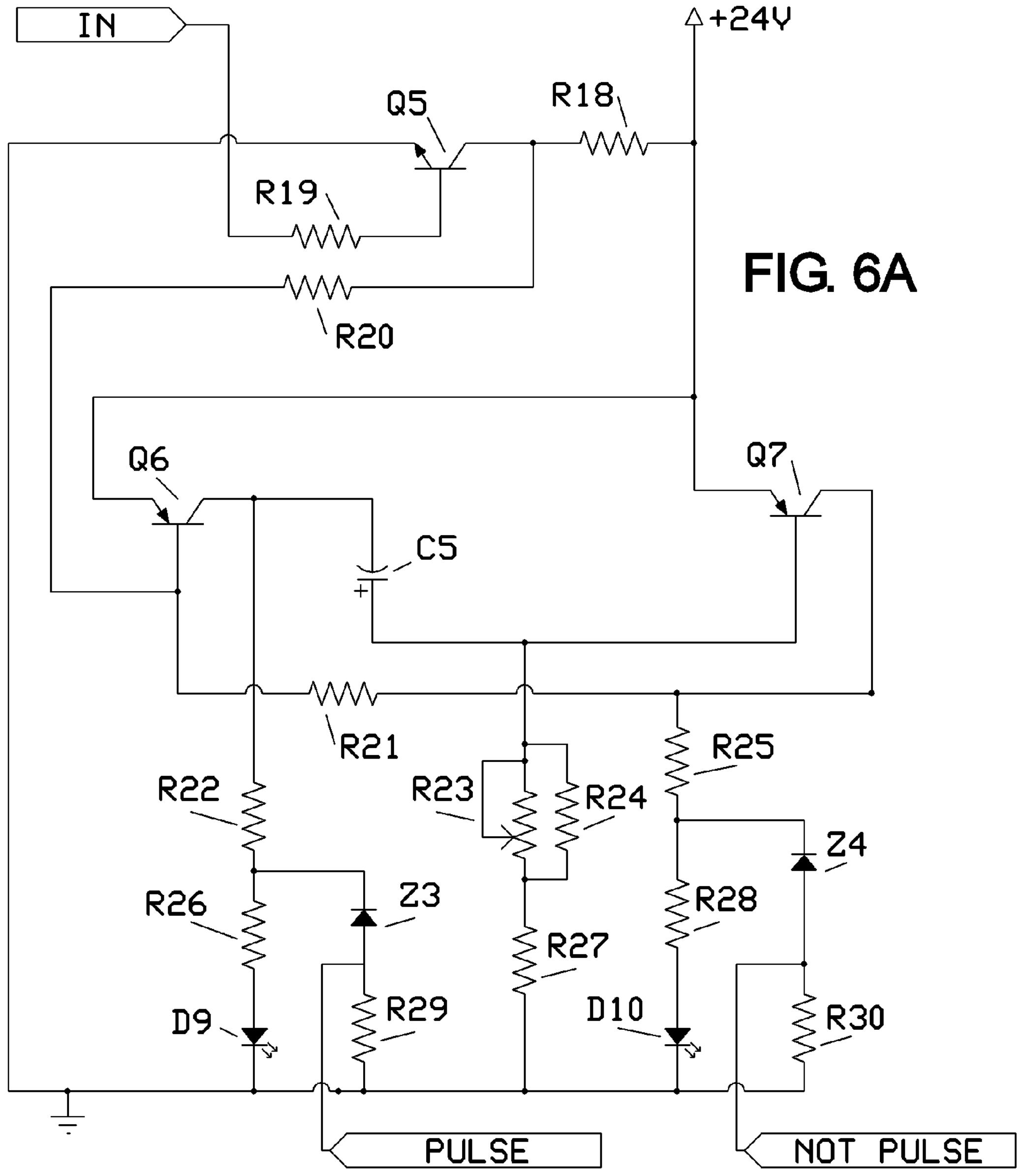
FIGS. 6A and 6B show a monostable flip flop, and symbol thereof.
Figure 6B:
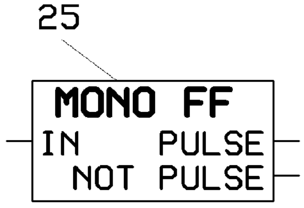
Figure 7A:
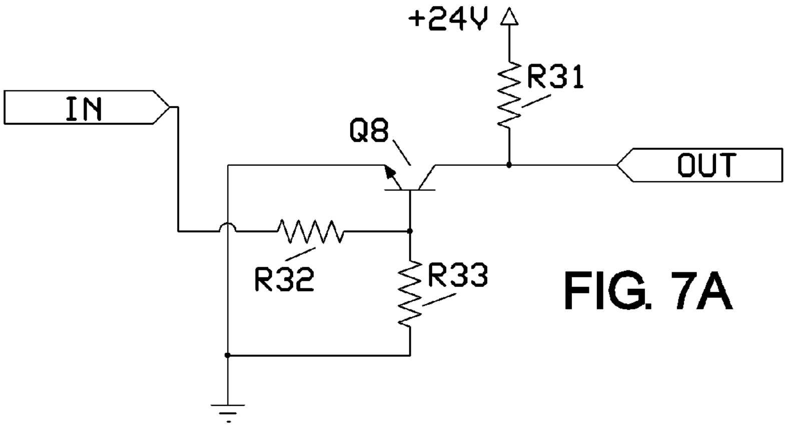
FIGS. 7A and 7B show an inverter circuit, and symbol thereof.
Figure 7B:
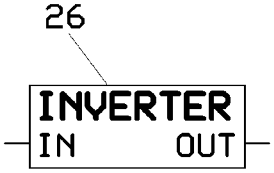
Figure 8A:
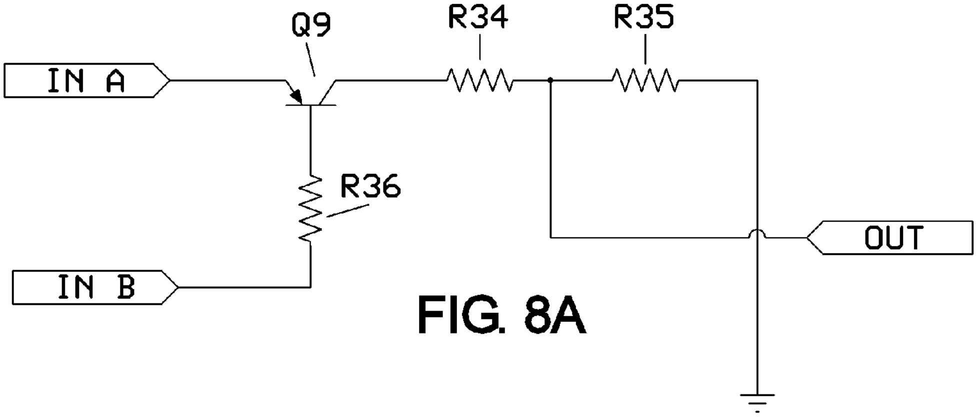
FIGS. 8A and 8B show an AND gate circuit, and symbol thereof.
Figure 8B:
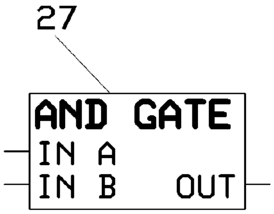

FIG. 3 shows the overall power supply 22 and a SPST switch SW1. FIG. 4A shows an astable multivibrator, or flip flop, CLOCK FF, comprising: C1 0.168 uF, C2 0.78 uF, D1 LED, D2 LED, Q1 2N4890, Q2 2N4890, R1 69R, R2 8K5, R3 18K, R5 5K5, R6 100K, and R4, a 1M potentiometer which adjusts the multivibrator period between the start of solution pulses. An output pulse from CLOCK FF would typically have a frequency in the range from 0.5 to 20 Hz. FIG. 4B shows a Clock FF schematic symbol 23. FIG. 5A shows a bistable flip-flop called CHANNEL FF with these component values: C3 and C4 0.06 uF; D3, D4, D5, and D6 1N4148; D7 and D8 LEDs; Q3 and Q4 2N4890; R7 505R; R8 and R9 61K5; R10 and R11 50K2; R12 and R13 430R; R14 and R16 470K; R15 9K; R17 9K; Z1 and Z2 6.19V. In FIG. 5B shows a schematic symbol 24 for CHANNEL FF. FIG. 6A shows a monostable flip flop, MONO FF, with these component values: C5 0.066 uF; D9 and D10 LEDs; Q5, Q6, and Q7 2N3704; R18 and R25 1K1; R19 5M9; R20 50K5; R21 100K; R22 218R; R24 2M; R26 1.6K; R27 200K; R28 20K1; R29 and R30 180K; R30 180K; Z3 and Z4 13.3V. R23 is a 3M potentiometer for adjusting the length of solution pulses, with typical values ranging for 6 to 11 milliseconds. FIG. 6B shows a schematic symbol 25 for MONO FF. FIG. 7B is an isolating INVERTER circuit with these component values: Q8 2N4401; R31 51K; R32 180K; R33 8K2. FIG. 7B shows a schematic symbol 26 for INVERTER. FIG. 8A shows an AND GATE with these component values: Q9 2N4403; R34 and R35 470K; R36 1M. A schematic symbol for an AND GATE is 27 in FIG. 8B.

Figure 9A:
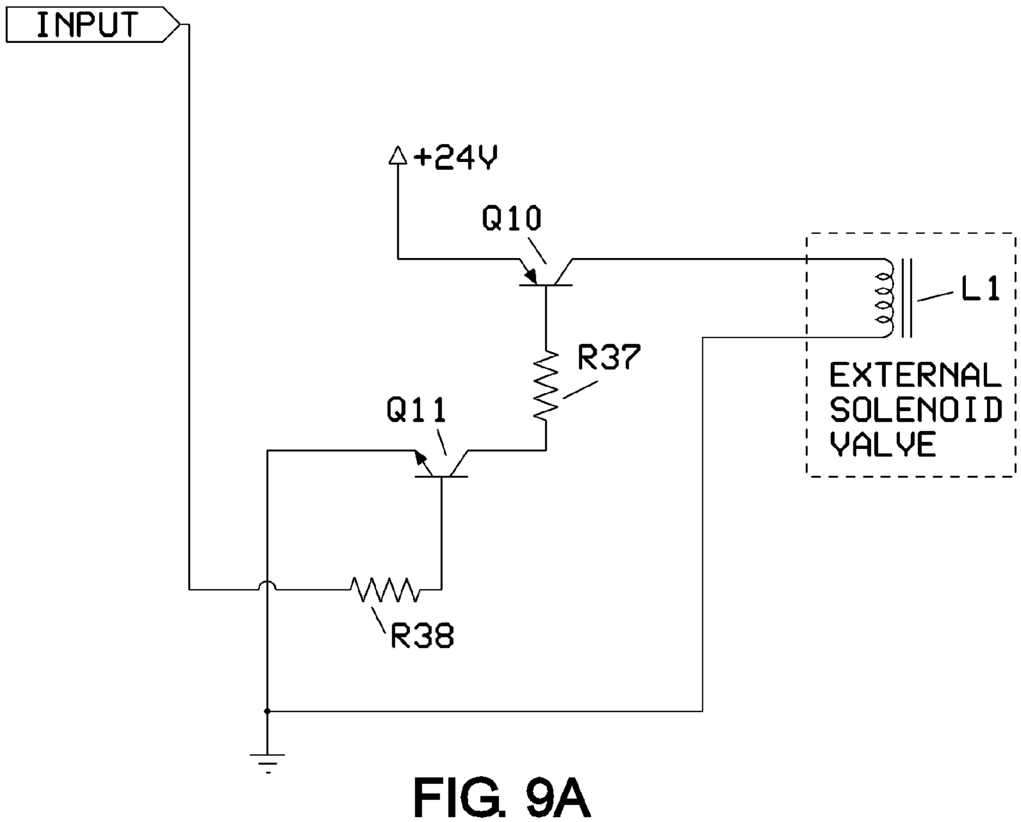
FIGS. 9A and 9B show a two channel pulse provider solenoid driver, and symbol thereof.
Figure 9B:
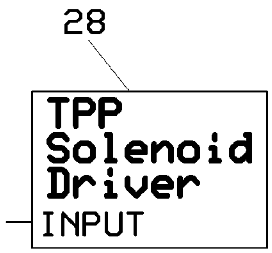

The INVERTER circuit is primarily to isolate inputs connected to an AND GATE. A solenoid driver circuit is shown in FIG. 9A, with these component values: L1 external solenoid valve; Q10 MJ491; Q11 2N4401; R37 11K; R38 470K. Its schematic symbol 28 in FIG. 9B is called TPP Solenoid Driver, TPP standing for transistorized pulse provider. The circuits described in FIG. 4 thru FIG. 9B are used in FIG. 10 to make a two channel pulse provider. CLOCK FF 23 causes CHANNEL FF 24 to alternately cause either INVERTER 26A or INVERTER 26B to supply a positive pulse to AND GATE 27A or AND GATE 27B respectively. Simultaneously, CLOCK FF 23 causes MONO FF 25 to send a pulse thru INVERTER 26L, which will be passed thru whichever AND GATE has received a positive pulse from INVERTER 26A or INVERTER 26B, and on to TPP Solenoid Driver 28A or TPP Solenoid Driver 28B, respectively.

In FIG. 11A, the trace 29A shows the pulse to emit a Channel A liquid droplet, and the trace 29B shows the pulse to emit a Channel B liquid droplet. The third embodiment will refer to 29M and 29N. The fourth embodiment will refer to FIG. 11B. The fifth embodiment will refer to FIG. 11C. For FIG. 11A, FIG. 11B, and FIG. 11C, the voltages V may represent either input voltages to a solenoid driver, or a voltage applied by a solenoid driver to an external solenoid valve such as L1. The traces shown are idealized, and do not show rise and fall times, the slight delay between pulses, nor solenoid fly back voltages.

The size of the droplets is determined by the length and diameter of the liquid paths and orifices, the pressure applied to the liquid containers, the viscosity of the liquids, and the length of the positive pulses shown in 29A and 29B, as controlled by R23 in FIG. 6A. The time between the leading edge of the positive pulses, and also the emission of droplets, is controlled by R4 in FIG. 4A.

Figure 12A:
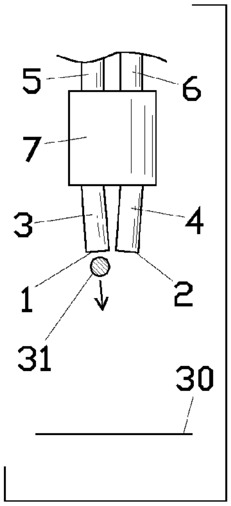
Figure 12B:
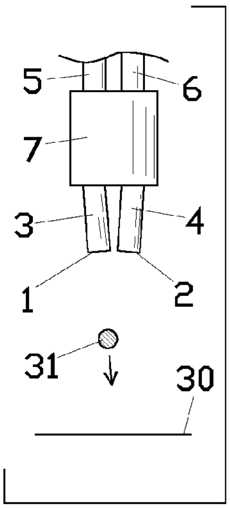
Figure 12C:
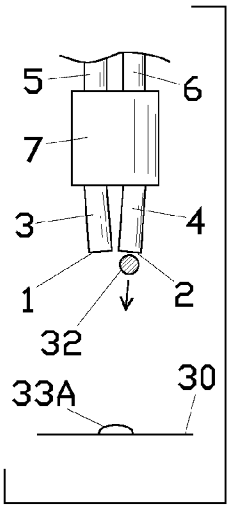
Figure 12D:
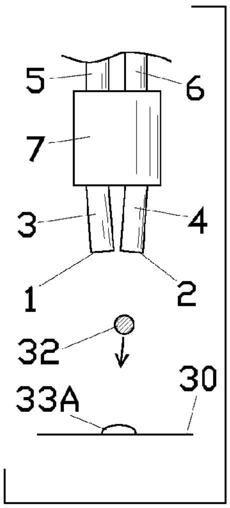
Figure 12E:
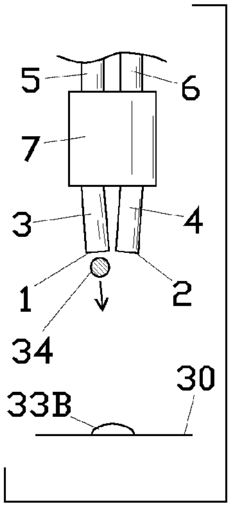
Figure 12F:
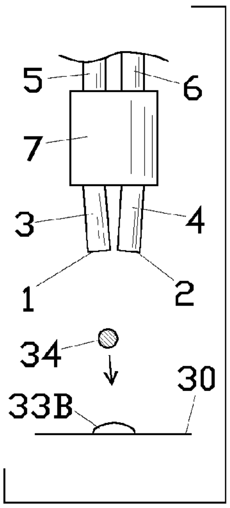
Figure 12G:
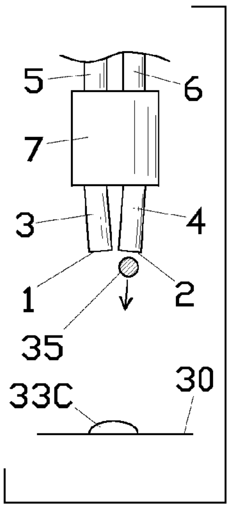
Figure 12H:
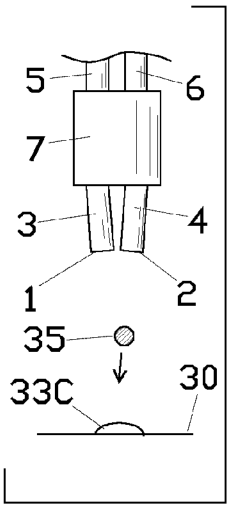
Figure 13A:
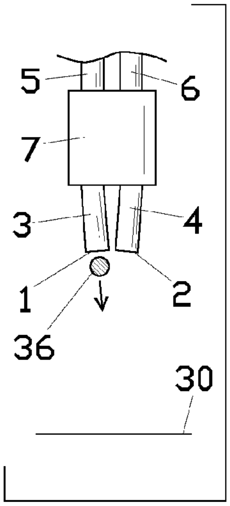
Figure 13B:
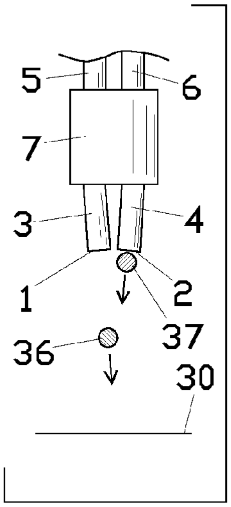
Figure 13C:
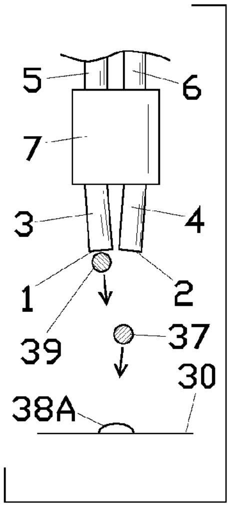
Figure 13D:
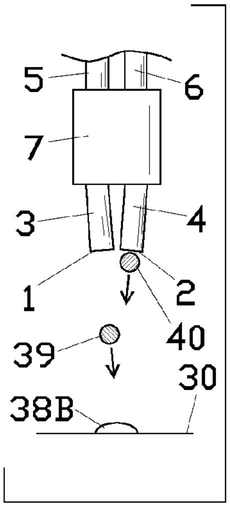
Figure 13E:
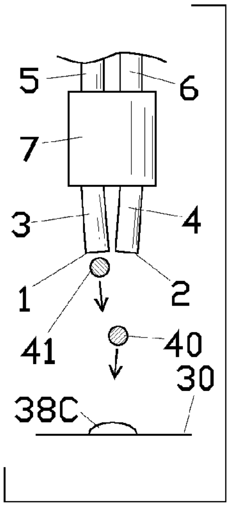
Figure 13F:
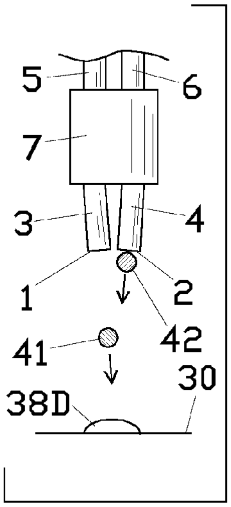
Figure 13G:
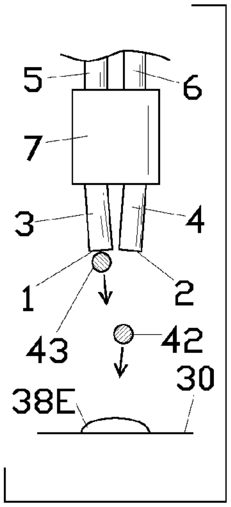
Figure 13H:
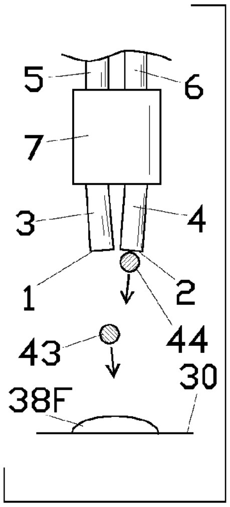

A series of snapshot style drawings are given in FIG. 12A, FIG. 12B, FIG. 12C, FIG. 12D, FIG. 12E, FIG. 12F, FIG. 12G, and FIG. 12H. The nozzle head is the same as in FIG. 1B, drawn at a smaller scale. Liquid droplets land on a target surface 30. A droplet 31 of liquid A is emitted from liquid orifice 1 in FIG. 12A, and continues towards the target in FIG. 12B. In FIG. 12 the droplet has landed on the target as a liquid deposit 33A, and a droplet 32 of liquid B is emitted from liquid orifice 2, which droplet 32 continues towards deposit 33A in FIG. 12D, landing on it in FIG. 12E to form liquid deposit 33B, at which time a droplet 34 of liquid A is emitted from liquid orifice 1. Droplet 34 continues towards liquid deposit 33B in FIG. 12F, landing on it to form liquid deposit 33C, at which time a droplet 35 is emitted from liquid orifice 2. FIG. 12H shows droplet 35 continuing towards liquid deposit 33C, as the entire process is repeated.

Another series of snapshot style drawings are given in FIG. 13A, FIG. 13B, FIG. 13C, FIG. 13D, FIG. 13E, FIG. 13F, FIG. 13G, and FIG. 13H, with R4 set to halve the time between the emission of droplets, showing how droplets may be traveling from the liquid orifices to the target at the same time without contacting each other until reaching the target 30. Summarily, in FIG. 13A a liquid A first droplet 36 is emitted, then in FIG. 13B a liquid B first droplet 37 is emitted, then in FIG. 13C droplet 36 lands forming liquid deposit 38A while a liquid A second droplet 39 is emitted, then in FIG. 13D droplet 37 lands forming liquid deposit 38B while a liquid B second droplet 40 is emitted, then in FIG. 13E droplet 39 lands forming liquid deposit 38C while a liquid A third droplet 41 is emitted, then in FIG. 13F droplet 40 lands forming liquid deposit 38D while a liquid B third droplet 42 is emitted, then in FIG. 13G droplet 41 lands forming liquid deposit 38E while a liquid A fourth droplet 43 is emitted, then in FIG. 13H droplet 42 lands forming liquid deposit 38F while a liquid B fourth droplet 44 is emitted, as the entire process is repeated.

The first embodiment is suited to simple cleaning of small areas, and to the application of polymerizing and agglomerating liquids which are readily soluble in each other.

Second Embodiment

A second embodiment of the device is essentially the same as the first embodiment given above, with the addition of suction to remove liquids applied to the target, and some modification to the liquid orifices. In FIG. 14A, showing the nozzle assembly, and in FIG. 14B, FIG. 14C, and FIG. 14D, showing the nozzle head only, the first and second liquid orifices 1 and 2 of the first embodiment are replaced by a first liquid orifice 45 and a second liquid orifice 46 having different angles for the emission of the liquid droplets. The basic nozzle head support 7 is replaced by an extended nozzle head support for suction 49, which provides for the placement of an inner suction hood 52 and an outer suction hood 53, and for four suction intake paths 47A, 47B, 47C, and 47D, located between the two hoods. The diameter of the suction intake paths as shown is at a minimal size compared to the diameter of the liquid paths. The suction intake paths would be desirably larger or more numerous for some applications. The inner suction hood opening 50 must be at least large enough to not obstruct the paths of the liquid droplets, and may range in size from about 4 millimeters to 2 centimeters in diameter. The opening of the outer suction hood 51 should have a slightly larger diameter, by about 1 to 10 millimeters, and should extend farther from the extended nozzle head support for suction by from about 1 to 10 millimeters. The length of the outer suction hood to its opening should match or mate with the distance to the target determined by the angle of the liquid orifices, so that when the opening of the outer suction hood is placed upon a surface, the liquid droplets emitted will land at the same target location. To relieve internal vacuum inside the hoods, so that liquid is not drawn thereby from the liquid orifices, a gas inlet path 48 is provided. FIG. 2A shows a gas inlet connection port 54, suction intake path join connection 55, unified suction path 56, and suction connection port 57.

FIG. 15 shows, in addition to the contents of FIG. 2 for the first embodiment, the suction nozzle assembly 58 connected by a suction inlet gas path 60 to a suction gas supply 59 for vacuum relief, and a vacuum or suction supply 63 connected by as vacuum line 65 to a collection container 61 which holds collected liquid 62, the collection container connected by a collection line 64 to the suction nozzle assembly.

FIG. 16 shows the basic nozzle head from FIG. 1B at a reduced size. The droplets 66A, 66B, and 66C are in transit in a path 68 from liquid orifice 1 to the intersection with a path 69 followed by droplets 67A, 67B, and 67C from liquid orifice 2. The paths intersect at the target distance 72 measured from the liquid orifices to the intersection place, which is the ideal location for a target. If the distance 70 between the liquid orifices 1 and 2, and the angle 71 between the paths 68 and 69 are both small, the acceptable variation 73 in the target location is relatively large compared to 81 in FIG. 17, which shows a nozzle head as from FIG. 1B but with the more highly angled liquid orifices 45 and 46 from FIG. 14B. Although the distance 78 between liquid orifices 45 and 46 is the same as the distance 70, the angle 79 between path 76, containing droplet 74, and path 77, containing droplet 75, is greater than angle 71, so that the target distance 80 is less, as is the acceptable variation in target distance 81. Because the outer suction hood being in contact with the surface around the target sets a fixed target length, the liquid orifices 45 and 46 can be more highly angled, so that the target length 80 is reduced and the length needed for the outer suction hood is reduced.

The action produced by the second embodiment is essentially the same as the first, with an advantage for cleaning or other surface removal in that the liquids deposited on the surface are not allowed to spread.

Third Embodiment

Chemical actions are affected by conditions such as radiation, mixing, and temperature. A third embodiment supplements the basic design of the first embodiment with features providing radiation, mixing, and control of temperature.

In FIG. 18B, FIG. 18C, and FIG. 18D the nozzle head for the third embodiment is shown with an ultrasonic conduit and emission port 82 and ultrasonic conduit 84, which point a beam of ultrasonic radiation at the target providing mixing or micro-mixing of the small quantities of liquid on the target surface. A fiber optic conduit 85 and fiber optic conduit and emission port 83 aim light at the target, which light may be visible, infrared, or ultraviolet, depending upon the desired effect on the chemicals in the liquid droplets landing on the target surface. The nozzle assembly shown in FIG. 18A includes an ultrasonic transducer 86 and an LED light source 87, the actual scale of which may differ from what is shown schematically in the drawing. A streaming gas flow radiative nozzle head support 135 also supports a first streaming gas orifice support 96, first streaming gas orifice 94, second streaming gas orifice support 97, and second streaming gas orifice 95, connected, as shown in FIG. 18A, to a streaming gas path first branch 98 and second branch 99, respectively. First branch 98 and second branch 99 are joined to a streaming gas path 100 having a connection port 101. The streaming gas is directed at the target where it spreads and mixes the liquid droplets.

Liquid container A 13 and liquid container B 12 have temperature jackets 89A and 89B, shown in FIG. 19, which may be custom made or derived from any of the large number of heating or cooling appliances available in chemical lab ware. An ancillary radiations control 91 powers the ultrasonic transducer 86 and LED light source 87 in a streaming gas flow radiative nozzle assembly 138 pictured in FIG. 18A. A streaming gas supply 102 sends gas through the streaming gas path 103, which divides into two branches 147 and 148 so as to pass through solenoid valve M 149 and solenoid valve N 150 respectively, before rejoining to enter the nozzle assembly 138. A four channel pulse provider 146 sends pulses to open and close solenoid valve A 18, solenoid valve M 149, solenoid valve B 19, and solenoid valve N 150. These pulses are shown in FIG. 11A in the traces 29A, 29M, 29B, and 29N respectively. Moreover, the pulsed streaming gas path passes through a 3 path temperature jacket 137 along with the two liquid paths 16 and 17. A thermostatic temperature control 136 powers the 3 path temperature jacket. The 3 path temperature jacket should be within about 30 centimeters of the nozzle assembly because a gas readily returns to ambient temperature. Because gasses are compressible, solenoid valves M 149 and N 150 should be as close as possible to the nozzle assembly if the streaming gas needs to be pulsed in a manner coordinated with the liquid pulses. For some uses the streaming gas can be applied continuously, eliminating the need for solenoid valves M 149 and N 150, and allowing the two channel pulse provider 20 in FIG. 2 to be used instead of the four channel pulse provider.

Figure 10:
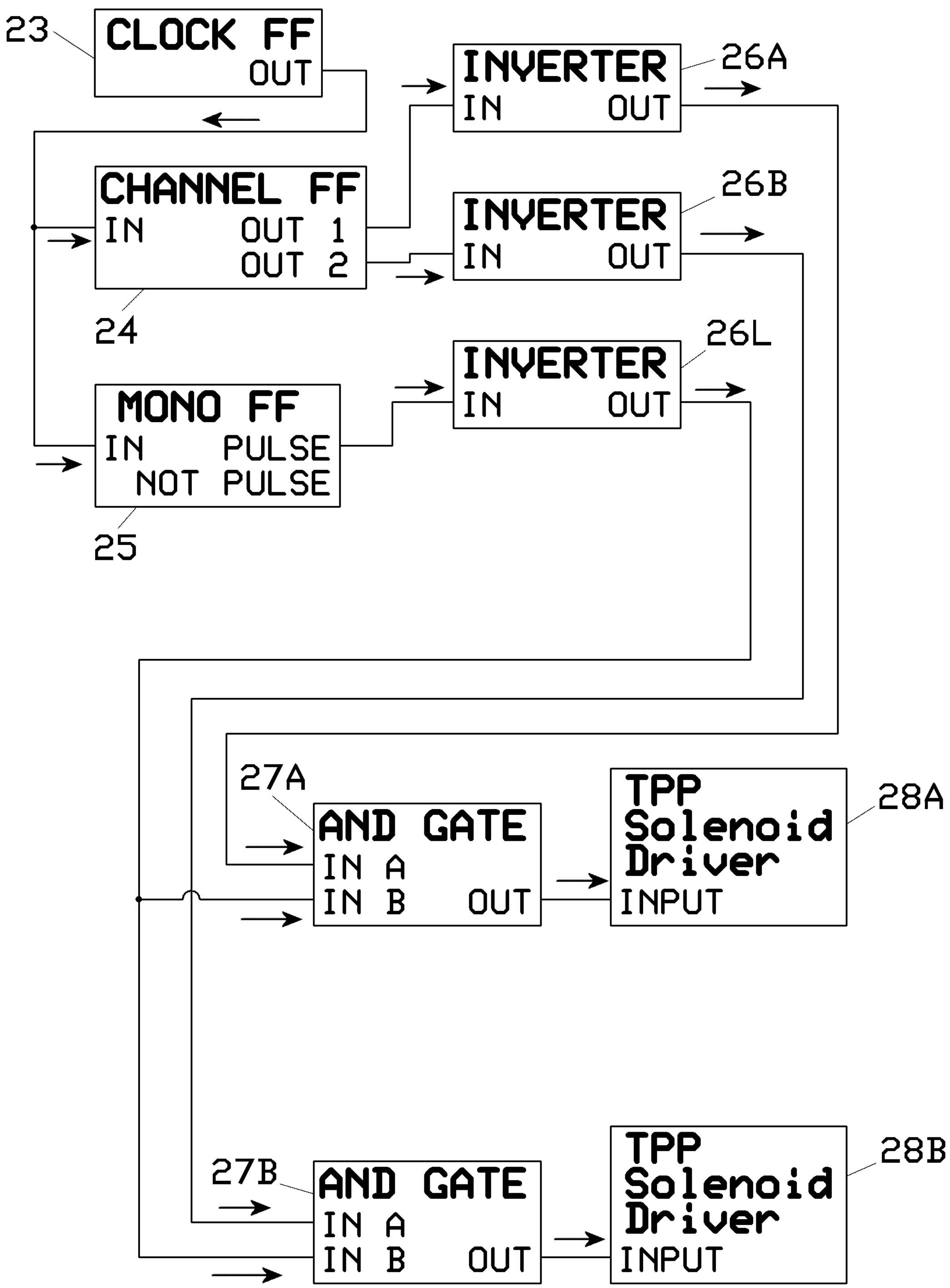
FIG. 10 shows the general schematic of the two channel pulse provider.

As shown in FIG. 20, the four channel pulse provider is an expanded version of the two channel pulse provider of FIG. 10, using an additional INVERTER 26G, two additional AND GATEs 27M and 27N, and two additional TPP Solenoid Drivers 28M and 28N.

The ancillary radiations control powers the ultrasonic and LED radiation sources. The power supply, switch, and voltage sources are shown in FIG. 21 with these component values: 92 power supply for 9 volts and 90 volts; SW15 SPST; IC33 and IC34 LM350; R246 and R247 240R; R248 1K35; R249 618R. A 40 kHz ultrasonic driver is shown in FIG. 22 with these components: C38 0.056 uF; C39 and C40 0.01 uF; C41 1800 pF external ultrasonic transducer; D67 green LED transducer on; IC35 LM555; Q35 MPSA42; R250 470R; R251 1K6; R252 100R transducer frequency adjustment; R253 560R; R254 15K; R255 1K1; R256 220R; R257 4K8; R258 100K transducer power adjustment; SW16 DPST On/off switch for ultrasonic transducer and indicator LED D67. FIG. 23 shows drivers for an ultraviolet and an infrared LEDs: D68 Infrared LED; D69 green LED Infrared LED on; D70 Ultraviolet LED; D71 green LED Ultraviolet LED on; D72 red LED Power on; R259 31R; R260 250R Infrared LED power adjustment; R261 220R; R262 40R; R263 30R; R264 250R Ultraviolet LED power adjustment; R265 220R; R266 113R; R267 10R; SW17 DPDT On/off for infrared LED and indicator LED D69; SW18 DPDT On/off for ultraviolet LED and indicator LED D71.

The three path heating jacket is shown in FIG. 24A and FIG. 24B, and the corresponding thermostatic temperature control is shown in FIG. 26, having these components: D73 red LED; D74 green LED; F1 1 AMP fuse; IC36 and IC37 LM350; Q36 2N6031; Q37 2N4401; Q38 2N4403; R268 748R; R269 1K72; R270 and R271 240R; R272 15K; R273 12K; R274 7K6; R275 29K; R276 1K1; R277 250R temperature adjust—decreasing resistance increases temperature; R278 67R Heating Coil, corresponds to 140 in FIG. 24A, FIG. 24B, FIG. 25A, and FIG. 25B; RT1 Thermistor, corresponds to 139 in FIG. 24A, FIG. 24B, FIG. 25A, and FIG. 25B; SW19 SPST. When gas flows through a tubular path 141 it exits past a thermistor 139, the resistance of which adjusts the power supplied to the heating coil 140. The internal insulation and support material 144 transfers some heat to tubular paths for liquid flow 142. Except where ends of the tubes protrude for external connection, the heating jacket is encased in an external shell or covering 143. The heating coil can be made of a material such as nichrome. The tubes should be made of PTFE, glass, or other heat and chemical resistant material.

The effect of streaming gas is illustrated in FIG. 27A thru FIG. 27H, FIG. 28A thru FIG. 28H, and FIG. 29A thru FIG. 29H. The radiative components 82, 84, 83, and 85 have been omitted, and a streaming gas flow nozzle head support 93 shown instead of the streaming gas flow radiative nozzle head support 135. As in FIGS. 12A thru 12H a target surface 30 is shown. Both the rate of gas flow and the length of the interval between droplets effect the outcome on the target surface.

Figure 27A:
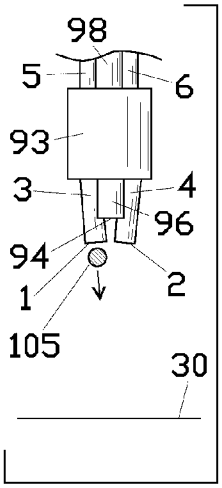
Figure 27B:
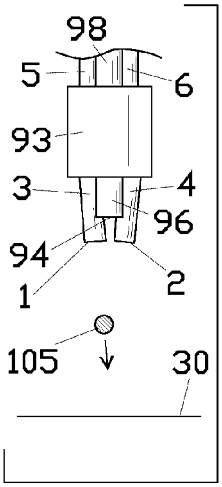
Figure 27C:
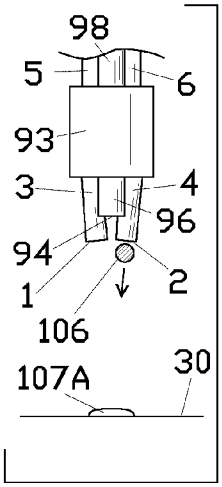
Figure 27D:
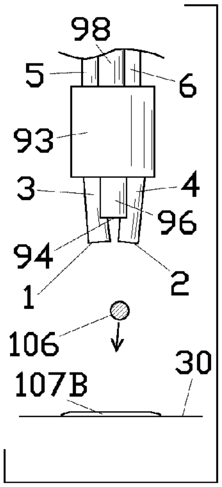
Figure 27E:
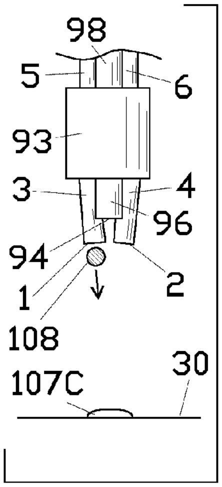
Figure 27F:
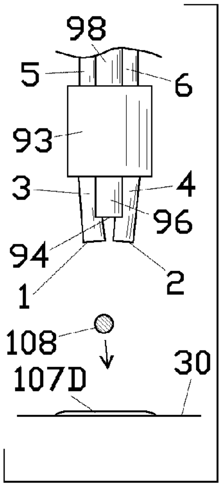
Figure 27G:
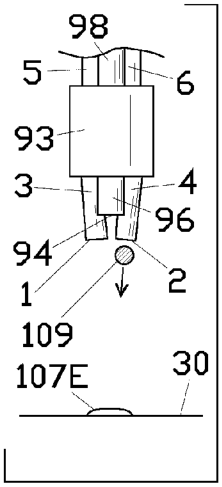
Figure 27H:
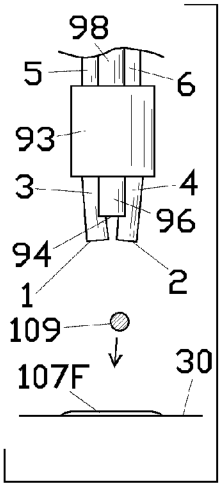

In FIG. 27A thru FIG. 27H the gas flow is sufficiently strong to push droplet away before the next droplet lands. A droplet 105 of liquid A is emitted from liquid orifice 1 in FIG. 27A, and continues towards the target in FIG. 27B. In FIG. 27 the droplet has landed on the target as a liquid deposit 107A, and a droplet 106 of liquid B is emitted from liquid orifice 2, which droplet 106 continues towards the spread out and thinned deposit 107B in FIG. 27D, landing on the cleared or nearly cleared target 30 in FIG. 27E to form liquid deposit 107C, at which time a droplet 108 of liquid A is emitted from liquid orifice 1. In FIG. 27F droplet 108 continues towards liquid deposit 107D, which is being flattened and pushed away by the streaming gas. In FIG. 27G the liquid from deposit 107D has been essentially blown off from the target, when droplet 108 lands to form liquid deposit 107E, at which time a droplet 109 is emitted from liquid orifice 2. FIG. 27H shows droplet 109 continuing towards liquid deposit 107F as it in turn is being pushed away by the streaming gas, as the entire process is repeated. This action would be used for cleaning a surface with alternate solvents.

Figure 28A:
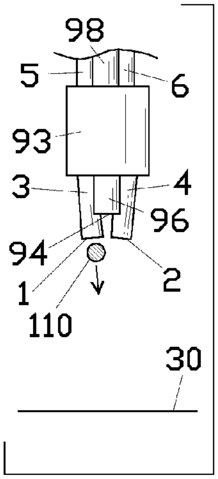
Figure 28B:
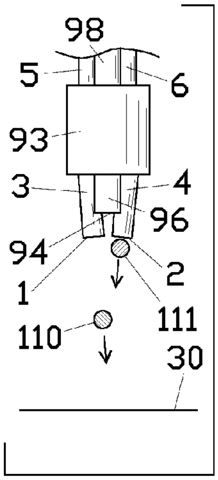
Figure 28C:
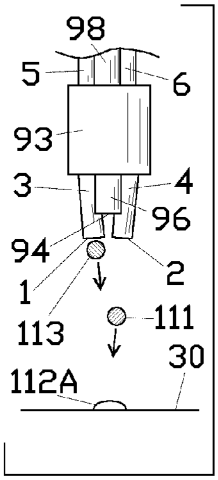
Figure 28D:
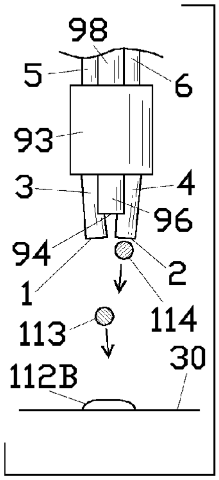
Figure 28E:
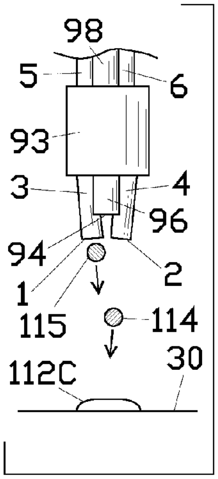
Figure 28F:
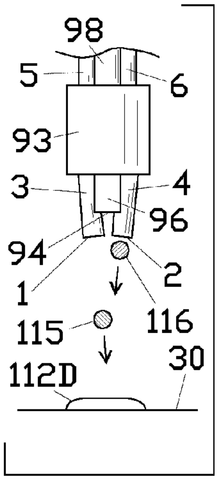
Figure 28G:
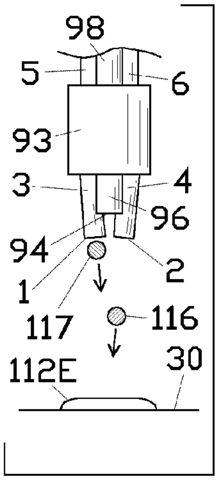
Figure 28H:
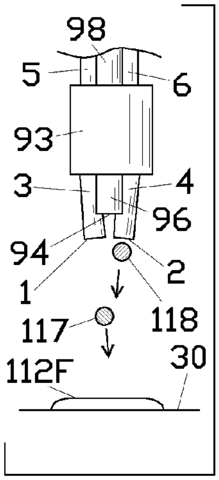

When the emission of droplets is faster and the streaming gas flow is slightly reduced a different action occurs on the target surface. In FIG. 28A a liquid A first droplet 110 is emitted, then in FIG. 28B a liquid B first droplet 111 is emitted, then in FIG. 28C droplet 110 lands forming liquid deposit 112A while a liquid A second droplet 113 is emitted, then in FIG. 28D droplet 111 lands forming liquid deposit 112B while a liquid B second droplet 114 is emitted, then in FIG. 28E droplet 113 lands forming liquid deposit 112C while a liquid A third droplet 115 is emitted, then in FIG. 28F droplet 114 lands forming liquid deposit 112D while a liquid B third droplet 116 is emitted, then in FIG. 28G droplet 115 lands forming liquid deposit 112E while a liquid A fourth droplet 117 is emitted, then in FIG. 28H droplet 116 lands forming liquid deposit 112F while a liquid B fourth droplet 118 is emitted, as the entire process is repeated. The liquids from the droplets accumulate, mix, and spread out into an even deposit, suitably for applying epoxies or other polymerizing liquids.

Figure 29A:
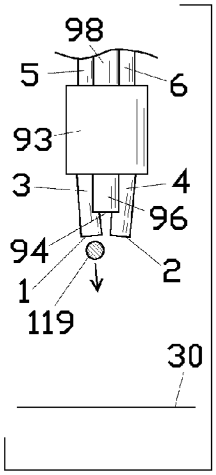
Figure 29B:
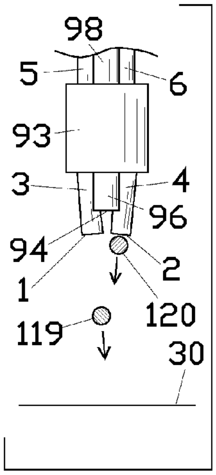
Figure 29C:
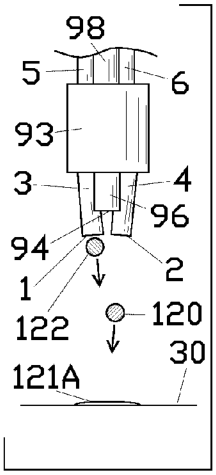
Figure 29D:
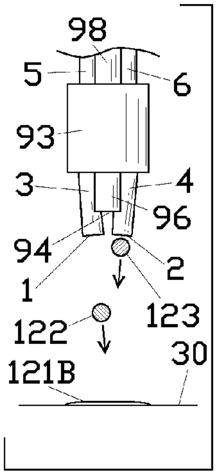
Figure 29E:
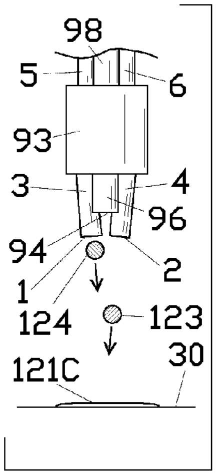
Figure 29F:
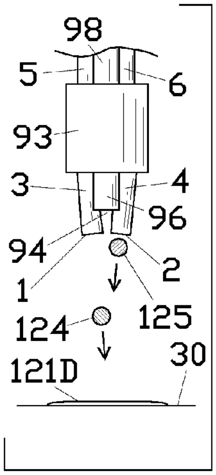
Figure 29G:
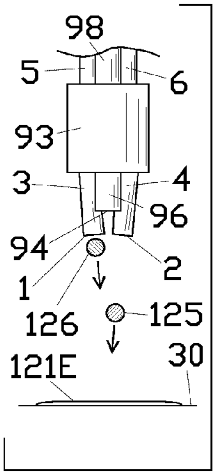
Figure 29H:
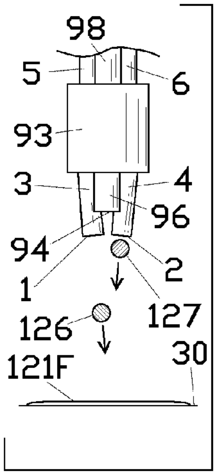

When the emission of droplets is as fast as the preceding example and the gas flow is sufficiently stronger, each droplet has been spread into a thin film when the succeeding droplet of the other liquid lands, with a mixture of the two liquids spreading around the perimeter of the target location. In FIG. 29A a liquid A first droplet 119 is emitted, then in FIG. 29B a liquid B first droplet 120 is emitted, then in FIG. 29C droplet 119 lands forming liquid deposit 121A while a liquid A second droplet 122 is emitted, then in FIG. 29D droplet 120 lands forming liquid deposit 121B while a liquid B second droplet 123 is emitted, then in FIG. 29E droplet 122 lands forming liquid deposit 121C while a liquid A third droplet 124 is emitted, then in FIG. 29F droplet 123 lands forming liquid deposit 121D while a liquid B third droplet 125 is emitted, then in FIG. 29G droplet 124 lands forming liquid deposit 121E while a liquid A fourth droplet 126 is emitted, then in FIG. 29H droplet 125 lands forming liquid deposit 121F while a liquid B fourth droplet 127 is emitted, as the entire process is repeated. This action, where each droplet encounters and mixes with a thin film of the other liquid on the surface, is suited to depositing thin layers of precipitated material.

Fourth Embodiment

The two channel and four channel pulse providers produce pulses having the same length on channel A and channel B, and the same length of a pause between those pulses. For some processes it would be desirable to mix a droplet of one liquid onto or with a droplet of the other liquid, and then blow the mixture away. This would require the pause after the second droplet to be longer than the pause after the first droplet, allowing the streaming gas flow more time to act. Slight differences in the response times of the liquid solenoid valves, and differences in the effective viscosity of the liquids in the liquid tubing paths, could be corrected by separately adjusting the pulse lengths on channel A and channel B. Moreover, it may be desirable to apply droplets of more than two liquids, or to periodically interrupt a repetitive droplet application to allow more time for applied radiations to have an effect, or to apply a special flow of a gas, or to apply a sequence of other liquids. The fourth embodiment is an example of addressing these considerations. The essential action retained from the preceding embodiments is that separate droplets of liquids are applied to a target surface without appreciable prior contact. Some features of the third embodiment are retained, but ancillary radiations are not shown, and streaming gas flow is continuous rather than pulsed.

The nozzle head for the fourth embodiment is shown in FIG. 30B, FIG. 30C, and FIG. 30D, and the nozzle head assembly is shown in FIG. 30A. The gas hood and streaming gas flow nozzle head support 151 has an intermittent gas hood 155. An intermittent gas path 153 channels gas out through an intermittent gas path orifice 152, from where the gas spreads out and exits the opening of the intermittent gas hood 154, traveling towards the target. In FIG. 30A is a connection port for the intermittent gas path 156. All other labeled features are as in FIG. 18A, FIG. 18B, FIG. 18C, and FIG. 18D for the third embodiment. The intermittent gas hood opening 154 must be at least large enough to not obstruct the paths of the liquid droplets, and may range in size from about 4 millimeters to 2 centimeters in diameter. The intermittent gas hood opening 154 may extend beyond the liquid orifices 1 and 2 but not past the expected distance to the target location, and should be at a sufficient distance from the intermittent gas path orifice 152 so that the intermittent gas flows out of the hood opening 154 in a mostly evenly distributed way. The intermittent gas path orifice 152 is shown at a minimal scale compared to the diameters of the liquid orifices 1 and 2. By suitable enlargement of the intermittent gas hood the intermittent gas path and intermittent gas path orifice could be larger. Also, the intermittent gas path could be provided with several branches, similar to what is shown for the suction intake paths in FIG. 14A.

The intermittent gas supply 157, in FIG. 31, sends gas along the intermittent gas supply path 158. The flow of the intermittent gas is controlled by a normally closed solenoid valve G 160. Solenoid valves G 160, A 18, and B 19 are controlled by a multichannel pulse provider 159. The intermittent gas path 158, the two liquid paths 16 and 17, and the streaming gas path 103 pass through a 4 path temperature jacket 161, and on to connect to a gas hood and streaming gas flow nozzle assembly 162, as shown in FIG. 30A, at streaming gas path connection port 101, liquid connection ports 8 and 9, and intermittent gas connection port 156, respectively.

The multichannel pulse provider makes use of circuits, called herein chainable pulse generators, FIG. 36A, FIG. 36B, FIG. 37A, and FIG. 37B, which furnish a means of producing a sequence of separately regulated pulses following each other, each on its own output channel. The multichannel pulse provider also counts the number of times a pulse sequence has been executed, FIG. 38A and FIG. 38B, and compares that count, FIG. 39A and FIG. 39B, to a value set in binary coded decimal switches, FIG. 40A and FIG. 40B, all shown together in FIG. 41A and FIG. 41B. When the count reaches that value, a counter gate, FIG. 42A and FIG. 42B, directs the sequence of pulses to a gated chainable pulse generator, FIG. 43A and FIG. 43B, herein shown as only one, but which may be the first in a separate chain or sequence of chainable pulse generators. The counter gate 173 and gated chainable pulse generator 174 are shown connected in FIG. 44A and FIG. 44B. The end of the positive output pulse of the gated chainable pulse generator, or the last of several chainable pulse generators if more than one follow in a separate chain, is passed back to the original sequence of chainable pulse generators. For fine tuning the separately adjustable pulse lengths, a pulse length display, FIG. 50A, accurate to about 2 microseconds, is included.

The details of the circuitry for the multichannel pulse provider are given, as follows, in FIG. 32 thru FIG. 51. The circuitry itself is shown in a numbered figure with the suffix A, and a labeled schematic symbol or block diagram representation of that circuit is shown in a figure with the same number, and the suffix B. The circuitry has been organized in a modular manner. The integrated circuits, or ICs, used are represented after the electronics industry's standard pin out arrangements for the physical components. For clarity in the drawings the pin numbers have been omitted, although the abbreviated pin labels are shown inside the representation of an IC. All IC's are shown in an upright position such that pin numbering proceeds from pin 1 at the upper left corner, down the left side, across to the lower right corner, and up the right side to the highest numbered pin at the upper right corner.

The voltage sources for the multichannel pulse provider, or MPP, are shown in FIG. 32. A 24 volt power supply 163 is adjusted to 25.6 volts for the MPP solenoid driver FIG. 45A. Two different 5 volt sources prevent interaction between the pulse generation circuitry and the digital pulse length measurement circuits. The voltage regulators are cascaded for even output and to avoid overheating. The components are: SW2 SPST; C6 47 uF; C7 0.47 uF; C8 4.7 uF; IC1 thru IC7 LM350; R39 100R; R40 and R42 3K; R41 240R; R43, R44, R47, R49, R51, and R53 240R; R45 1K54; R46 and 1K8; R50 and R52 748R.

The start and stop control FIG. 33A opens and closes Q12, allowing or disallowing a pulse from the last chainable pulse generator to trigger the first chainable pulse generator in the loop thereof. SW3 puts both flip flops of IC8 in the ON state, and SW4 clears them. When the second flip flop in IC8 changes to the ON state, the first flip flop in IC9 temporarily changes to the OFF state, sending a positive pulse about 2 microseconds long from NOT Q1 to R54 so as to initiate the pulse sequence by triggering the first chainable pulse generator. The component values are: C9 and C10 0.01 uF; C11 33 uF; D11 green LED; D12 amber LED; IC8 and IC9 DM74S112N; Q12, Q13, and Q14 2N4401; R54 200K; R55 20K; R56 and R57 10K; R58 36R; R59, R60, and R61 510R; R62 and R63 39K; R64 and R65 270K; R66 100R; R67 1K; SW3 and SW4 SPST momentary NO. In FIG. 33B the schematic symbol 164 for the start stop control is shown.

A high resolution timer switch is shown in FIG. 34A. It adjusts positive pulse widths from about 0.2 to 100 milliseconds. Its component values are: C12 0.11 uF; C13 0.22 uF; C14 0.47 uF; C15 1.2 uF; C16 2.2 uF; C17 3.3 uF; C18 0.056 uF; R68 9K1; R69 6K8; R70 6K2; R71 6K8; R72 5K1; R73 1K0; R74 thru R84 976R; R86 12M; R85 1K multiturn potentiometer for fine adjustment of pulse width; SW5 6PDT range for pulse width; SW6 12PST subrange for pulse width. Its symbol 165 is in FIG. 34B. A high range timer switch is shown in FIG. 35A. It adjusts positive pulse widths from about 0.001 to 12 seconds. Its component values are: C19 0.47 uF; C20 2.2 uF; C21 12 uF; C22 33 uF; C23 47 uF; C24 94 uF; C25 0.056 uF; R87 51K; R88 47K; R89 18K; R90 10K; R91 10K; R92 1K0; R93 thru R103 4K87; R105 12M;

R104 5K multiturn potentiometer for fine adjustment of pulse width; SW7 6PDT range for pulse width; SW8 12PST sub-range for pulse width. Its symbol 166 is in FIG. 35B.

A chainable pulse generator, CPG, is shown in FIG. 36A. Because an LM555 timer requires the voltage at the TRIG input to return to positive before the voltage at OUT returns to negative, LM555 timers cannot be directly chained in a loop from the output of one to the trigger of another. In this circuit IC10 is configured to act as down going edge detector producing a positive detection pulse lasting about 2 microseconds from output NOT Q1, which is enough to trigger an LM555 in a stable manner as long as the pulse put out by the LM555 is longer than 2 microseconds, as is the case here. This configuration for IC10 is similar to that of IC9 in FIG. 33A. The components are: C26, C27, and C28 0.01 uF; IC10 DM74S112N; IC11 LM555; R106 5K1; R107 8K2; R108 1K0; R109, R110, and R111 510R; R112 29K; R113 680R; R114 180R; and 165 high resolution timer switch. A high resolution CPG symbol 167 is in FIG. 36B. A high range CPG circuit is shown in FIG. 37A with the components: C29, C30, and C31 0.01 uF; IC12 DM74S112N; IC13 LM555; R115 5K1; R116 8K2; R117 1K0; R118, R119, and R120 510R; R121 29K; R122 680R; R123 180R; and 166 high range timer switch. A high range CPG symbol 168 is in FIG. 37B.

A binary coded decimal counter, BCD count, shown in FIG. 38A has the components: D13 and D14 1N4148; IC14 HCF4518B; Q15, Q17, and Q18 2N4401; Q16 and Q19 2N4403; R124 12M; R125 10K; R126 476K; R127 11K; R128, R131, and R133 470K; R129 8K2; R130 and R132 39K; R134 11K; R135 100R; R136 12M; R137 thru R160 4K7. The schematic symbol for BCD count 169 is shown in FIG. 38B. A binary coded decimal comparator, BCD compare, shown in FIG. 39A has the components: IC15 and IC16 CD74HC85E; R161 thru R168 4K7. A schematic symbol for BCD compare 170 is shown in FIG. 39B. FIG. 4A shows binary coded decimal switches, BCD switches, with the components: C32 47 uF; D15 thru D22 1N4148; R169 220R; R170 1K; SW9 and SW10 BCD switch. The schematic symbol for BCD switches 171 is shown in FIG. 40B. These three circuits are shown connected in BCD count and compare, FIG. 41: BCD count 169, BCD compare 170, and BCD switches 171. The schematic symbol for BCD count and compare 172 is shown in FIG. 41B.

A circuit BCD counter gate is shown in FIG. 42A. When any switch in BCD switches is closed to the positive common, Q27, Q24, and Q26 conduct, and Q25 does not conduct; otherwise Q27, Q24, and Q26 do not conduct, and Q25 conducts. If the value set in BCD switches is zero, a pulse from a previous CPG is passed thru Q25 to the next CPG; otherwise the pulse is passed thru Q24 to Q20 and Q21. Ordinarily, Q21 conducts the entering pulse to Q26, and Q20 and Q22 do not conduct. Q20, Q21, and Q22 are controlled by IC17 outputs Q1 and NOT Q1, which in turn are controlled by IC16 output A<BO FIG. 39A, to IC17 input PR1. IC17 causes Q20 and Q22 to conduct, and Q21 to not conduct, when A<BO in IC16 is low, that is when the count has reached the value set in the BCD switches. The pulse is passed thru Q20 to a gated CPG, FIG. 43A, the output pulse of which is returned thru Q22 and Q26. BCD counter gate FIG. 42A has these components: IC17 DM74S112N; Q20 thru Q27 2N4401; R171 18K2; R172 and R173 10K; R174 11K; R175 51K; R176 and R177 39K; R178 470K; R179 1K; R180 29K; R181 20K; R182 82R; R183 20K; R184 and R185 10K; R186 82R. The schematic symbol for BCD counter gate 173 is shown in FIG. 42B. The gated CPG, FIG. 43A, uses these components: C33 and C34 0.01 uF; IC18 DM74S112N; R187 5K1; R188 8K2; R189 1K0; R190, R191, and R192 510R; and 168 CPG High Range. The schematic symbol for the gated CPG 174 is shown in FIG. 43B. The BCD counter gate 173 and the gated CPG 174 are shown connected together in FIG. 44A to form a counter gated CPG. The schematic symbol for counter gated CPG 175 is shown in FIG. 44B.

A multichannel pulse provider solenoid driver, or MPP solenoid driver, is shown in FIG. 45A with these components: D23 thru D27 1N418; D28 blue LED; D29 green LED; D30 red LED; D31 and D32 1N4937; L2 external solenoid valve; Q28 2N6031; Q29 2N4401; R193 940K; R194 180K; R195 20K; R196 8K2; R197 29K; R198 7K5; R199 12M; SW11 momentary SPST for loading and purging liquid paths; SW12 DPST. The schematic symbol for MPP solenoid driver 176 is shown in FIG. 45B.

FIG. 46A thru FIG. 49B show the circuitry for a digital display of the time period in seconds and fractions of a second of a positive pulse from a switch selected chainable pulse generator, or of how long the multichannel pulse provider has been active, up to 99 seconds.

A 1 MHz signal is produced by the circuit in FIG. 46A, using these components: C35 0.0022 uF; D33 and D34 1N4148; IC19 4 MHz oscillator; IC20 DM74S112N; R200 820R; R201 300R; R202 20R. The schematic symbol for the 1 MHz circuit 177 is shown in FIG. 46B.

A binary coded decimal counter and two display digits is shown in FIG. 47A with these components: D35, D36, D37, D40, D41, and D42 1N4148; D38, D39, D43, and D44 1N6275A1; IC21 HCF4518B; IC23 and IC25 MAN6880; IC22 and IC24 MC74HC4511N; R203 thru R210 180K. The schematic symbol for the two digit display, TDD, 178 is shown in FIG. 47B. Instances of this circuit can be cascaded to count and display values from microseconds to seconds. A two digit display high digits, TDDHD, shown in FIG. 48A, is the same circuit as in FIG. 47A except that a decimal point is enabled in IC30 via R216. The component values in FIG. 48A are: D45, D46, D47, D50, D51, and D52 1N4148; D48, D49, D53, and D54 1N6275A1; IC26 HCF4518B; IC28 and IC30 MAN6880; IC27 and IC29 MC74HC4511N; R211 thru R219 180K. The schematic symbol for the two digit display high digits 179 is shown in FIG. 48B.

A digital display switch shown in FIG. 49A selects which chainable pulse generator to monitor, or the length of time that the multichannel pulse generator has been active. It has these components: C36 68 pf; D55, D57, D59, D61, and D63 green LED; D56, D58, D60, D62, and D64 YELLOW LED; Q30 2N3906; R220 9K1; R221 240R; R223 43K; R224 300R; R225 470K; R226 5.5K; R227 470K; R228 36R; SW13 6PDT. The schematic symbol for the digital display switch 180 is shown in FIG. 49B. The digital display switch sends the selected pulse to the pulse length display shown in FIG. 50A, which uses these components: C37 0.01 uF; IC31 DM74S112N; Q31 2N4403; Q32 2N4401; Q33 2N3904; R229 300R; R230 2K2; R231 470K; R232 6K4; R233 1K5; R234 10R; R235 10K; R236 470K; R237 180R; R238 6K2; R239 470R; R240 470R; R241 390R; R242 470R; 177 1 MHz signal; 178A, 178B, and 178C are cascaded instances of the two digit display; and 179 two digit display high digits. The schematic symbol for the pulse length display 181 is shown in FIG. 50B.

The general schematic for the multichannel pulse provider is shown in FIG. 51. When the start stop control 164 is started by SW3 in FIG. 33A, a brief pulse is sent to high resolution CPG 167A, which produces an output pulse to MPP solenoid driver 176A, and to high resolution CPG 167M, which is triggered by the down going edge of that pulse. The down going edge of the pulse from CPG 167M triggers high resolution CPG 167B, the output pulse from which will there after trigger high resolution CPG 167N. Since this embodiment uses continuous rather than pulsed streaming gas, MPP solenoid drivers 167M and 167N can each be turned off with the corresponding switch SW12 in FIG. 45A. The high resolution CPGs 167A and 167B by means of solenoid drivers 176A and 176B operate solenoid valve A 18 and solenoid valve B 19 in FIG. 31, respectively. The pulse from high resolution CPG 167N goes to the counter gated CPG 175. BCD count and compare 172 will have been counting the pulses from high resolution CPG 167B and comparing them to the setting in BCD switches. If the switches are all zeroes, or if the count of pulses is less than the value in BCD switches, counter gated CPG 175 passes the pulse thru to the start stop control 164, which, if still in the start condition, passes the pulse to high resolution CPG 167A, completing a loop of chained pulses. If the count is equal to the value in BCD switches, the pulse from high resolution CPG 167N is followed by a pulse from the gated high range CPG 168 in FIG. 43A, which goes to MPP solenoid driver 176G, controlling solenoid valve 160G in FIG. 31. Instead of the pulse from CPG 167N, the pulse from high range CPG 168 goes to the start stop control 164, which, if still in the start condition, passes the pulse to high resolution CPG 167A, completing the loop of chained pulses, with the pulse from CPG 168 inserted in the chain. The counter IC14 FIG. 38A in BCD count, itself in BCD count and compare, is reset, and the entire sequence is repeated until the start stop control is placed in a stop condition by SW4 in FIG. 33A.

The digital display switch 180 can be used while the multichannel pulse provider is operating to select a CPG to monitor, the value of a positive pulse's length being then displayed by the pulse length display 181. The length of time, up to 99 seconds, that a pulse chain has been operating can also be displayed. The actuation of a corresponding solenoid valve by a solenoid driver can be turned off with the corresponding switch SW12 in FIG. 45A.

Additional chainable pulse generators can be connected in the main loop described above as containing 167A, 167M, 167B, and 167N. Additional chainable pulse generators can be connected with the gated chainable pulse generator in counter gated CPG 175. This allows for the control of potentially elaborate configurations of applied droplets and gasses.

Sample outputs from the CPGs of multichannel pulse provider are shown in FIG. 11B for a case where the value in the BCD switches is 2. The traces shown are idealized, and do not show rise or fall times, or slight delays, under a microsecond, between succeeding pulses. Trace 182A represents the output of high resolution CPG 167A, trace 182M represents the output of high resolution CPG 167M, trace 182B represents the output of high resolution CPG 167B, trace 182N represents the output of high resolution CPG 167N, and trace 182G represents the output of high range CPG 168. The multichannel pulse provider can be set to produce traces like those shown in FIG. 11A as well by setting the value in the BCD switches to 0. The pulse shown in 192N is about 20 milliseconds in length. If this is lengthened sufficiently, for example to about 45 milliseconds, the combined droplets of liquid A and liquid B will be pushed nearly entirely from the surface. The separate adjustability of the pulse timings allows different actions to be produced on the target surface with a continuous streaming gas flow. The actions shown in FIG. 27A thru FIG. 27H, FIG. 28A thru FIG. 28H, and FIG. 29A thru FIG. 29H can be fine tuned or intercombined. The inserted additional pulse shown in trace 182G can be used to apply a burst of a drying gas, or a gas having some other chemical effect. The inserted pulse can also be used to allow additional time for ancillary radiations, not shown, to have an effect on the target area. The intermittent pulse 182G allows additional warmed gas to be applied to dry out or dehydrate a precipitated layer thus far formed on the target, while pushing away residual loose material. If the device is being used to apply epoxy components, the intermittent pulse helps to flatten the deposit and speed curing with additional warm gas, or air. If the device is being used for removal from the target, the intermittent pulse of warm or hot air or other gas brushes off the target surface and evaporates excess solvent.

In FIG. 25A and FIG. 25B a four path heating jacket is shown which accommodates both the streaming gas flow and the intermittent gas flow. It is an altered version of the heating jacket shown in FIG. 24A and FIG. 24B, with a tubular path for intermittent gas flow 145. The other components are, as before, a thermistor 139, RT1 in FIG. 33, a heating coil 140, R278 in FIG. 33, a tubular path for streaming gas flow 141, tubular paths for liquid flow 142, an exterior shell or covering 143, and internal insulation and support material 144. The thermostat shown in FIG. 26 is used with the four path heating jacket.

Fifth Embodiment

A fifth embodiment of the device uses a five fold nozzle assembly shown in FIG. 52A, with orthographic views of the five fold nozzle head shown in FIG. 52B, FIG. 52C, and FIG. 52D. The liquid orifices for liquids A, B, C, D, and E are 185, 186, 187, 188, and 189, respectively, and are angled to direct liquid droplets to a target area. The corresponding liquid orifice supports or extensions are 190, 191, 192, 193, and 194, respectively. The corresponding liquid paths are 195, 196, 197, 198, and 199, respectively. FIG. 52A shows the liquid path connection ports, which may be of a luer or other type, as 201, 202, 203, 204, and 205, respectively. Streaming gas is supplied to the five fold nozzle assembly thru a connection port 222 and streaming gas path 221, which connects to a first 216, second 217, third 218, fourth 219, and fifth 220 streaming gas path branches. The streaming gas path branches connect to corresponding gas orifice supports or extensions, 211, 212, 213, 214, and 215, respectively, which in turn supply streaming gas to streaming gas orifices 206, 207, 208, 209, and 210, respectively, which direct streaming gas to the target area. The liquid and gas paths and orifice supports are held together as shown by the five fold nozzle head support 200, which may be made of epoxy, plastic, or other suitable material for keeping the tubes of the gas and liquid paths and orifice supports in correct position; or the entirety of these may be made of one piece of suitable substance. As in the preceding embodiments, PTFE is a preferred choice for the tubing and orifices.

Similar to the first embodiment, FIG. 53 shows a container gas supply 10, which pressurizes liquid containers thru pressure line 11 to propel their liquid contents thru solenoid valves and out of the liquid orifices as droplets. Containers A 13, B 12, C 223, D 224, and E 225 hold liquids A 14, B 15, C 226, D 227, and E 228, respectively, which travel along the liquid paths A 17, B 16, C 229, D 230, and E 231, respectively, encountering solenoid valves A 18, B 19, C 232, D 233, and E 234, respectively, and then go on to the five fold nozzle assembly 236. As in the third embodiment, there is a streaming gas supply 102, and a streaming gas path 103 that connects to the five fold nozzle assembly 236. The solenoid valves, which are normally closed, are controlled by a computerized pulse provider 235.

Although the modular design of the multichannel pulse provider of the fourth embodiment allows potentially elaborate designs for the rest of the sequential droplet applicator, the actual hardware of the circuitry must be changed to do so. A computerized pulse provider is reconfigurable largely by merely rewriting the code of the controlling software. A further advantage is that the software can provide other output pulses for coordination with other equipment being used with the sequential droplet applicator. The computerized pulse provider for the fifth embodiment uses a 25.6 volt power supply 237 and switch SW14 shown in FIG. 24. An optically isolated solenoid driver is shown in FIG. 55A. IC32 is a CNY17-4-000E, an optically switched transistor, which receives input pulse and ground connections from a computer. Other components of the optically isolated solenoid driver are D65 and D66 1N4937; L3 external solenoid valve; Q34 2N6031; R243 8K2; R244 300R; R245 29K. FIG. 55B shows the schematic symbol for the optically isolated solenoid driver 238.

Two options are shown for using a computer to control a pulse provider. FIG. 56 shows an option with a USB to serial port interface. FIG. 57 shows an interface provided by a digital I/O card. A USB to serial port interface is considerably less expensive than a digital I/O card, but is in some respects hampered in its operation insofar as that the operating system of the computer will interrupt the smooth operation of the pulse provider's program from time to time to handle other operating system requests. On a computer with a multicore CPU this may be less of a problem. In FIG. 56 and FIG. 57 the components are: computer 239; USB connection 240; USB to serial port interface 241; digital I/O card 242; 238A, 238B, 238C, 238D, 238E, 238F, and 238G optically isolated solenoid driver. With a suitable controlling program, the configuration of pulses shown in the traces 243A thru 243G in FIG. 12C, corresponding to solenoid drivers 238A thru 238G, can be produced. In this sample application, two liquids A and B interact catalytically on a catalytic surface, and are rinsed away with the product by a liquid C, while the pulse in 243F holds open a valve, not part of the sequential droplet applicator, to receive the product. The pulse in 243D causes a catalyst reactivation liquid D to be applied to the target surface, followed by catalyst rinsing liquid E released by the pulse in 243F; these last two liquids are applied while the product reception valve is closed and a waste reception valve, not itself part of the sequential droplet applicator, is opened by the pulse in 243G. The details of this are contained as comments in the following program listing, which is written in Visual Basic 6 ®Microsoft Corp., for use with a USB to serial converter.

Further possible embodiments, not shown, may be formed by having different numbers of liquid orifices, paths, solenoid valves, and containers. With suitable liquids, and modified pulse providers, piezoelectric pumps or microelectronic emitters can replace or augment solenoid valves. Different patterns of sequential droplet application can be implemented. More than one gas can be used. A variety of combinations of temperature controls can be applied to the liquids and gasses. A variety of sources of radiation can be applied to the target surface. These remarks and the five embodiments given should be taken as only illustrative of the variety of applications possible; the scope should be determined by the claims and their legal equivalents.

Program listing.

```
' From global1.bas:                                                        ' line 000
Public Declare Function GetCurrentProcess Lib "kernel32" ( ) As Long
Public Declare Function SetPriorityClass Lib "kernel2" _
(ByVal hProcess As Long, ByVal dwPriorityClass As Long) As Long
Public Const REALTIME_PRIORITY_CLASS = &H100                               ' line 004
Public Const NORMAL_PRIORITY_CLASS = &H20                                  ' line 005
Public Declare Function QueryPerformanceFrequency Lib "kernel32" _
(lpFrequency As Currency) As Long                                          ' line 007
Public Declare Function QueryPerformanceCounter Lib "kernel32" _
(lpPerformanceCount As Currency) As Long                                   ' line 009
Public Declare Sub Sleep Lib "kernel32" (ByVal dwMilliseconds As Long)
Public countfrequency As Currency, countcurrent As Currency
Public countend As Currency, timeerror As Currency                         ' line 012
Public str255 As String, str0 As String, str1 As String                    ' line 013
Public channel_open_time(1 To 8) As Currency                               ' line 014
Public channel_pause_time(1 To 8) As Currency                              ' line 015
Public channel_open_str(1 To 8) As String                                  ' line 016
Public channel_close_str(1 To 8) As String                                 ' line 017
Public continuerun As Boolean, repetitions As Long                         ' line 018
                                                                           ' line 019
' From form1.frm:                                                          ' line 020
Option Explicit                                                            ' line 021
' Label numbers for idealized traces showing positive pulses
' refer to FIG. 11C.
' Label numbers for solenoid valves refer to FIG. 54.
                                                                           ' line 025
Private Sub Catalytic_Cycle( )                                             ' line 026
Dim i As Integer, success As Boolean                                       ' line 027
    success = SetPriorityClass(GetCurrentProcess( ), _
    REALTIME_PRIORITY_CLASS)   'Increase program priority
    QueryPerformanceCounter countcurrent                                   ' line 030
    Do While continuerun                                                   ' line 031
        For i = 1 To repetitions 'In FIG. 11C repetitions = 2.
            'Emit surface catalyzed solution droplet, liquid A, onto
            'target. Start positive pulse in 243A.
            'Open 18 solenoid valve A.
            MSComm1.Output = channel_open_str(1)                           ' line 036
            countend = countcurrent + channel_open_time(1)                 ' line 037
            Do                                                             ' line 038
                QueryPerformanceCounter countcurrent                       ' line 039
            Loop Until countcurrent > countend                             ' line 040
```

-continued

```
            If countcurrent − countend > timeerror Then GoTo Redo__CC
            'End positive pulse in 243A. Close 18 solenoid valve A.
            MSComm1.Output = channel__close__str(1)                ' line 043
            'Continuous airflow flattens surface catalyzed droplet
            ' during pause before starting positive pulse in 243B.
            countend = countcurrent + channel__pause__time(1)      ' line 046
            DoEvents 'Keep program responsive to user              ' line 047
            Do                                                     ' line 048
                QueryPerformanceCounter countcurrent               ' line 049
            Loop Until countcurrent > countend                     ' line 050
            If countcurrent − countend > timeerror Then GoTo Redo__CC
            'Emit reactant solution droplet onto target.           ' line 052
            'Start positive pulse in 243B. Open 19 solenoid valve B.
            MSComm1.Output = channel__open__str(2)                 ' line 054
            countend = countcurrent + channel__open__time(2)       ' line 055
            Do                                                     ' line 056
                QueryPerformanceCounter countcurrent               ' line 057
            Loop Until countcurrent > countend                     ' line 058
            'Open product receiving solenoid valve, associated with
            'but not part of the device. Start positive pulse in 243F.
            MSComm1.Output = channel__open__str(6)                 ' line 061
            If countcurrent − countend > timeerror Then GoTo Redo__CC
            'End positive pulse in 243B. Close 19 solenoid valve A.
            MSComm1.Output = channel__close__str(2)                ' line 064
            'Continuous airflow flattens reactant solution droplet,
            'liquid B, onto droplet of liquid A.
            'during pause before starting positive pulse in 243A.
            'This pause is slightly longer to sweep off the target.
            countend = countcurrent + channel__pause__time(2)      ' line 069
            Do                                                     ' line 070
                QueryPerformanceCounter countcurrent               ' line 071
            Loop Until countcurrent > countend                     ' line 072
            If countcurrent − countend > timeerror Then GoTo Redo__CC
            GoTo SkipCC                                            ' line 074
Redo__CC:                                                          ' line 075
' If preemptive multitasking has upset the pulse timing,
' close 18 solenoid valve A and 19 solenoid valve B, and
' give the operating system time for its business to finish.
            MSComm1.Output = channel__close__str(1)                ' line 079
            MSComm1.Output = channel__close__str(2)                ' line 080
            DoEvents                                               ' line 081
            Sleep 100                                              ' line 082
            QueryPerformanceCounter countcurrent                   ' line 083
SkipCC:                                                            ' line 084
        Next i 'In FIG. 11C there are two repetitions.             ' line 085
        'Apply reaction product rinse solution, liquid C.
        'Start positive pulse in 243C. Open 229 solenoid valve C.
        MSComm1.Output = channel__open__str(3)                     ' line 088
        countend = countcurrent + channel__open__time(3)           ' line 089
        Sleep 0.8 * channel__open__time(3)                         ' line 090
        Do                                                         ' line 091
            DoEvents                                               ' line 092
            QueryPerformanceCounter countcurrent                   ' line 093
        Loop Until countcurrent > countend                         ' line 094
        'End positive pulse in 243C. Close 229 solenoid valve C.
        MSComm1.Output = channel__close__str(3)                    ' line 096
        countend = countcurrent + channel__pause__time(3)          ' line 097
        Do                                                         ' line 098
            QueryPerformanceCounter countcurrent                   ' line 099
        Loop Until countcurrent > countend                         ' line 100
        'Close solenoid receiving valve. End positive pulse in 243F.
        MSComm1.Output = channel__close__str(6)                    ' line 102
        'Open solenoid waste valve, associated with but not
        ' part of the device. Start positive pulse in 243G.
        MSComm1.Output = channel__open__str(7)                     ' line 105
        'Apply catalyst reactivating solution, liquid D.            ' line 106
        'Start positive pulse in 243D. Open 233 solenoid valve D.
        MSComm1.Output = channel__open__str(4)                     ' line 108
        countend = countcurrent + channel__open__time(4)           ' line 109
        Sleep 0.8 * channel__open__time(4)                         ' line 110
        Do                                                         ' line 111
            DoEvents                                               ' line 112
            QueryPerformanceCounter countcurrent                   ' line 113
        Loop Until countcurrent > countend                         ' line 114
        'End positive pulse in 243D. Close 233 solenoid valve D.
        MSComm1.Output = channel__close__str(4)                    ' line 116
        countend = countcurrent + channel__pause__time(4)          ' line 117
        Do                                                         ' line 118
            QueryPerformanceCounter countcurrent                   ' line 119
        Loop Until countcurrent > countend                         ' line 120
```

-continued

```
            'Apply catalyst rinse solution, liquid E.                       ' line 121
            'Start positive pulse in 243E. Open 234 solenoid valve E.
            MSComm1.Output = channel__open__str(5)                          ' line 123
            countend = countcurrent + channel__open__time(5)                ' line 124
            Sleep 0.8 * channel__open__time(5)                              ' line 125
            Do                                                              ' line 126
                DoEvents                                                    ' line 127
                QueryPerformanceCounter countcurrent                        ' line 128
            Loop Until countcurrent > countend                              ' line 129
            'End positive pulse in 243E. Close 234 solenoid valve E.
            MSComm1.Output = channel__close__str(5)                         ' line 131
            countend = countcurrent + channel__pause__time(5)               ' line 132
            Do                                                              ' line 133
                QueryPerformanceCounter countcurrent                        ' line 134
            Loop Until countcurrent > countend                              ' line 135
            'End positive pulse in 243G. Close solenoid waste valve.
            MSComm1.Output = channel__close__str(7)                         ' line 137
        Loop                                                                ' line 138
        success = __
        SetPriorityClass(GetCurrentProcess( ), NORMAL__PRIORITY__CLASS)
End Sub                                                                     ' line 141
                                                                            ' line 142
Private Sub channel__TextBox__LostFocus(Index As Integer)
Dim tempval As Double                                                       ' line 144
        tempval = Val(channel__TextBox(Index).Text)                         ' line 145
        If tempval < 0 Then tempval = 0                                     ' line 146
        channel__TextBox(Index).Text = tempval                              ' line 147
End Sub                                                                     ' line 148
                                                                            ' line 149
Private Sub EXIT__CommandButton__Click( )                                   ' line 150
        Unload Me                                                           ' line 151
End Sub                                                                     ' line 152
                                                                            ' line 153
Private Sub LoopRepeat__TextBox__LostFocus( )                               ' line 154
Dim tempval As Long                                                         ' line 155
        tempval = Val(LoopRepeat__TextBox)                                  ' line 156
        LoopRepeat__TextBox.Text = tempval                                  ' line 157
        If tempval < 1 Then                                                 ' line 158
            MsgBox "Please enter an integer greater than 0", vbOKOnly, __
            "Repetitions of Channels 1 & 2"                                 ' line 160
            GO__CommandButton.Enabled = False                               ' line 161
        Else                                                                ' line 162
            GO__CommandButton.Enabled = True                                ' line 163
        End If                                                              ' line 164
End Sub                                                                     ' line 165
                                                                            ' line 166
Private Sub pause__TextBox__LostFocus(Index As Integer)
Dim tempval As Double                                                       ' line 168
        tempval = Val(pause__TextBox(Index).Text)                           ' line 169
        If tempval < 0 Then tempval = 0                                     ' line 170
        pause__TextBox(Index).Text = tempval                                ' line 171
End Sub                                                                     ' line 172
                                                                            ' line 173
Private Sub Purge__CheckBox__Click(Index As Integer)                        ' line 174
Dim i As Long, channelnumber As Long, num As Long                           ' line 175
Dim channelstring As String                                                 ' line 176
        i = Index                                                           ' line 177
        num = Purge__CheckBox(i).Value '0 unchecked, 1 checked
        channelnumber = i + 1                                               ' line 179
        channelstring = str255 & Chr$(channelnumber) & Chr$(num)
        MSComm1.Output = channelstring                                      ' line 181
End Sub                                                                     ' line 182
                                                                            ' line 183
Private Sub Form__Load( )                                                   ' line 184
Dim i As Long                                                               ' line 185
        str255 = Chr$(255)                                                  ' line 186
        str0 = Chr$(0)                                                      ' line 187
        str1 = Chr$(1)                                                      ' line 188
        For i = 1 To 8                                                      ' line 189
            channel__open__str(i) = str255 & Chr$(i) & str1                 ' line 190
            channel__close__str(i) = str255 & Chr$(i) & str0                ' line 191
        Next I                                                              ' line 192
        QueryPerformanceFrequency countfrequency                            ' line 193
        ' timeerror is used to detect when preemptive multitasking has
        ' interrupted continuous program execution causing a pulse to
        ' remain on too long by 7 microseconds or more.
        timeerror = (7 / 1000000) * countfrequency                          ' line 197
        MSComm1.CommPort = 3                                                ' line 198
        'Bits per second 9600, Parity None, Data bits 8,                    ' line 199
        'Stop bits 1, Flow control None                                     ' line 200
```

-continued

```
    MSComm1.Settings = "9600,N,8,1"                          ' line 201
    MSComm1.PortOpen = True                                  ' line 202
    ' Set default values. Channel number = array index + 1.
    LoopRepeat__TextBox.Text = "2"                           ' line 204
    channel__TextBox(0).Text= "8"                            ' line 205
    pause__TextBox(0).Text = "17"                            ' line 206
    channel__TextBox(1).Text = "10"                          ' line 207
    pause__TextBox(1).Text = "20"                            ' line 208
    channel__TextBox(2).Text = "30"                          ' line 209
    pause__TextBox(2).Text = "20"                            ' line 210
    channel__TextBox(3).Text = "20"                          ' line 211
    pause__TextBox(3).Text = "15"                            ' line 212
    channel__TextBox(4).Text = "30"                          ' line 213
    pause__TextBox(4).Text = "15"                            ' line 214
    ' The timings for channels 6 and 7 are a programmatic result of
    ' the values set for channels 1 thru 5.
End Sub                                                      ' line 217
                                                             ' line 218
Private Sub Form__Unload(Cancel As Integer)                  ' line 219
Dim i As Long, num As Long                                   ' line 220
    continuerun = False ' Stop pulse loop.                   ' line 221
    For i = 1 To 8 ' Close all solenoid valves.              ' line 222
        MSComm1.Output = channel__close__str(i)              ' line 223
    Next I                                                   ' line 224
    MSComm1.PortOpen = False                                 ' line 225
End Sub                                                      ' line 226
                                                             ' line 227
Private Sub GO__CommandButton__Click( )                      ' line 228
Dim i As Long, tempdouble As Double                          ' line 229
    EXIT__CommandButton.Enabled = False                      ' line 230
    GO__CommandButton.Enabled = False                        ' line 231
    STOP__CommandButton.Enabled = True                       ' line 232
    LoopRepeat__TextBox.Enabled = False                      ' line 233
    For i = 0 To 4 ' Values cannot be changed during operation.
        Purge__CheckBox(i).Value = 0                         ' line 235
        Purge__CheckBox(i).Enabled = False                   ' line 236
        channel__TextBox(i).Enabled = False                  ' line 237
        pause__TextBox(i).Enabled = False                    ' line 238
    Next I                                                   ' line 239
    For i = 0 To 4 ' Calculate values from text entries.     ' line 240
        tempdouble = (Val(channel__TextBox(i).Text) / 1000)
        channel__open__time(i + 1) = tempdouble * countfrequency
        tempdouble = (Val(pause__TextBox(i).Text) / 1000)    ' line 243
        channel__pause__time(i + 1) = tempdouble * countfrequency
    Next I                                                   ' line 245
    repetitions = Val(LoopRepeat__TextBox.Text)              ' line 246
    continuerun = True                                       ' line 247
    Catalytic__Cycle                                         ' line 248
End Sub                                                      ' line 249
                                                             ' line 250
Private Sub STOP__CommandButton__Click( )                    ' line 251
Dim i As Long                                                ' line 252
    continuerun = False                                      ' line 253
    GO__CommandButton.Enabled = True                         ' line 254
    STOP__CommandButton.Enabled = False                      ' line 255
    EXIT__CommandButton.Enabled = True                       ' line 256
    LoopRepeat__TextBox.Enabled = True                       ' line 257
    For i = 0 To 4                                           ' line 258
        channel__TextBox(i).Enabled = True                   ' line 259
        pause__TextBox(i).Enabled = True                     ' line 260
        Purge__CheckBox(i).Enabled = True                    ' line 261
    Next I                                                   ' line 262
End Sub                                                      ' line 263
End program listing.
```

I claim:

1. A fluid applicator comprising:

a. two or more raised or pressurized containers for holding and dispensing different liquids;

b. two or more electromechanical liquid valves, liquid pumps, and micro-electromechanical or piezo actuated fluid dispensers, ejectors, pumps, or valves, each connected at its inlet port by separate tubing to receive one of said liquids from one of said containers, for controlling the flow of said liquids;

c. two or more liquid emitting orifices of fixed relative orientation directed at the same location of a target surface, herein called liquid orifices, said liquid orifices mounted in a nozzle head for manual or mechanical placement or motion comprised of stationary, one, two, or three dimensional motion, each of said liquid orifices connected by separate tubing to the outlet of one of said valves or pumps, for relatively fixedly directing each of said liquids to strike said same location on said target surface so as to require no motion of said nozzles or electrostatic effect upon said droplets to effectuate application of said droplets to said same location, whereby a chemical action of removing, depositing, or biphasic catalysis takes place, depending upon the chemical properties of said liquids and said target surface;

d. an electrical unit controlling said electromechanical valves or pumps, whereby said valves or pumps pass or deliver each of said liquids repetitively in an alternate, sequential, or otherwise regularly timed pattern, such that said liquids essentially do not contact one another before reaching said same location on said target surface, wherein said electrical unit is configured to be started and stopped manually, electrically, or mechanically, said pattern of droplet emission is otherwise unaffected by and not coordinated with said placement or motion of said nozzle head relative to said target surface, wherein said pattern of droplet emission is of configured for, compared to said relative motion of said nozzle head, that at least one of said pattern of droplet emission is completed upon essentially the same location on said target surface, overlap of said droplet emission pattern included, and wherein said electrical unit further comprises a pulse provider configured to regulate the size of droplets emitted and the intervals between emissions based upon the length of provided pulses.

2. The fluid applicator of claim 1 further including manually or automatically controlled heating or cooling trays, shrouds, or enclosures for said liquid containers and said tubing for the transport of said liquids, whereby the temperatures of said liquids are maintained at or brought to levels propitious for said chemical action on said target surface.

3. The fluid applicator of claim 1 further including manually or automatically controlled stirring or agitating means for said containers, whereby the homogeneity of said liquids is maintained at a level propitious for said chemical action on said target surface.

4. The fluid applicator of claim 1 further including:

a. a plurality of radiation sources directed relatively fixedly with said liquid orifices at said same location on said target surface;

b. electrical circuits for supplying and controlling said radiation sources.

5. The fluid applicator of claim 4 wherein the radiation sources are selected from the group consisting of: visible light, ultraviolet light, infrared light, sound, ultrasonic sound.

6. The fluid applicator of claim 1 wherein said electrical unit is comprised of elements selected from the group consisting of: power supplies, voltage regulators, relays, resistors, capacitors, oscillators, transistors, integrated circuits, EPROMs, switches, LEDs, potentiometers, LED displays, LCD displays, OLED displays, FPGAs and other programmable logic devices, computers, and computer controlled digital I/O devices.

7. The fluid applicator of claim 1 with the addition of a means of suction or vacuum whereby said liquids deposited on said same location of said target surface are thereafter withdrawn from the vicinity of the same surface side of said same location of said target surface.

8. The fluid applicator of claim 1 further comprising:

a. a plurality of gas pumps or pressurized gas containers, supplied with gas valves or electromechanical gas valves, and gauges as needed, to supply a plurality of gasses;

b. a plurality of gas emitting orifices relatively fixedly pointing at said same location, herein called gas orifices, connected by gas tubing via said gas valves and gauges, forming gas paths, to said gas pumps or pressurized gas containers, so as to relatively fixedly direct a plurality of flows of gas or gasses at or upon said same location of said target surface, thereby configured for mixing, flattening, altering to a thin film, or completely pushing away any or all of said liquid droplets;

c. an electrical unit as of claim 1 with the further capability of controlling said electromechanical gas valves, such that the emission of those gasses passing through said electromechanical gas valves is coordinated with the patterned release of said liquid droplets.

9. The fluid applicator of claim 8 wherein any of said gas orifices are positioned so that the gas blows past said liquid orifices, thus preventing or removing any liquids residually clinging to said liquid orifices.

10. The fluid applicator of claim 8 further including as needed manually or automatically controlled heating or cooling trays, shrouds, or enclosures for said liquid containers and said tubing for the transport of said liquids, and for said gas tubing connected to said gas orifices, whereby the temperature of said liquids and gasses is brought to or maintained at a level propitious for said chemical action at said same location on said target surface.

11. The fluid applicator of claim 8 wherein said electrical unit is comprised of elements selected from the group consisting of: power supplies, voltage regulators, relays, resistors, capacitors, oscillators, transistors, integrated circuits, EPROMs, switches, LEDs, potentiometers, LED displays, LCD displays, OLED displays, FPGAs and other programmable logic devices, computers and computer controlled digital I/O devices.

12. The fluid applicator of claim 8 wherein any of said gasses are highly ionized gasses, or plasmas, and all accompanying containers, pumps, valves, tubing or conduits, controls, and orifices or emitters are suitable for use with a plasma.

13. A method of fluid application according to the fluid applicator of claim 1 wherein droplets of two or more different liquids are sequentially or alternately applied in a pattern to a same location of a target surface, said droplets remaining essentially separate from one another until reaching said same location on said target surface, by means of two or more nozzles relatively fixedly directed at said same location so as to require no motion of said nozzles or electrostatic effect upon said droplets to effectuate application of said droplets to said same location, wherein said application is configured for applying said pattern to be unaffected by any relative motion or placement with respect to the target surface, except for being started or stopped.

14. The method of claim 13 wherein said liquids are of a chemical composition such that the contact of said droplets at said same location on said target surface results in the removal of material from said target surface.

15. The method of claim 13 wherein said liquids are of a chemical composition such that the contact of said droplets at said same location on said target surface results in the accumulation of a precipitated, polymerized, or agglomerated deposit.

16. The method of claim 15 wherein one of said liquids contains calcium ions and the other of said liquids contains phosphate ions such that said precipitated deposit is a chemical compound containing calcium and phosphate.

17. The method of claim 15 wherein one of said liquids contains thrombin and the other of said liquids contains fibrogen such that said deposit is fibrin glue.

18. The method of claim 13 wherein said application of said droplets to said same location is further accompanied by elements from the group consisting of: temperature control of said liquids; relatively fixedly directed application of radiation from the electromagnetic spectrum to said same location on said target surface; relatively fixedly directed application of ultrasonic sound waves to said same location on said target surface; relatively fixedly directed application of a controlled flow of a plurality of gasses to said same location on said target surface.

19. The method of claim 18 wherein, with said target surface and at least two of said plurality of liquids of a chemical nature to participate in a chemical reaction of biphasic catalysis catalyzed by said target surface, the following steps take place:

a. a droplet of a first of said liquids is applied onto said target surface, said target surface having catalyzing properties;

b. application of said controlled flow of gas spreads said first droplet into a thin film, maximizing catalyzing contact with said target surface;

c. a droplet of a second of said liquids is applied onto said thin film;

d. application of said controlled flow of gas spreads and mixes said second droplet into said thin film, resulting in said chemical reaction with an increased ratio of catalyzed reaction product to side products;

e. a plurality of applications of gasses and other liquids to remove the reacted liquids into a suitably provided collection container and clean and prepare the target surface for a repetition of the process of this method.

* * * * *